United States Patent
Wolters

(10) Patent No.: US 11,635,826 B2
(45) Date of Patent: Apr. 25, 2023

(54) DEVICE, METHOD, AND GRAPHICAL USER INTERFACE FOR ADJUSTING TOUCH ACTIVATION REGIONS ASSOCIATED WITH SELECTABLE USER INTERFACE ELEMENTS

(71) Applicant: Apple Inc., Cupertino, CA (US)

(72) Inventor: Glenn Wolters, San Jose, CA (US)

(73) Assignee: APPLE INC., Cupertino, CA (US)

( * ) Notice: Subject to any disclaimer, the term of this patent is extended or adjusted under 35 U.S.C. 154(b) by 564 days.

(21) Appl. No.: 15/978,110

(22) Filed: May 12, 2018

(65) Prior Publication Data

US 2018/0335856 A1 Nov. 22, 2018

Related U.S. Application Data

(60) Provisional application No. 62/506,731, filed on May 16, 2017.

(51) Int. Cl.

| G06F 3/0346 | (2013.01) |
|---|---|
| G06F 3/0481 | (2022.01) |
| G06F 3/0484 | (2022.01) |
| G06F 3/04845 | (2022.01) |
| G06F 3/04842 | (2022.01) |
| G06F 3/04817 | (2022.01) |
| G06F 1/16 | (2006.01) |
| G06F 3/04886 | (2022.01) |

(52) U.S. Cl.
CPC .......... *G06F 3/0346* (2013.01); *G06F 1/1694* (2013.01); *G06F 3/04817* (2013.01); *G06F 3/04842* (2013.01); *G06F 3/04845* (2013.01); *G06F 3/04886* (2013.01)

(58) Field of Classification Search
CPC ............... G06F 3/0346; G06F 3/04817; G06F 3/04842; G06F 3/04845; G06F 1/1694; G06F 3/04886
USPC ........................................................ 715/866
See application file for complete search history.

(56) References Cited

U.S. PATENT DOCUMENTS

| 2008/0074384 A1* | 3/2008 | Orr ........................ G06F 1/1626 345/156 |
|---|---|---|
| 2010/0188371 A1* | 7/2010 | Lowles ................. G06F 3/0418 345/178 |
| 2014/0104225 A1* | 4/2014 | Davidson ................ G06F 3/044 345/174 |

(Continued)

*Primary Examiner* — Tadesse Hailu
*Assistant Examiner* — Darrin Hope
(74) *Attorney, Agent, or Firm* — Fernando & Partners, LLP

(57) ABSTRACT

A device displays a first selectable user interface (UI) element associated with a first touch activation region. The device detects a change of movement of the display. In response to the change of movement, the device adjusts the first touch activation region to encompass a new area. The new area is at least partially different from the first touch activation region prior to the change of movement and is based on the change of the movement. After detecting the change of movement, the device detects a touch input. In accordance with a determination that the touch input is detected within the adjusted first touch activation region, the device performs a user interface operation associated with the first selectable UI element. In accordance with a determination that the touch input is detected outside the adjusted first touch activation region, the device forgoes performance of the user interface operation.

20 Claims, 32 Drawing Sheets

(56) References Cited

U.S. PATENT DOCUMENTS

| | | | | |
|---|---|---|---|---|
| 2014/0176510 A1* | 6/2014 | Nakao | .................. | G06F 3/0418 |
| | | | | 345/178 |
| 2015/0149956 A1* | 5/2015 | Kempinski | ............. | G06F 3/017 |
| | | | | 715/784 |
| 2016/0041755 A1* | 2/2016 | Crowther | ............ | G06F 3/04886 |
| | | | | 715/773 |

* cited by examiner

600

| 602 | At a device with a non-transitory memory, and one or more processors in communication with a touch-sensitive display:<br><br>Display one or more selectable user interface elements on the touch-sensitive display that are associated with corresponding touch activation regions, where the one or more selectable user interface elements include a first selectable user interface element that is associated with a first touch activation region |

| 604 | Detect a change of movement of the touch-sensitive display that has an associated respective direction  |

| 606 | In response to detecting the change of movement of the touch-sensitive display:<br><br>Adjust the first touch activation region to encompass a new area of the touch-sensitive display that is at least partially different from the first touch activation region prior to detecting the change of movement, and the new area is based on the change of movement of the touch-sensitive display  |

| 608 | After detecting the change of movement of the touch-sensitive display, detect a touch input on the touch-sensitive display  |

| 610 | In response to detecting the touch input on the touch-sensitive display:<br><br>in accordance with a determination that the touch input is detected within the adjusted first touch activation region, perform a user interface operation that is associated with the first selectable user interface element; and<br><br>in accordance with a determination that the touch input is detected outside of the adjusted first touch activation region, forgo performance of the user interface operation that is associated with the first selectable user interface element. |

Detecting a touch input on the touch-sensitive display includes: — 608

> Detecting a plurality of touch inputs on the touch-sensitive display;
>
> Determining a primary touch input of the plurality of touch inputs based on the change of movement of the touch-sensitive display; and
>
> Discarding the remainder of the touch inputs after determining the primary touch input

— 628

Ⓑ

Adjusting the first touch activation region includes: — 606

> in accordance with a determination that the change in the direction of movement of the touch-sensitive display is in a first movement-direction, adjust the first touch activation region to encompass a first area of the touch-sensitive display that is in a first display-direction from an area of the touch-sensitive display that contained the first touch activation region prior to detecting the change in direction of movement of the touch-sensitive display, wherein the first area was not included in the first touch activation region prior to detecting the change in the direction of movement; and
>
> in accordance with a determination that the change in the direction of movement of the touch-sensitive display is in a second movement-direction, adjust the first touch activation region to encompass a second area of the touch-sensitive display that is in a second display-direction from the area of the touch-sensitive display that contained the first touch activation region prior to detecting the change in direction of movement of the touch-sensitive display, wherein the second area was not included in the first touch activation region prior to detecting the change in the direction of movement and the second area is different from the first area.

Where re-adjusting the first touch activation region includes:

reversing the adjustment that was made to the first touch activation region — 644

---

Where re-adjusting the first touch activation region includes:

adjusting the first touch activation region to temporarily encompass a third area that is in a third display-direction opposite from the first display-direction, the third area is situated beyond the area of the touch-sensitive display that contained the first touch activation region prior to detecting the change in direction of movement of the touch-sensitive display;

determining that the first touch activation region has encompassed the third area for a threshold amount of time; and in response to determining that the threshold amount of time has elapsed, adjusting the first touch activation region to encompass the area of the touch-sensitive display that contained the first touch activation region prior to detecting the change in direction of movement of the touch-sensitive display — 646

--- after re-adjusting the first touch activation region, detecting a second touch input on the touch-sensitive display; and in response to detecting the second touch input on the touch-sensitive display:

in accordance with a determination that the second touch input is detected within the first touch activation region, performing a user interface operation that is associated with the first selectable user interface element; and — 648 in accordance with a determination that the second touch input is detected outside of the first touch activation region, forgoing performance of the user interface operation that is associated with the first selectable user interface element

---

Where a first amount of change between the first area and the area that contained the first touch activation region prior to detecting the change is greater than a second amount of change between the third area and the area that contained the first touch activation region prior to detecting the change — 650

Figure 6E

DEVICE, METHOD, AND GRAPHICAL USER INTERFACE FOR ADJUSTING TOUCH ACTIVATION REGIONS ASSOCIATED WITH SELECTABLE USER INTERFACE ELEMENTS

RELATED APPLICATION

This application claims priority to U.S. Provisional Patent Application No. 62/506,731, filed on May 16, 2017, entitled "Device, Method, and Graphical User Interface for Adjusting Touch Activation Regions associated with Selectable User Interface Elements," the entire contents of which are incorporated herein by reference.

TECHNICAL FIELD

This relates generally to electronic devices in communication with touch-sensitive displays, including but not limited to electronic devices with touch-sensitive displays that adjust touch activation regions associated with selectable user interface elements.

BACKGROUND

The use of touch-sensitive displays as input devices for computers, automobiles and other electronic computing devices has increased significantly in recent years. Example touch-sensitive displays include touchpads and touchscreens. Such touch-sensitive displays are typically used to display selectable user interface elements, and perform user interface operations associated with the selectable user interface elements. Examples of selectable user interface elements include icons for applications, buttons and other controls. Examples of user interface operations include launching an application, and/or performing various application-specific operations such as initiating a search, playing music, starting navigation, etc.

The selectable user interface elements are typically associated with corresponding touch activation regions. The device detects a touch input within a touch activation region that corresponds with a selectable user interface element, and performs a user interface operation associated with the selectable user interface element. For example, the device can detect a touch input within a touch activation region that corresponds with an icon for an application and launch the application in response to detecting the touch input. As another example, the device can detect a touch input within a touch activation region that corresponds with a song title in a music application and start playback of the song in response to detecting the touch input.

SUMMARY

But methods for detecting touch inputs associated with touch activation regions are sometimes ineffective. For example, detecting touch inputs associated with touch activation regions is often ineffective when the touch-sensitive display is moving. This is particularly important for touch-sensitive displays that are inside moving vehicles.

Accordingly, there is a need for electronic devices with more effective methods and interfaces for detecting touch inputs associated with touch activation regions. Such methods and interfaces optionally complement or replace conventional methods for detecting touch inputs associated with touch activation regions. Such methods and interfaces reduce the cognitive burden on a user and produce a more efficient human-machine interface. For battery-operated devices, such methods and interfaces conserve power and increase the time between battery charges. For touch-sensitive displays inside vehicles, such methods and interfaces improve vehicle safety, for example, by reducing wasteful user interaction time with the touch-sensitive display.

The above deficiencies and other problems associated with user interfaces for electronic devices with touch-sensitive displays are reduced or eliminated by the disclosed devices. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device is a desktop computer. In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive display. In some embodiments, the functions optionally include launching applications, providing driving directions (e.g., via a maps application), playing music (e.g., via a music application), providing information (e.g., via a personal assistant application), image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors in communication with a touch-sensitive display. The method includes displaying one or more selectable user interface elements on the touch-sensitive display that are associated with corresponding touch activation regions, where the one or more selectable user interface elements include a first selectable user interface element that is associated with a first touch activation region. The method also includes detecting a change of movement of the touch-sensitive display that has an associated respective direction. In response to detecting the change of movement of the touch-sensitive display, the method includes adjusting the first touch activation region to encompass a new area of the touch-sensitive display that is at least partially different from the first touch activation region prior to detecting the change of movement, and the new area is based on the change of the movement of the touch-sensitive display. The method further includes after detecting the change of movement of the touch-sensitive display, detecting a touch input on the touch-sensitive display. In response to detecting the touch input on the touch-sensitive display, the method includes in accordance with a determination that the touch input is detected within the adjusted first touch activation region, performing a user interface operation that is associated with the first selectable user interface element. The method further includes in accordance with a determination that the touch input is detected outside of the adjusted first touch activation region, forgoing performance of the user interface operation that is associated with the first selectable user interface element. Adjusting the first touch activation region improves the efficiency and/or effectiveness of detecting a touch input associated with the first selectable user interface element during the change of movement of the touch-sensitive display, thereby creating a more efficient human-machine interface. Adjusting the first touch activation region enhances the operability of the device, for example, by reducing the number of touch inputs needed to perform the user interface operation and/or by reducing wasteful user interaction time with the touch-sensitive display.

In accordance with some embodiments, an electronic device includes a non-transitory memory, and one or more processors in communication with a touch-sensitive display. The one or more processors are configured to display one or more selectable user interface elements on the touch-sensitive display that are associated with corresponding touch activation regions, where the one or more selectable user interface elements include a first selectable user interface element that is associated with a first touch activation region. The one or more processors are also configured to detect a change of movement of the touch-sensitive display that has an associated respective direction. In response to detecting the change of movement of the touch-sensitive display, the one or more processors are configured to adjust the first touch activation region to encompass a new area of the touch-sensitive display that is at least partially different from the first touch activation region prior to detecting the change of movement, and the new area is based on the change of the movement of the touch-sensitive display. After detecting the change of movement of the touch-sensitive display, the one or more processors are further configured to detect a touch input on the touch-sensitive display. In response to detecting the touch input on the touch-sensitive display, in accordance with a determination that the touch input is detected within the adjusted first touch activation region, the one or more processors are configured to perform a user interface operation that is associated with the first selectable user interface element. In accordance with a determination that the touch input is detected outside of the adjusted first touch activation region, the one or more processors are configured to forgo performance of the user interface operation that is associated with the first selectable user interface element. Adjusting the first touch activation region improves the efficiency and/or effectiveness of detecting a touch input associated with the first selectable user interface element during the change of movement of the touch-sensitive display, thereby creating a more efficient human-machine interface. Adjusting the first touch activation region enhances the operability of the device, for example, by reducing the number of touch inputs needed to perform the user interface operation and/or by reducing wasteful user interaction time with the touch-sensitive display.

Thus, electronic devices with displays and input devices are provided with faster, more efficient and/or more effective methods and interfaces for detecting touch inputs associated with touch activation regions, thereby increasing the effectiveness, efficiency, and user satisfaction with such devices. Such methods and interfaces may complement or replace conventional methods for detecting touch inputs associated with touch activation regions.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6F are flow diagrams illustrating a method of adjusting touch activation regions in accordance with some embodiments.

DESCRIPTION OF EMBODIMENTS

Figure 1A:
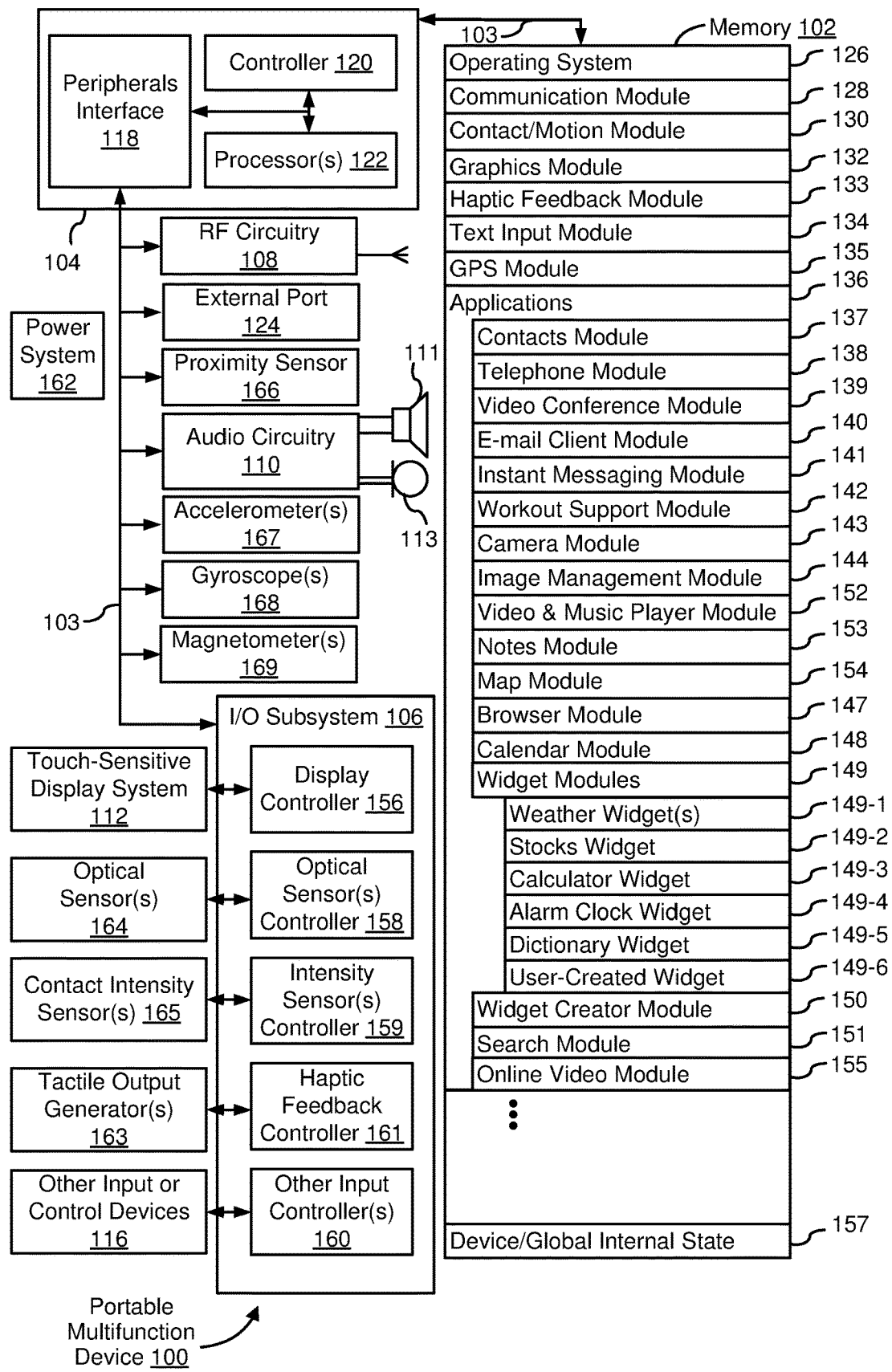
FIG. 1A is a block diagram illustrating a portable multifunction device with a touch-sensitive display in accordance with some embodiments.

The use of electronic devices with touch-based user interfaces (e.g., devices such as the iPhone®, iPod Touch®, and iPad® devices from Apple Inc. of Cupertino, Calif.) has increased significantly in recent years. These devices use touch-sensitive surfaces, such as a touch screen display or a touch pad, as the main input for manipulating user interface elements on a display and/or controlling the device. These devices detect a touch input within a touch activation region associated with a selectable user interface element, and perform a user interface operation associated with the selectable user interface element in response to detecting the touch input.

Described below are devices and methods that adjust the touch activation region associated with a selectable user interface element being displayed on a touch-sensitive display based on a function of a change of movement of the touch-sensitive display. For example, the device adjusts the touch activation region in response to a change of movement of the touch-sensitive display. For example, the device adjusts the touch activation region to encompass a new area of the touch-sensitive display that is at least partially different from the touch activation region prior to detecting the change of movement.

Below, FIGS. 1A-1B, 2, and 3 provide a description of example devices. FIGS. 4A-4B, and 5A-5T illustrate example user interfaces with adjusted touch activation regions. FIG. 5U illustrates an example adjustment of the touch activation regions based on changes in movement of the touch-sensitive display. FIGS. 6A-6F illustrate a flow diagram of a method of adjusting a touch activation region based on a function of a change of movement of the touch-sensitive display. The user interfaces in FIGS. 5A-5T and the example adjustment in FIG. 5U are used to illustrate the processes in FIGS. 6A-6F.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an email application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
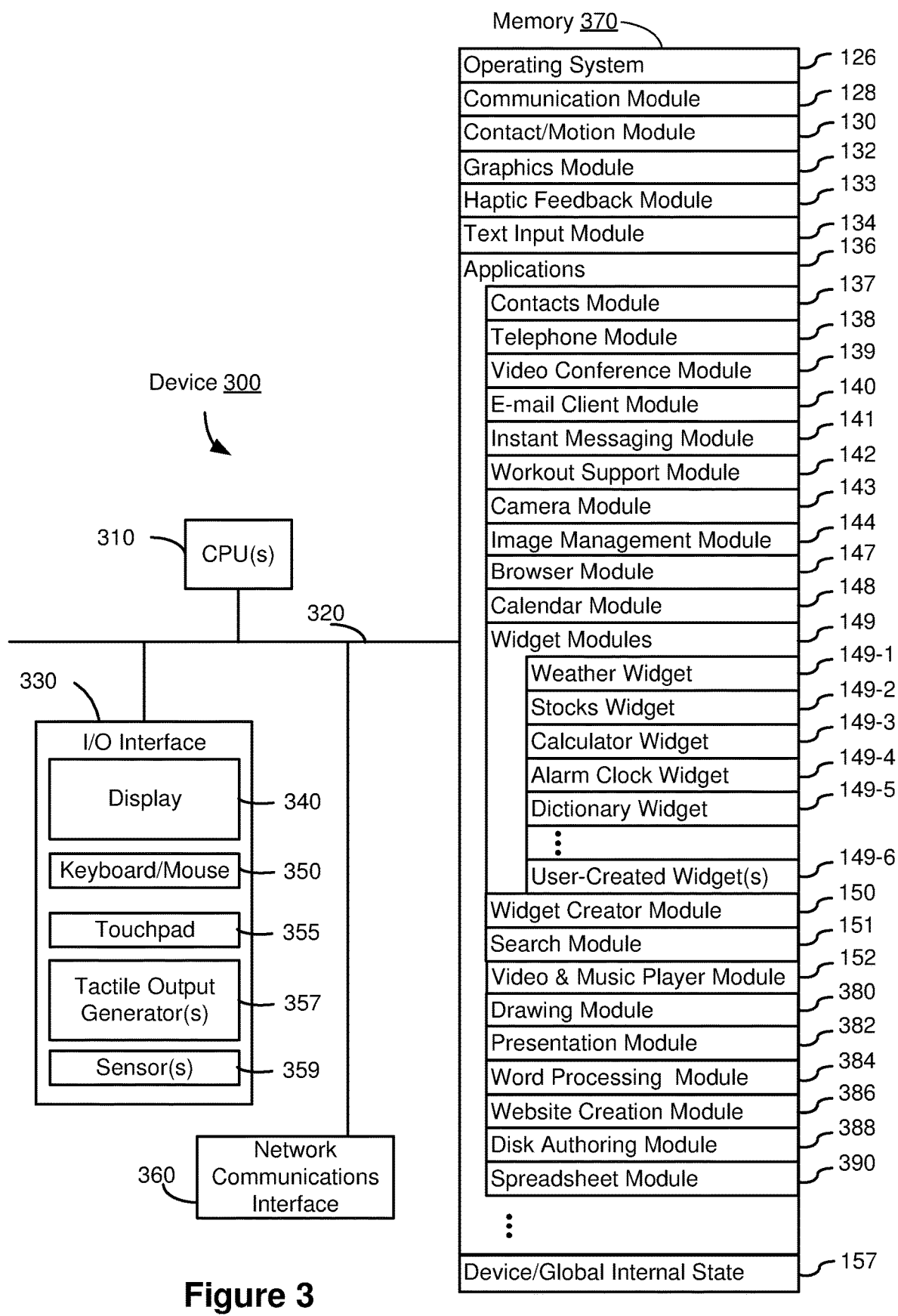
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, email 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;

workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
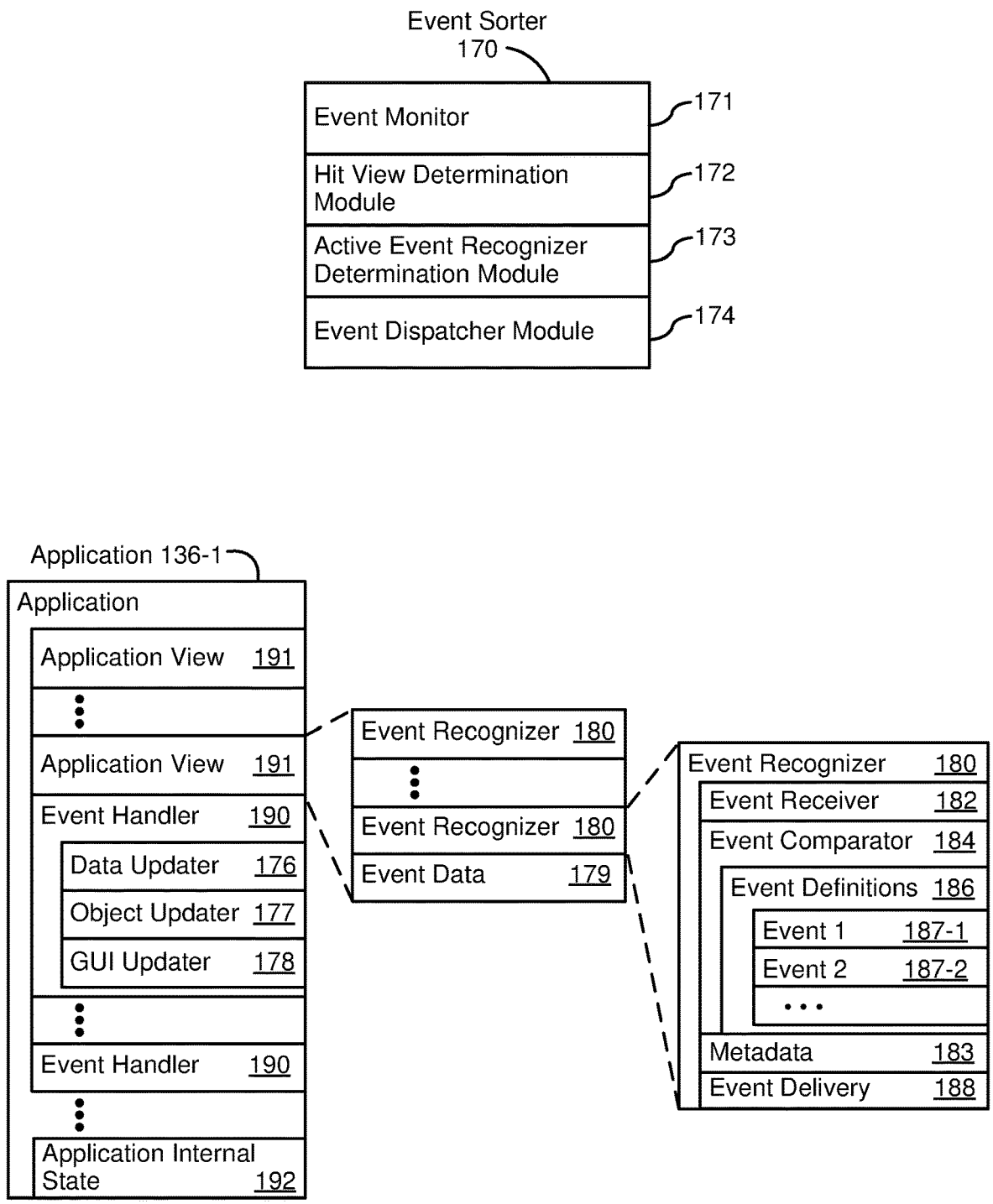
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in a respective event, such as event 1 (187-1) or event 2 (187-2), include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, the event definition for a respective event, such as event 1 (187-1) or event 2 (187-2), includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event, such as event 1 (187-1) or event 2 (187-2), also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
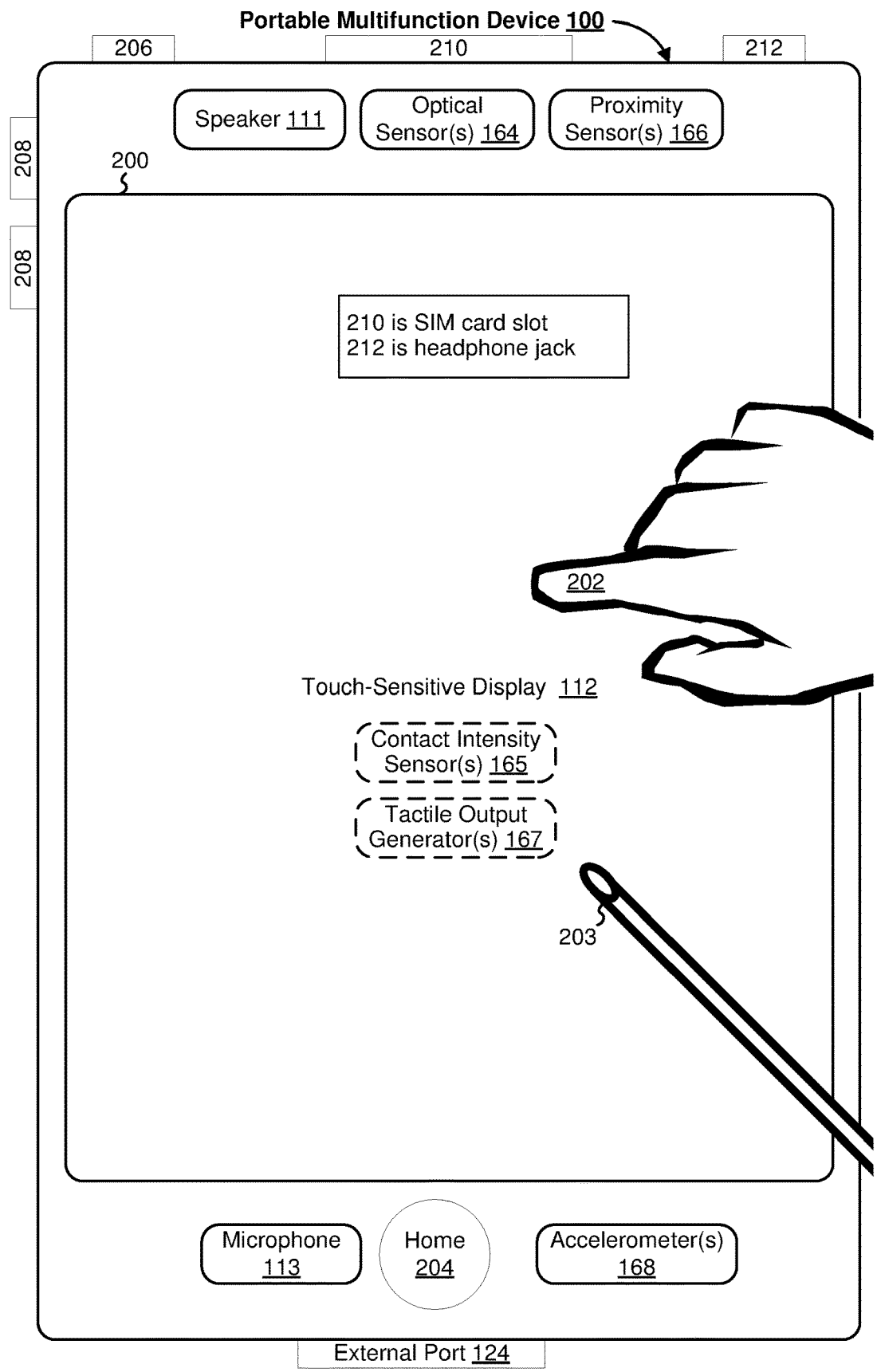
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed toward embodiments of user interfaces ("UI") that are, optionally, implemented on portable multifunction device 100.

Figure 4A:
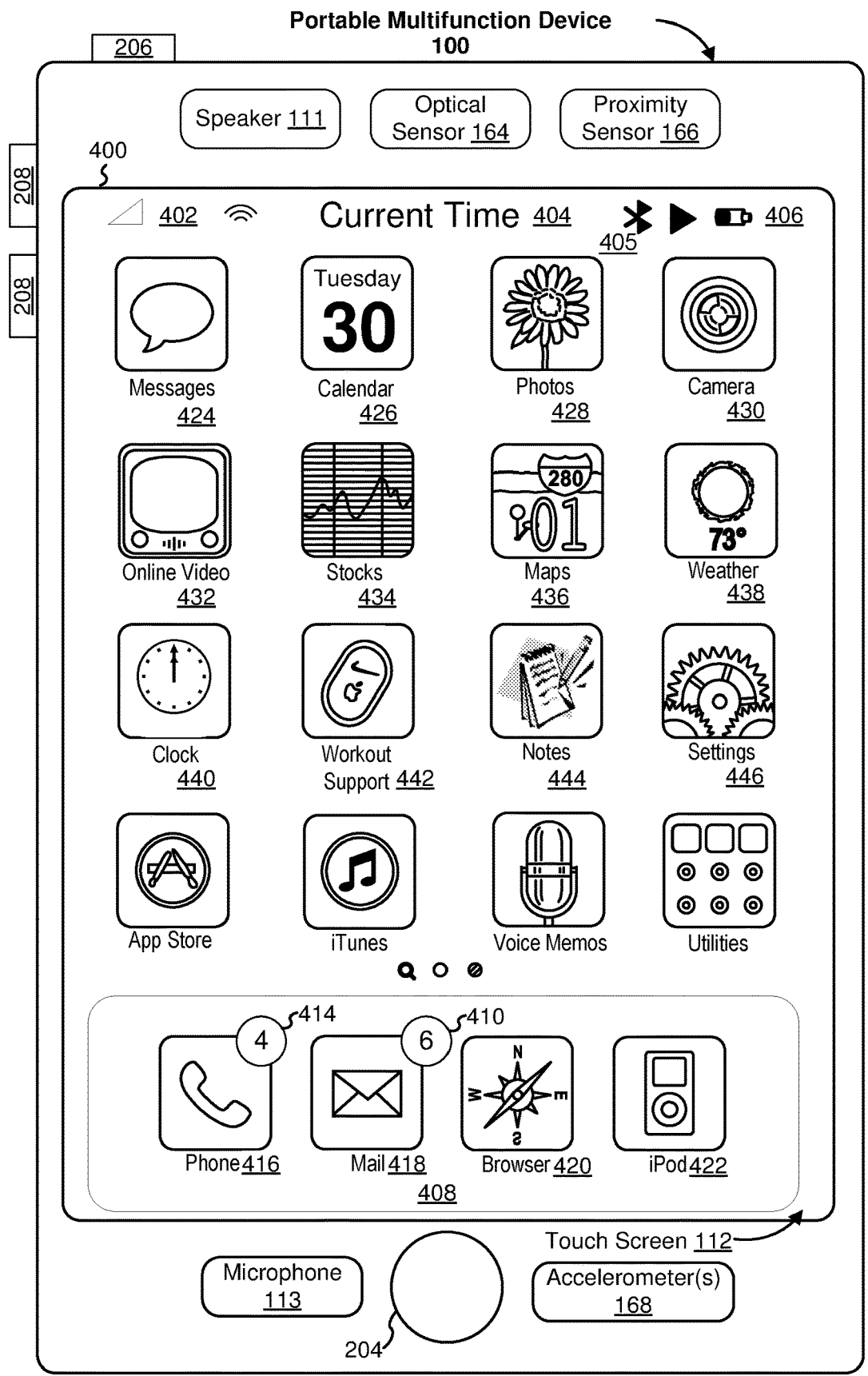
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 169-6, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
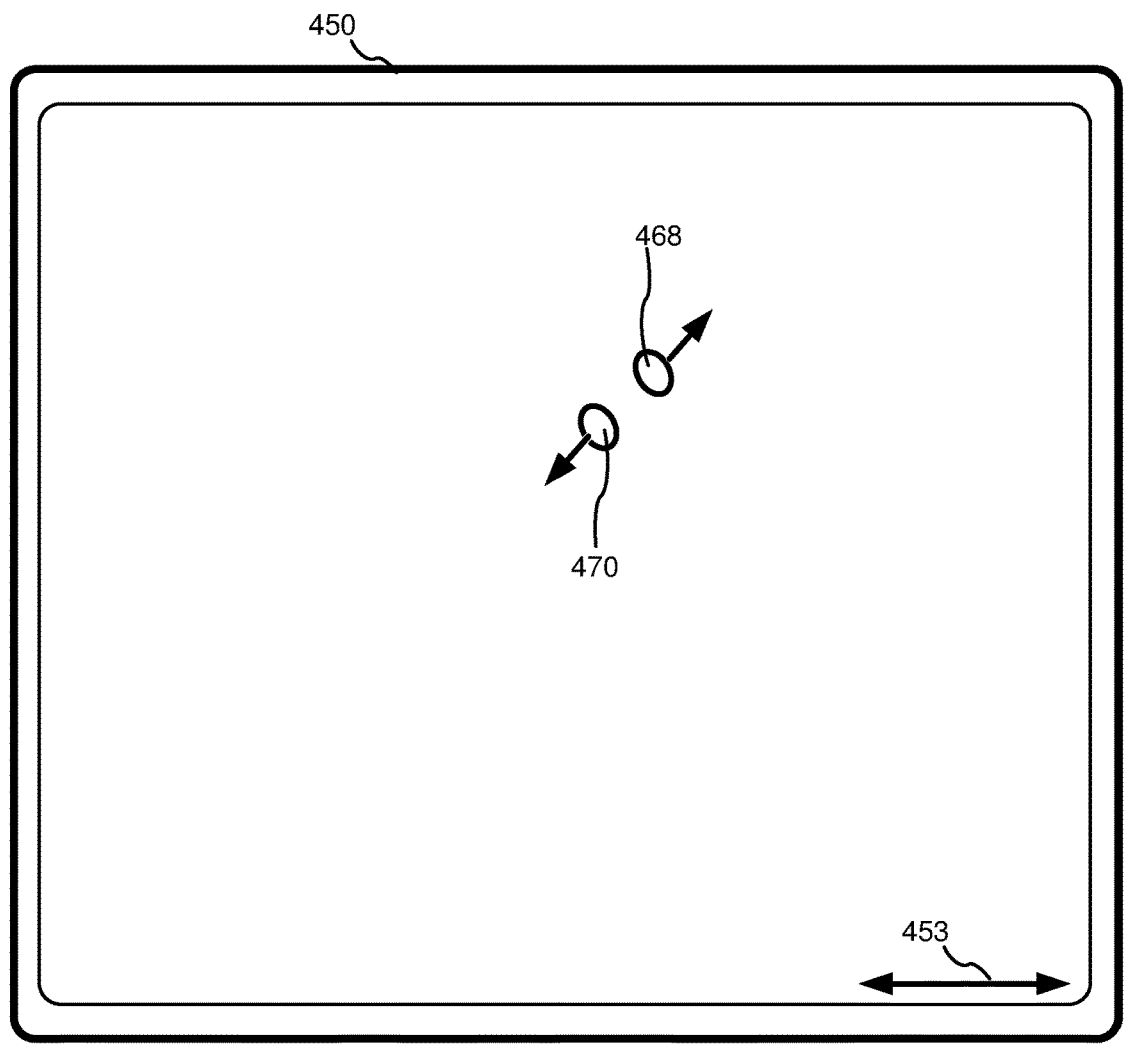
FIG. 4B illustrates an example user interface for a multifunction device with a touch-sensitive surface that is separate from the display in accordance with some embodiments.
Figure 4B:
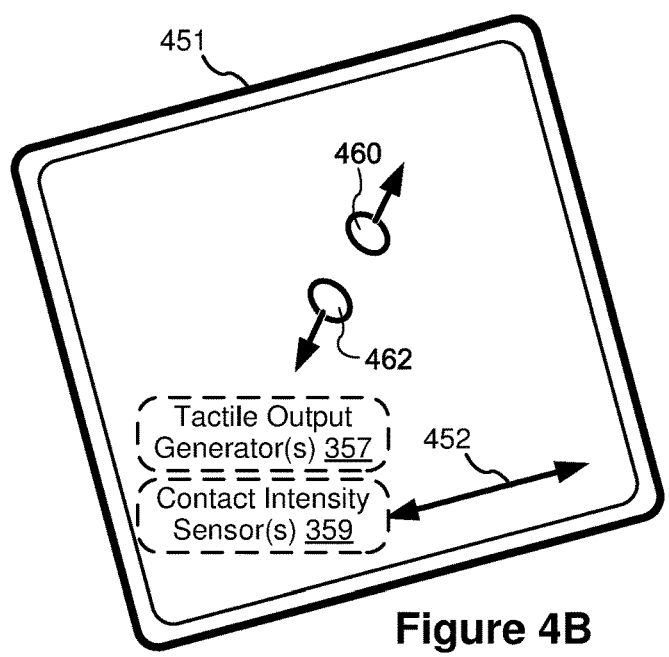

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 5A-5T) described below optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold ITS, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

An increase of characteristic intensity of the contact from an intensity below the light press intensity threshold ITL to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiment, the triggering of these responses also depends on time-based criteria being met (e.g., a delay time has elapsed between a first intensity threshold being met and a second intensity threshold being met).

User Interfaces and Associated Processes

Attention is now directed toward embodiments of user interfaces ("UI") and associated processes that may be implemented on an electronic device, such as device 100 or device 300, with a display, a touch-sensitive surface, and one or more sensors to detect intensity of contacts with the touch-sensitive surface.

Figure 5A:
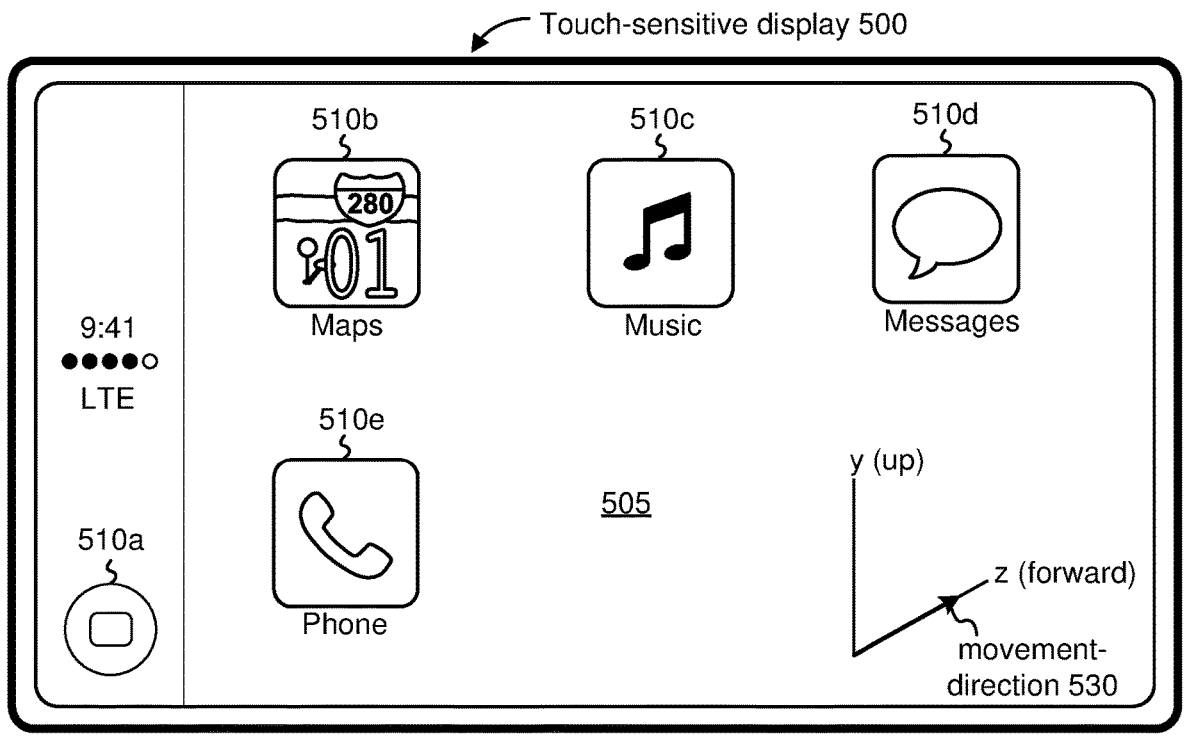
FIGS. 5A-5T illustrate example user interfaces for adjusting touch activation regions in accordance with some embodiments.
Figure 5B:
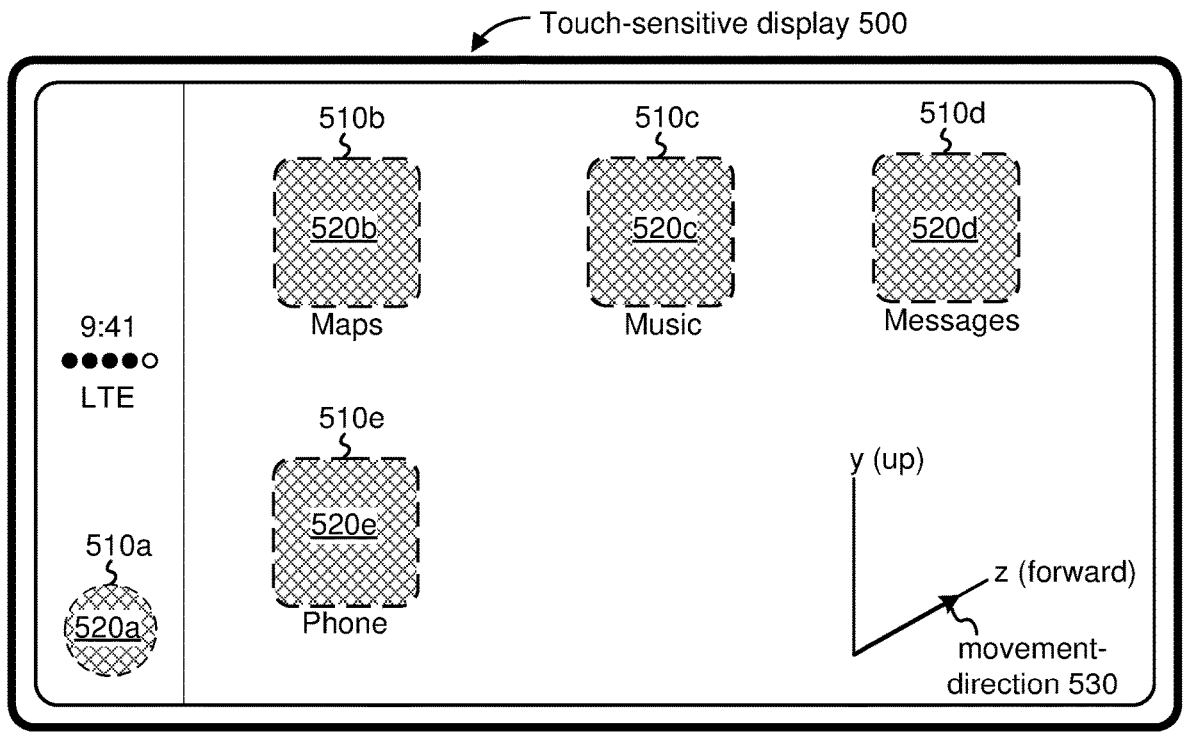
FIG. 5U illustrates an example adjustment and an example counter-adjustment of the touch activation regions in accordance with some embodiments.
Figure 5C:
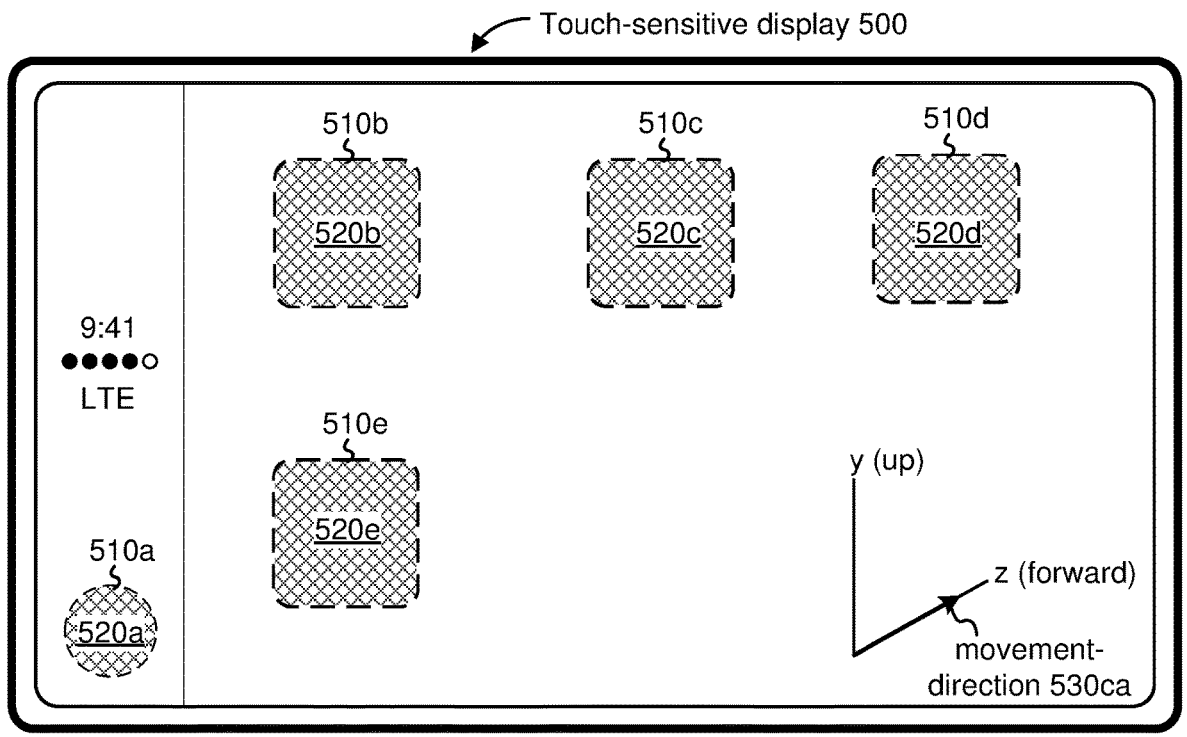
Figure 5C:
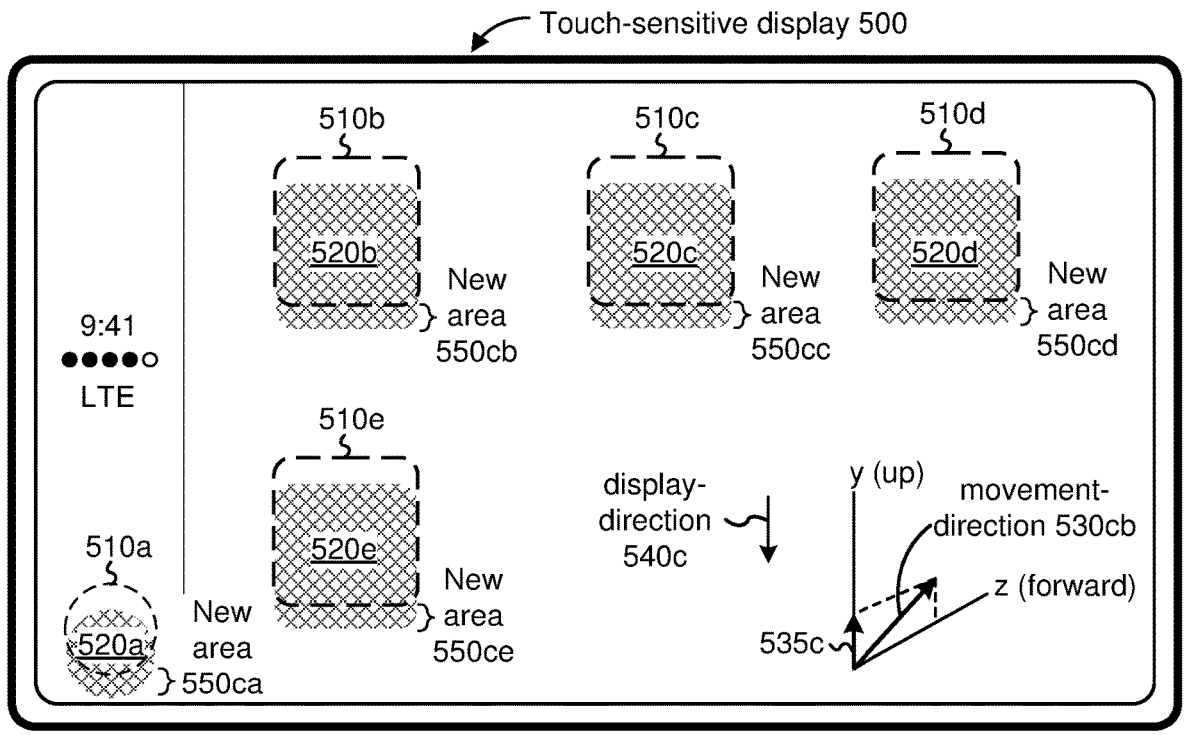
Figure 5D:
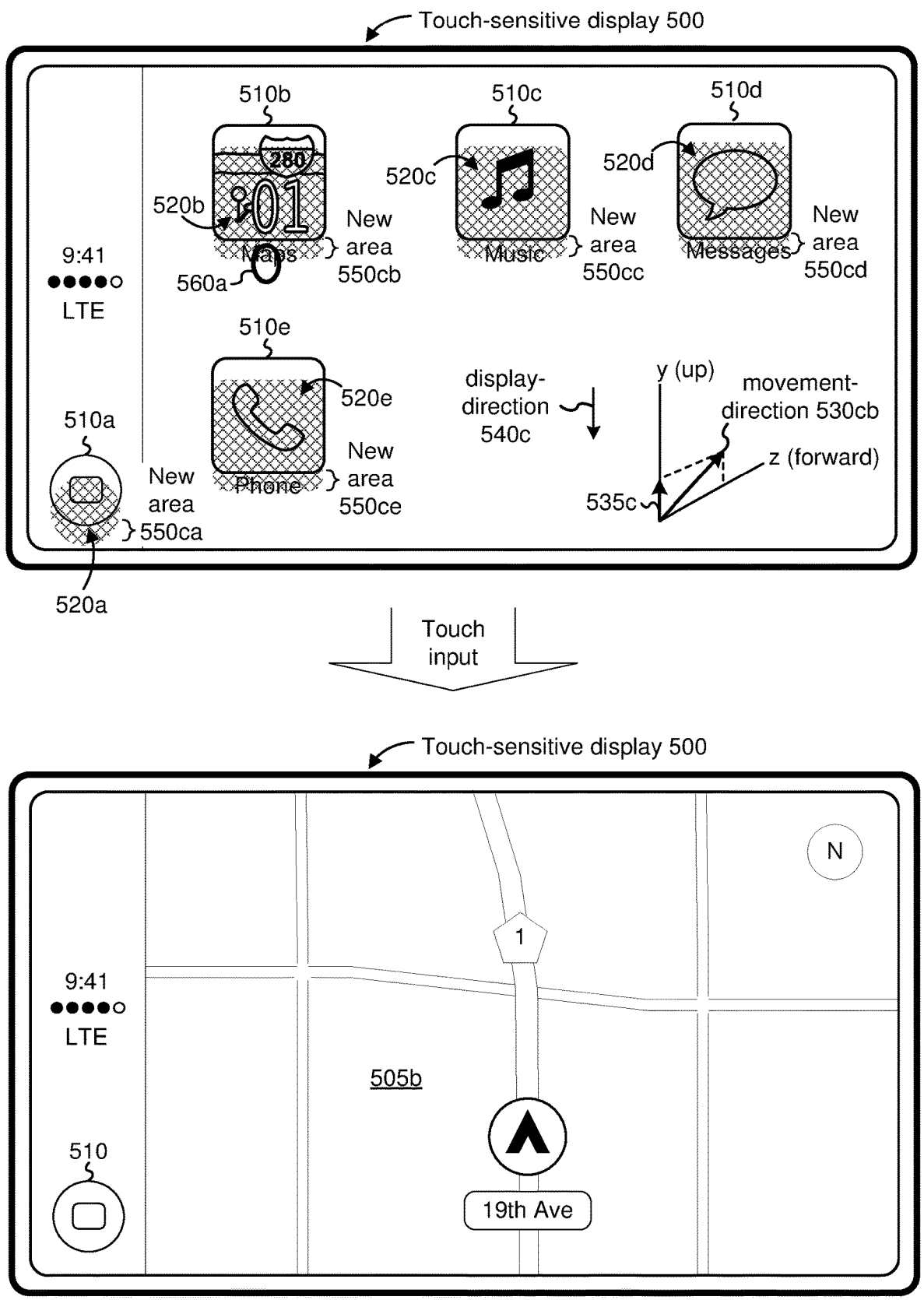
Figure 5E:
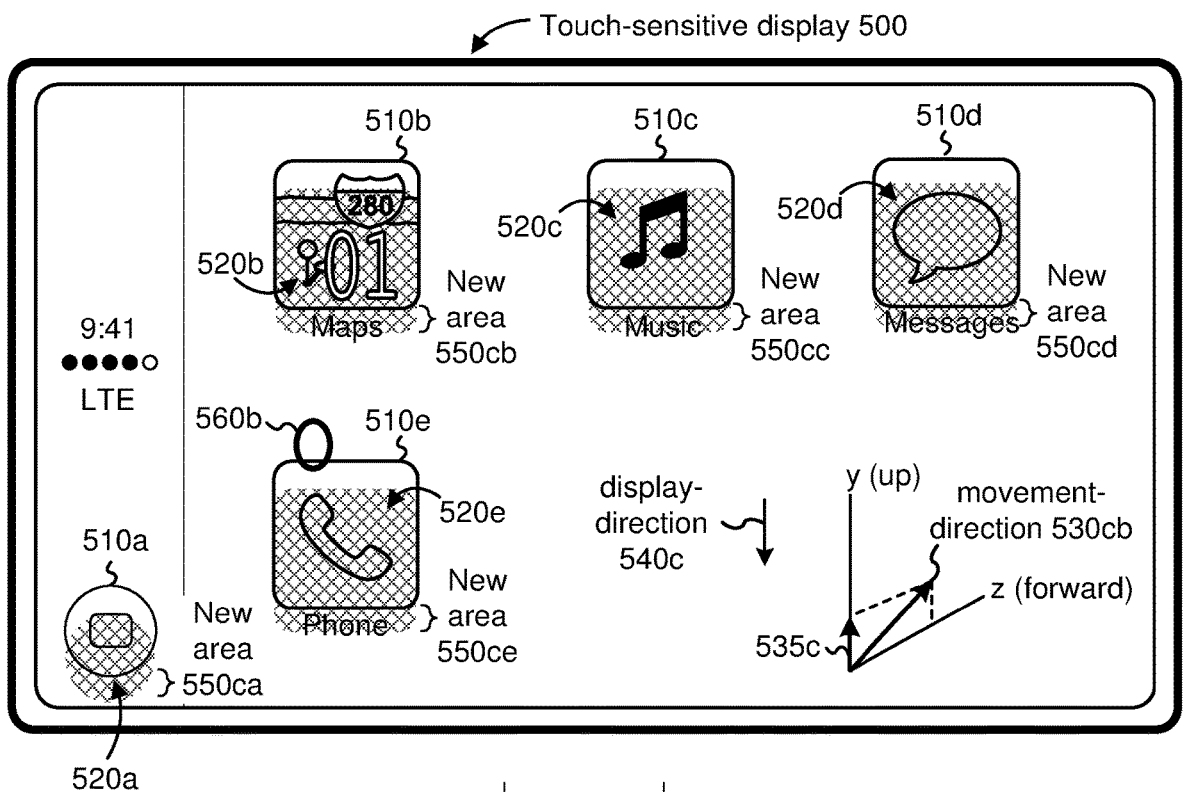
Figure 5E:
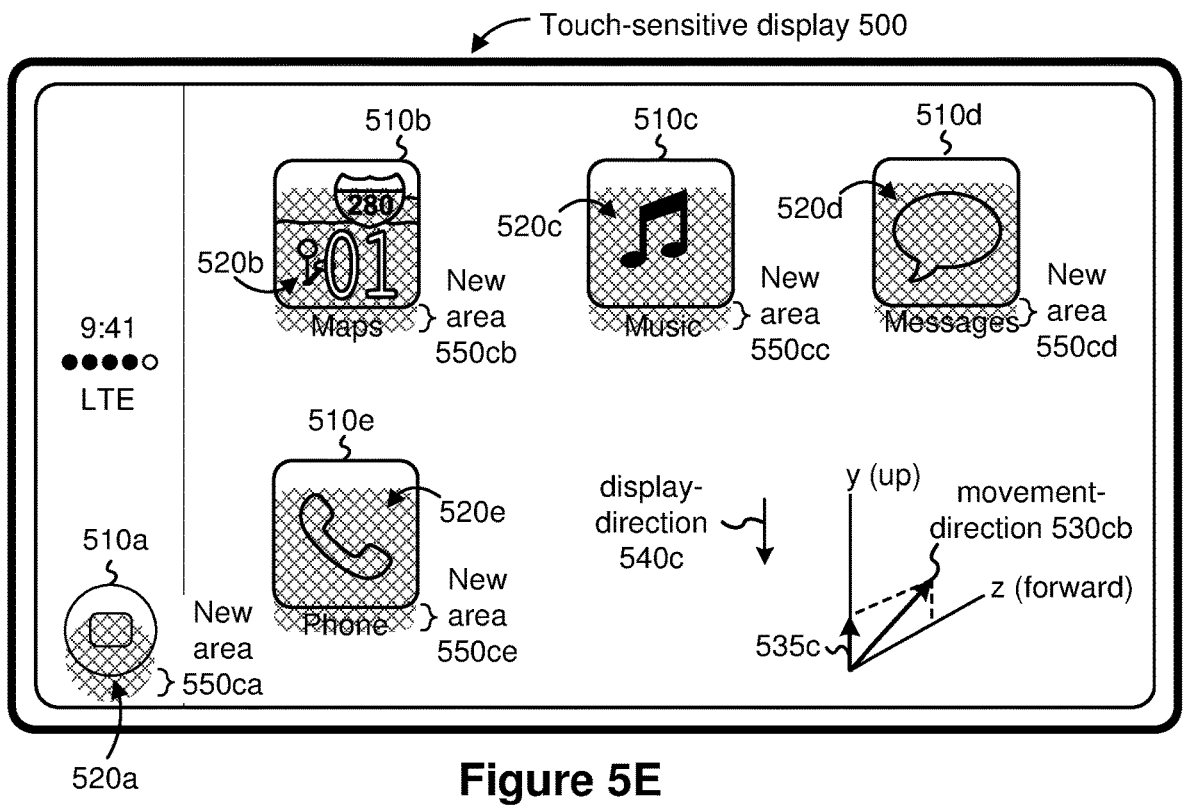
Figure 5F:
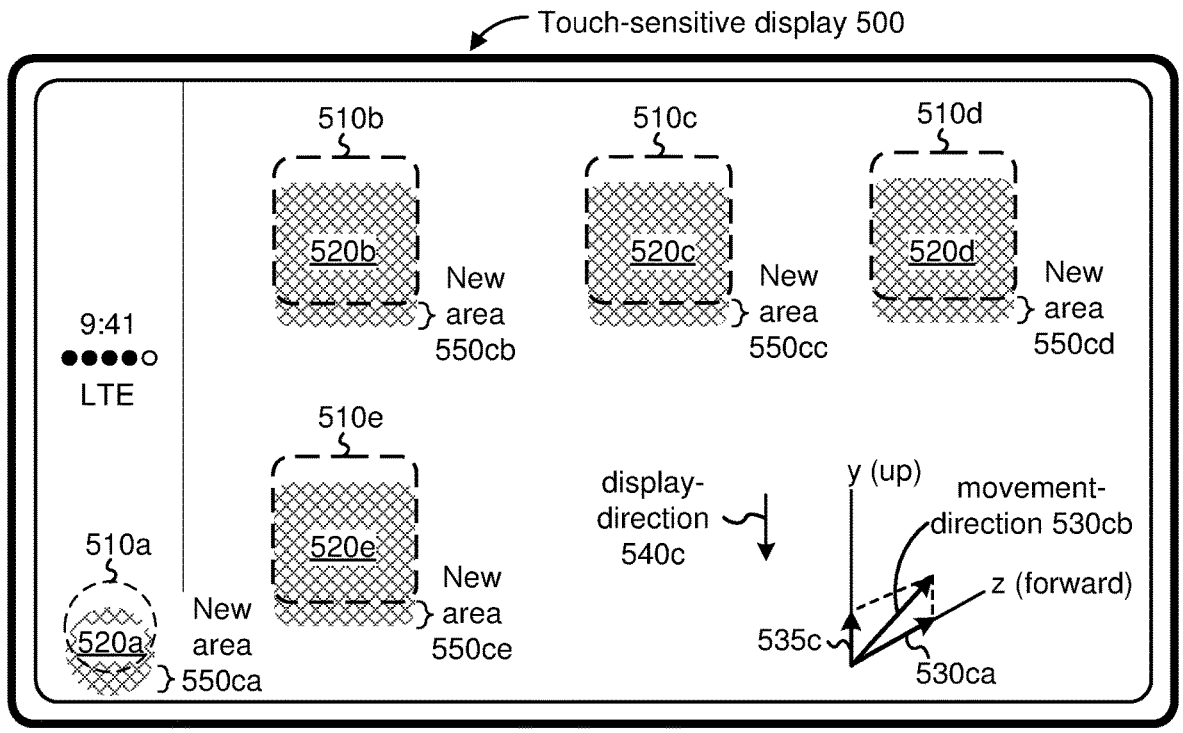
Figure 5F:
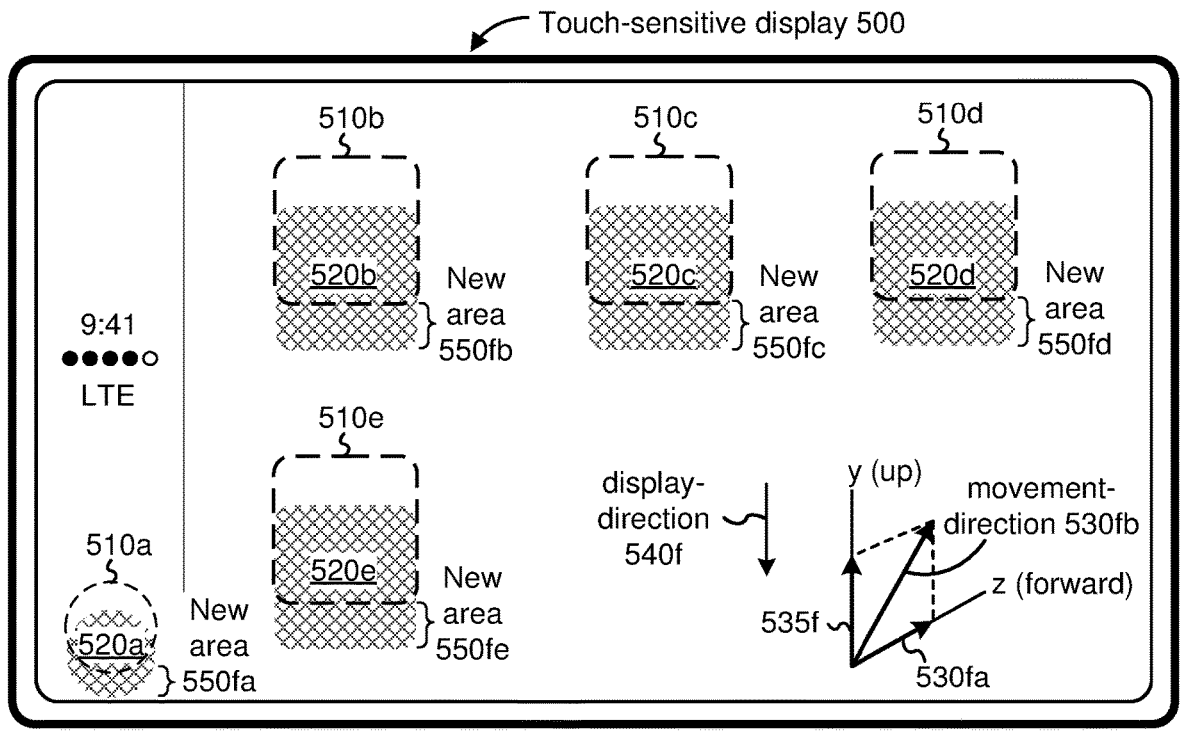
Figure 5G:
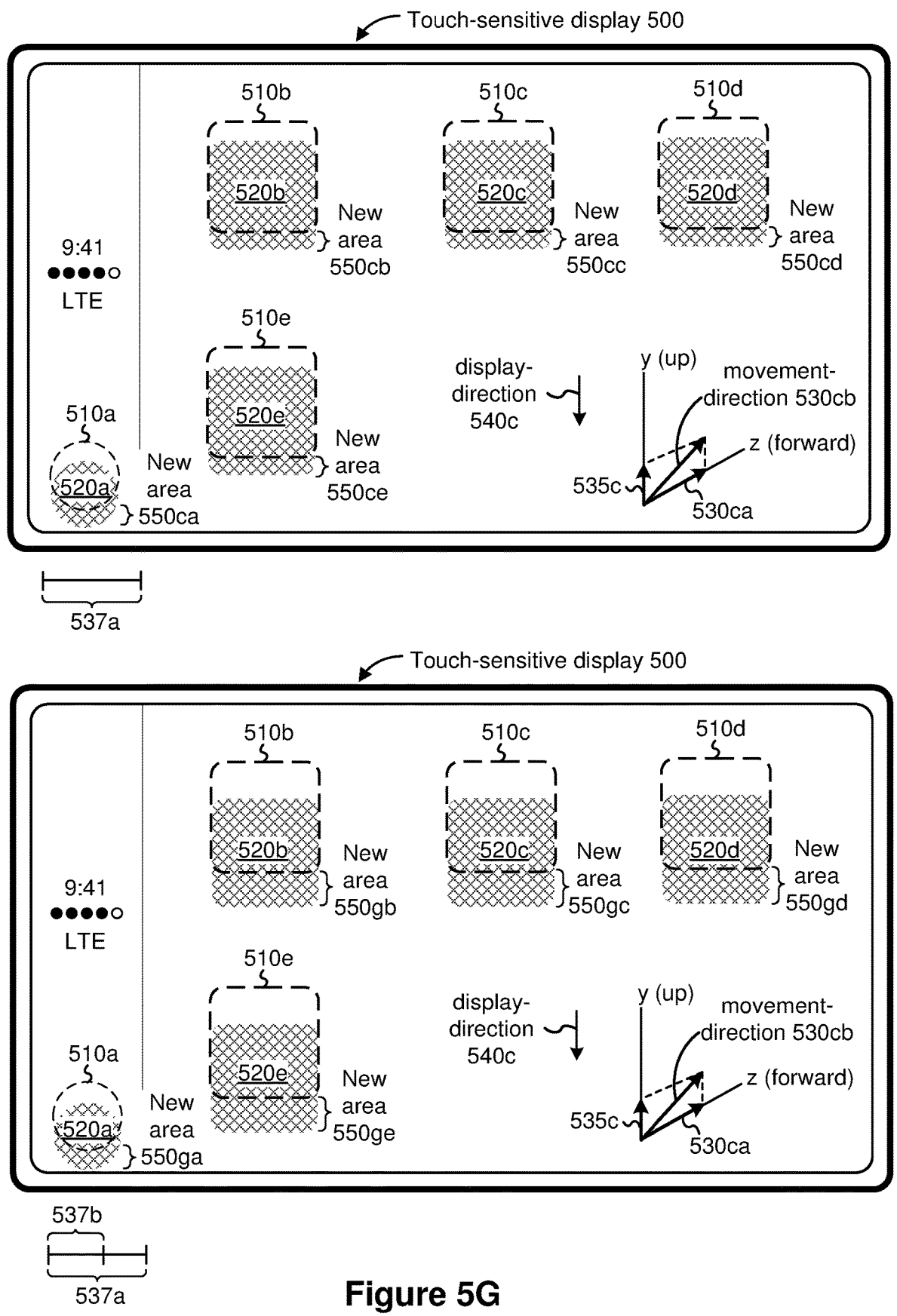
Figure 5H:
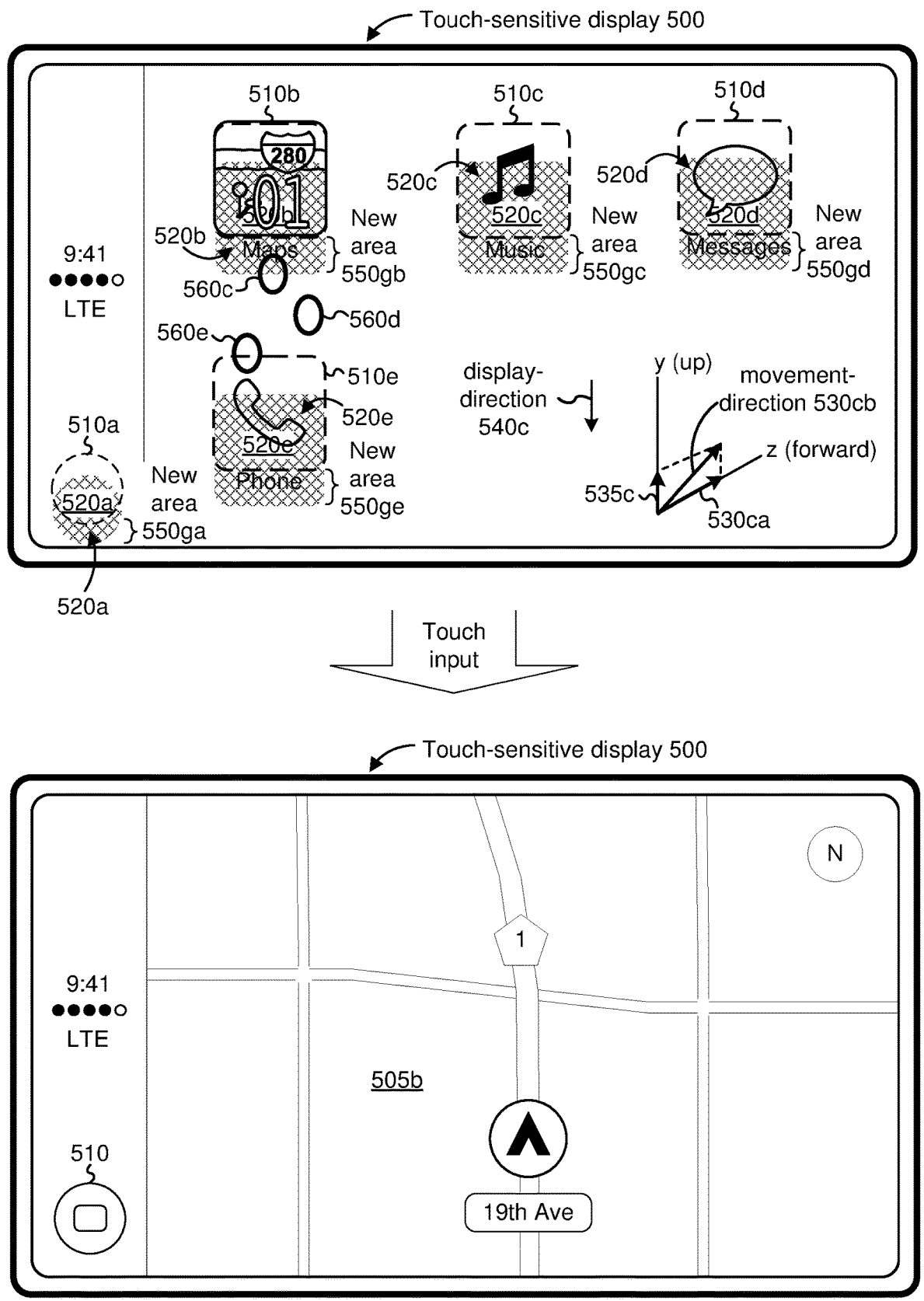
Figure 5I:
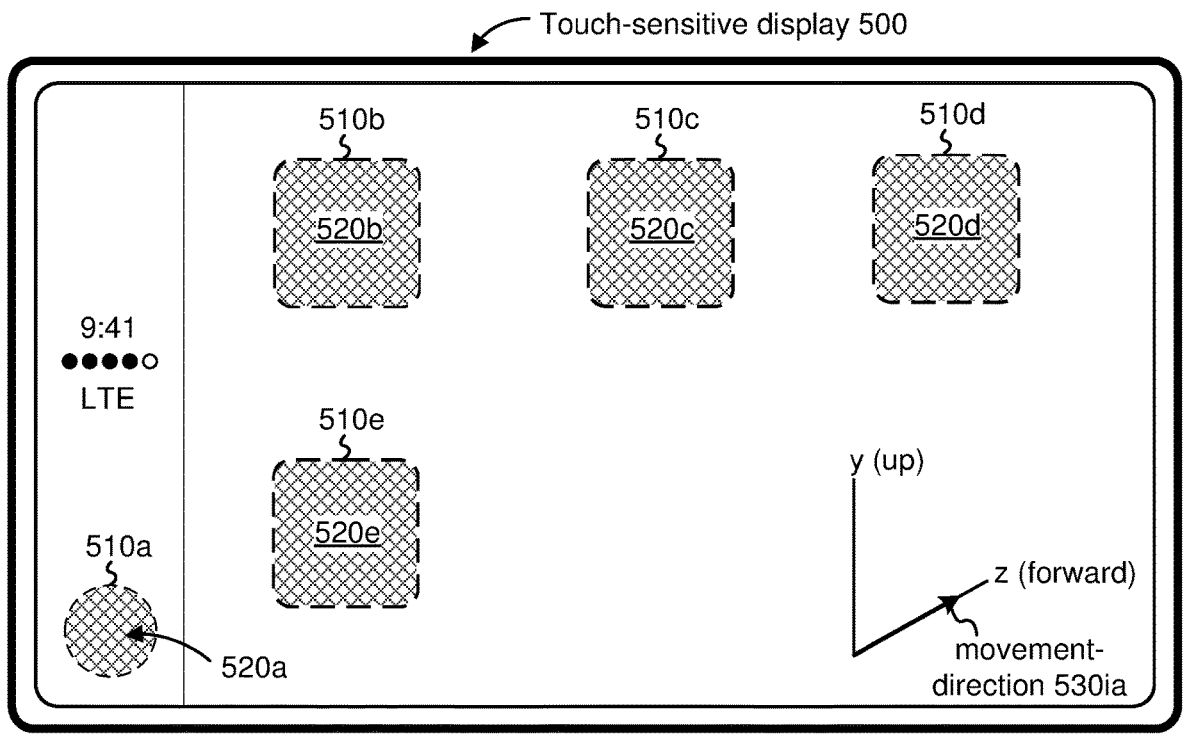
Figure 5I:
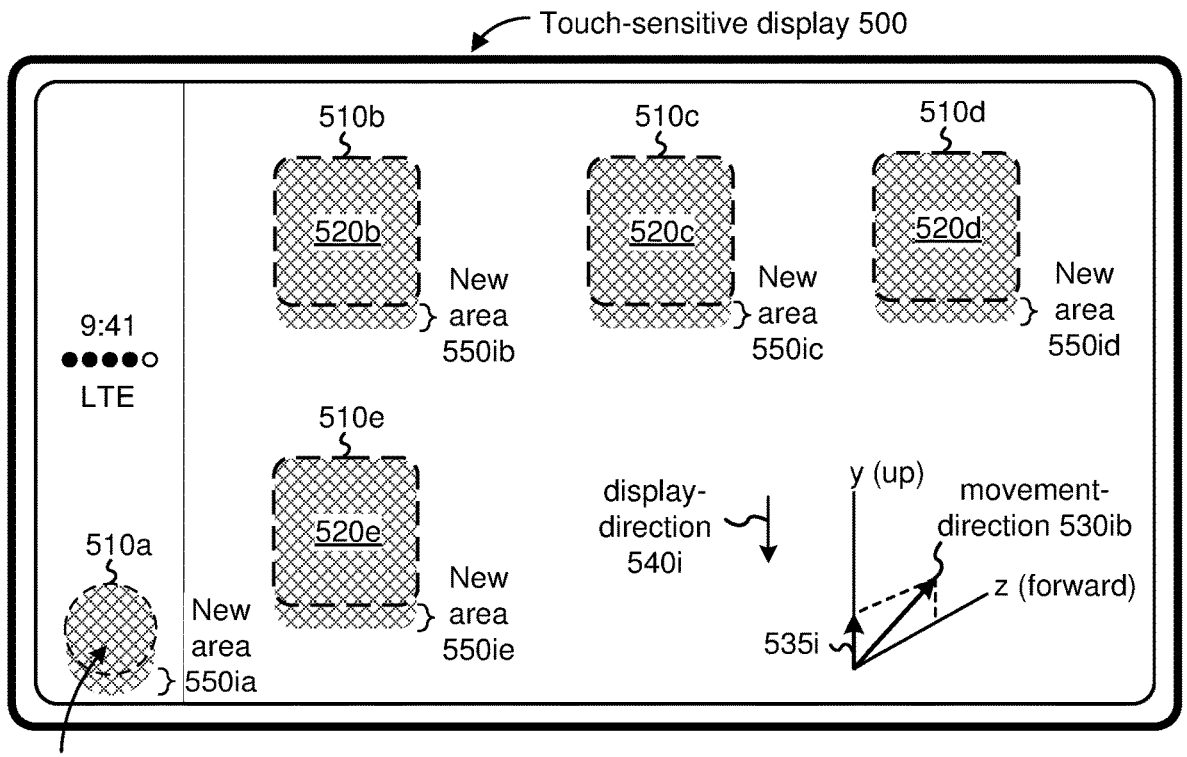
Figure 5J:
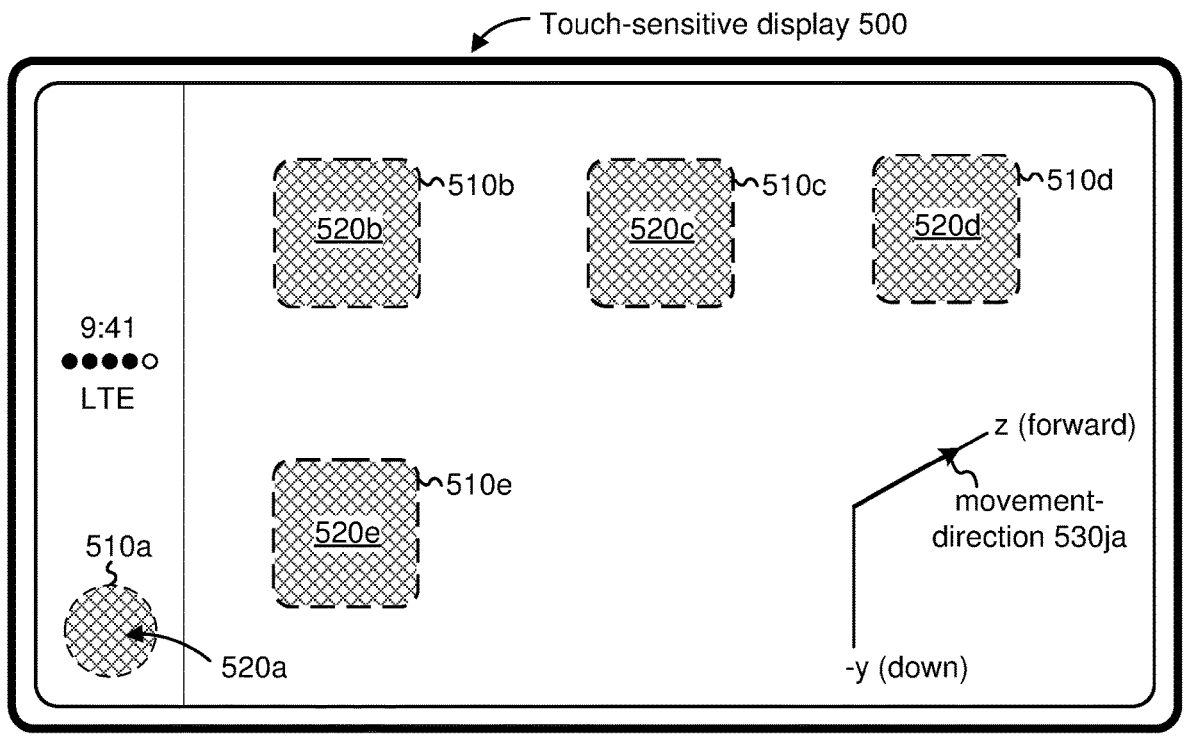
Figure 5J:
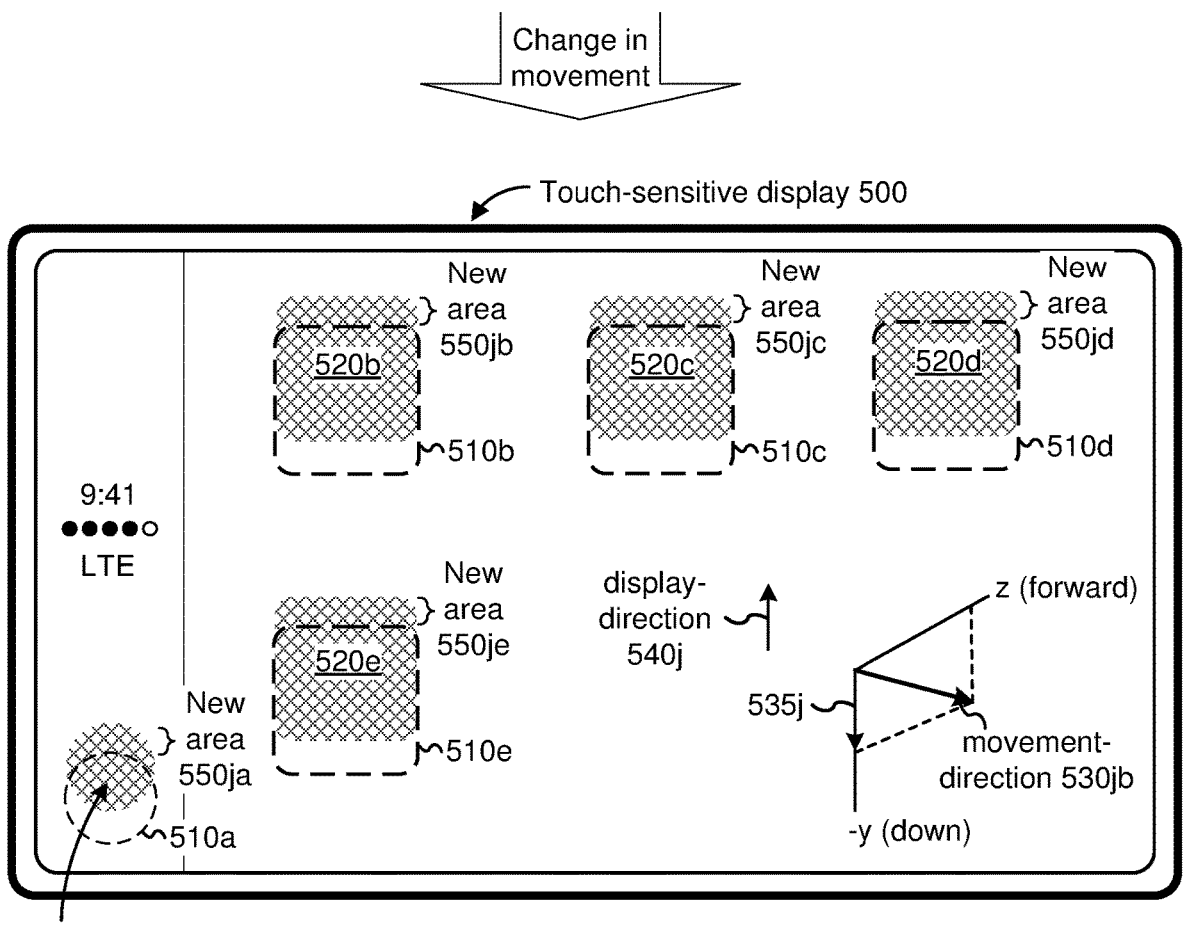
Figure 5K:
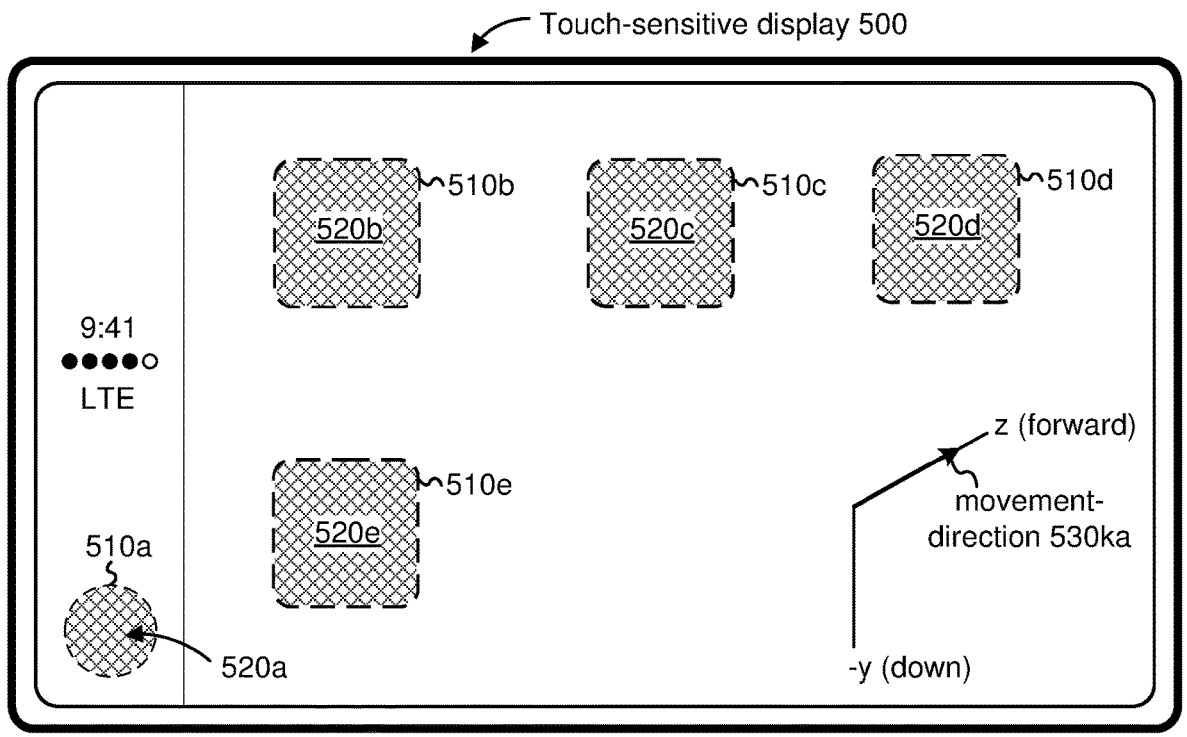
Figure 5K:
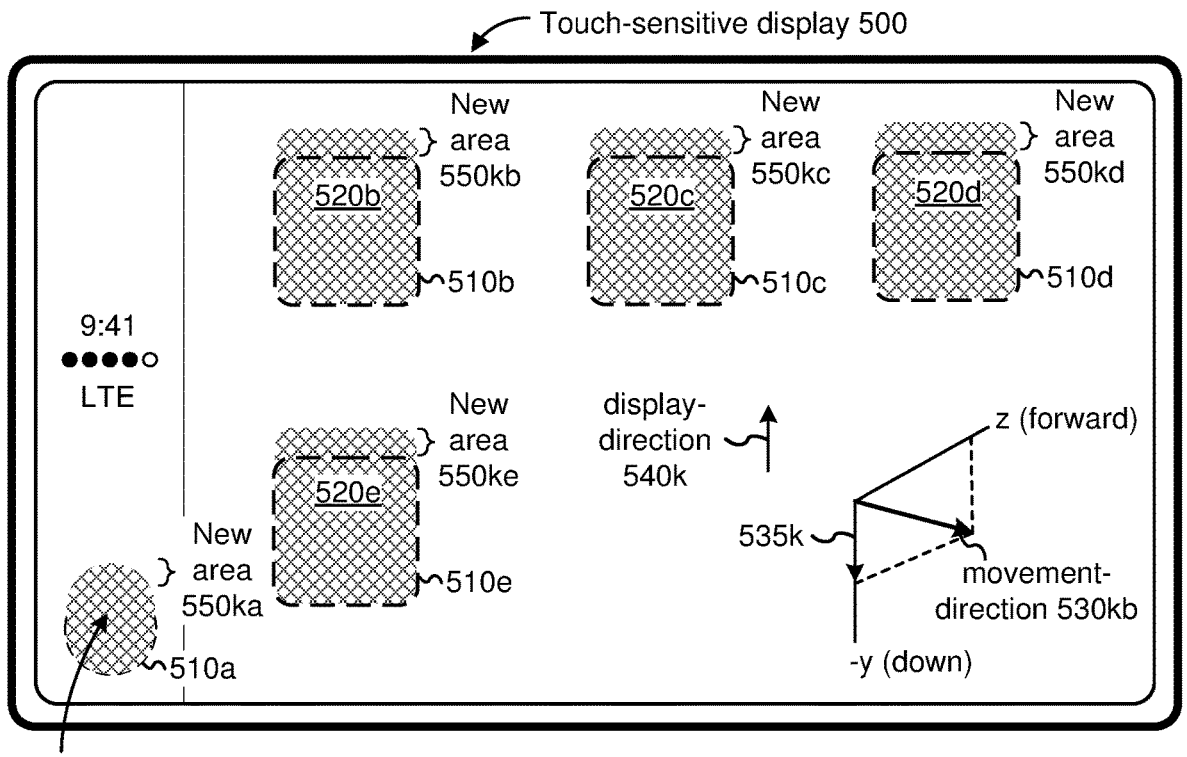
Figure 5L:
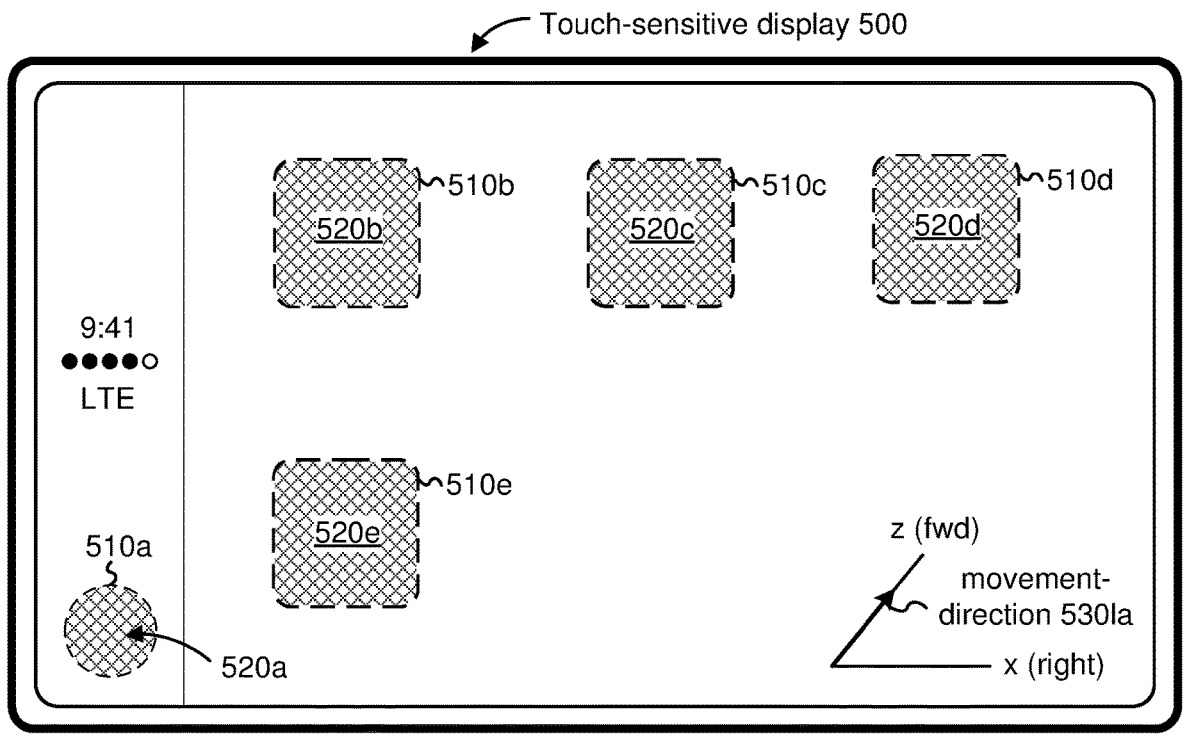
Figure 5L:
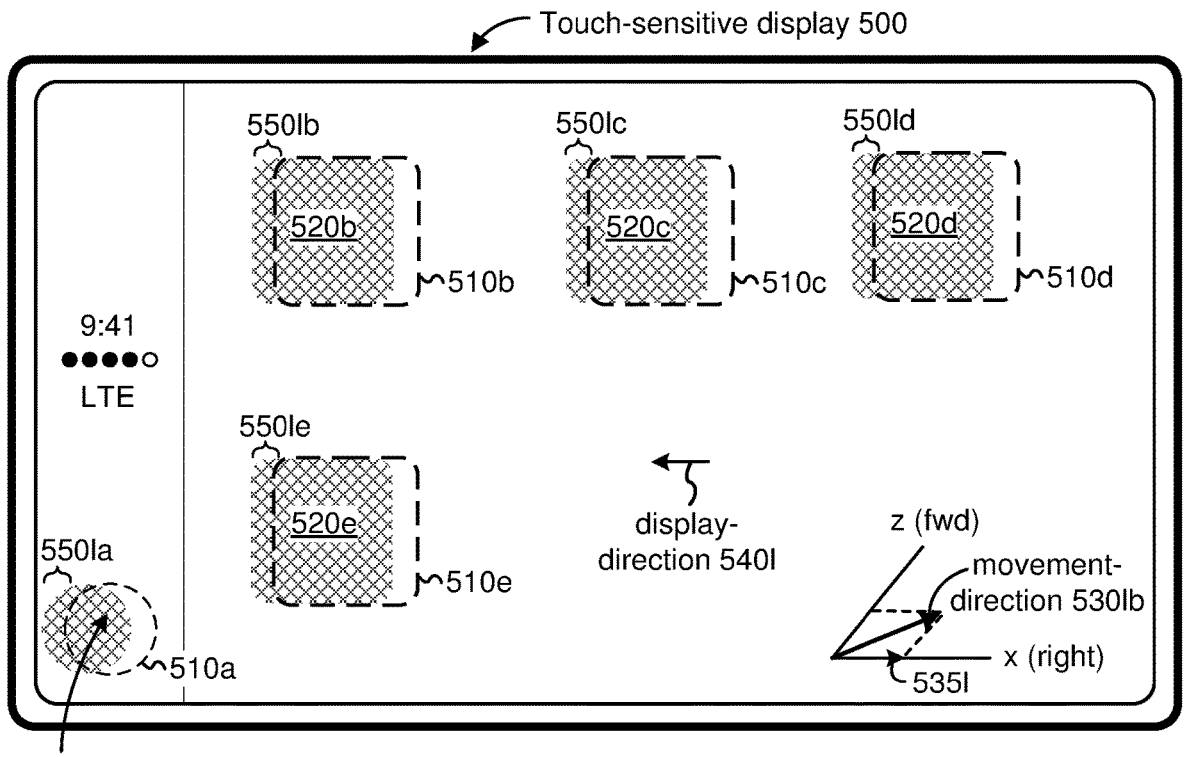
Figure 5M:
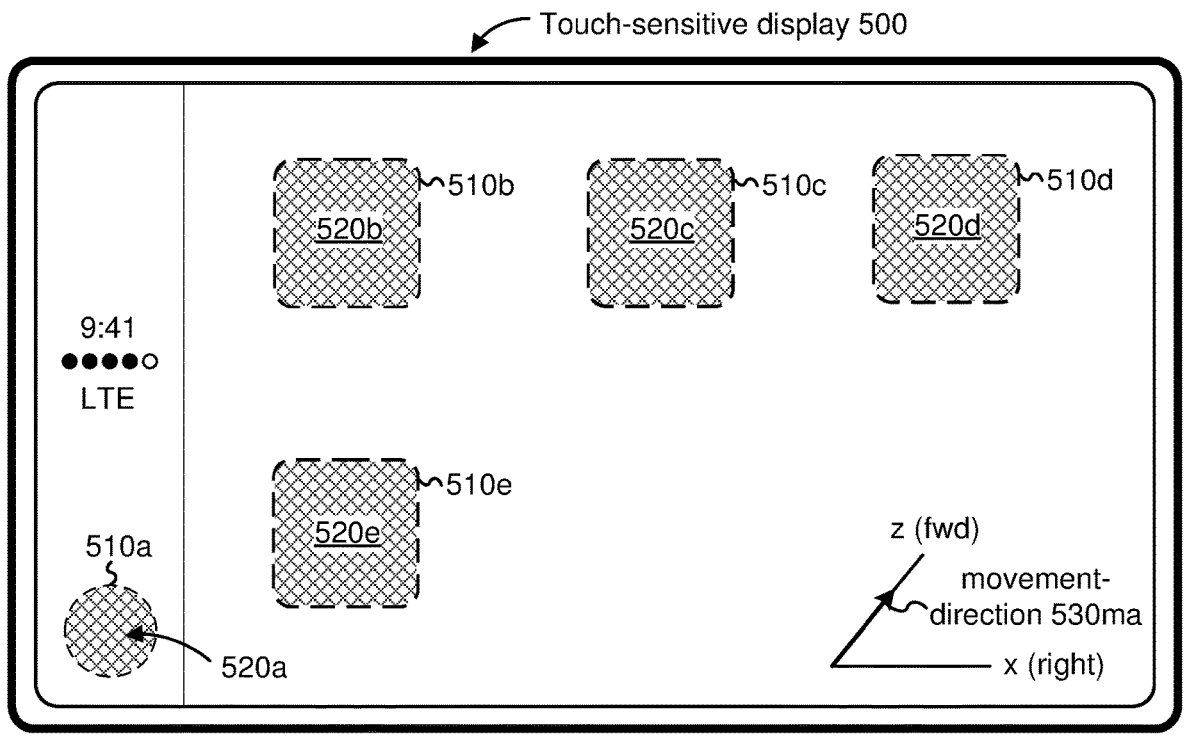
Figure 5M:
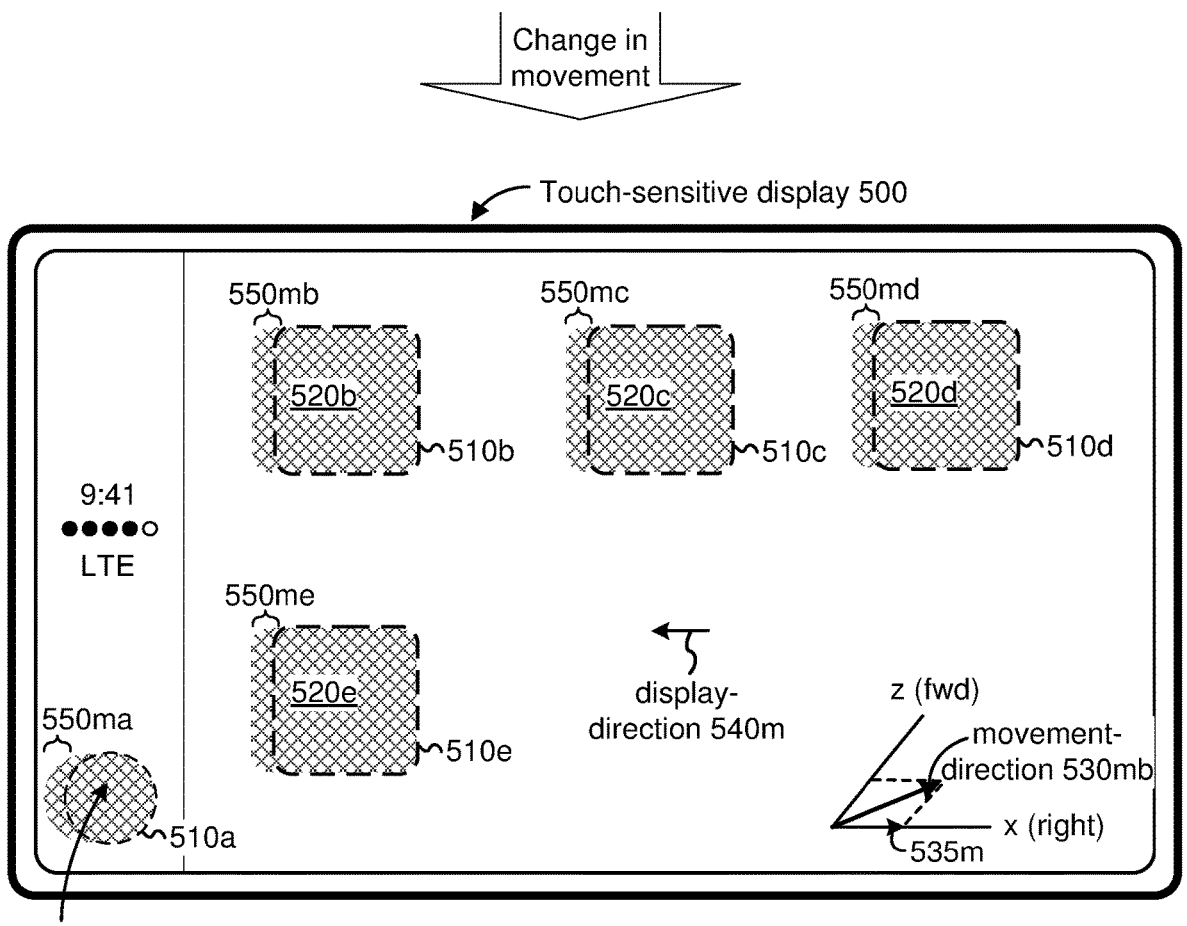
Figure 5N:
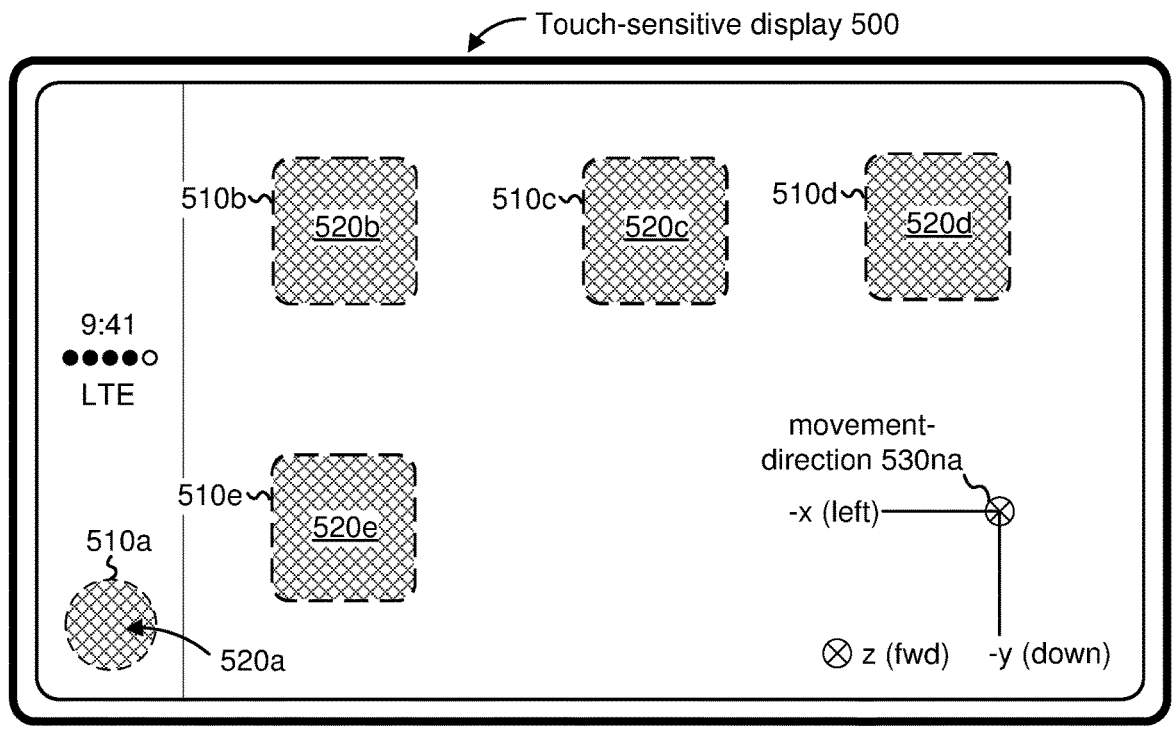
Figure 5N:
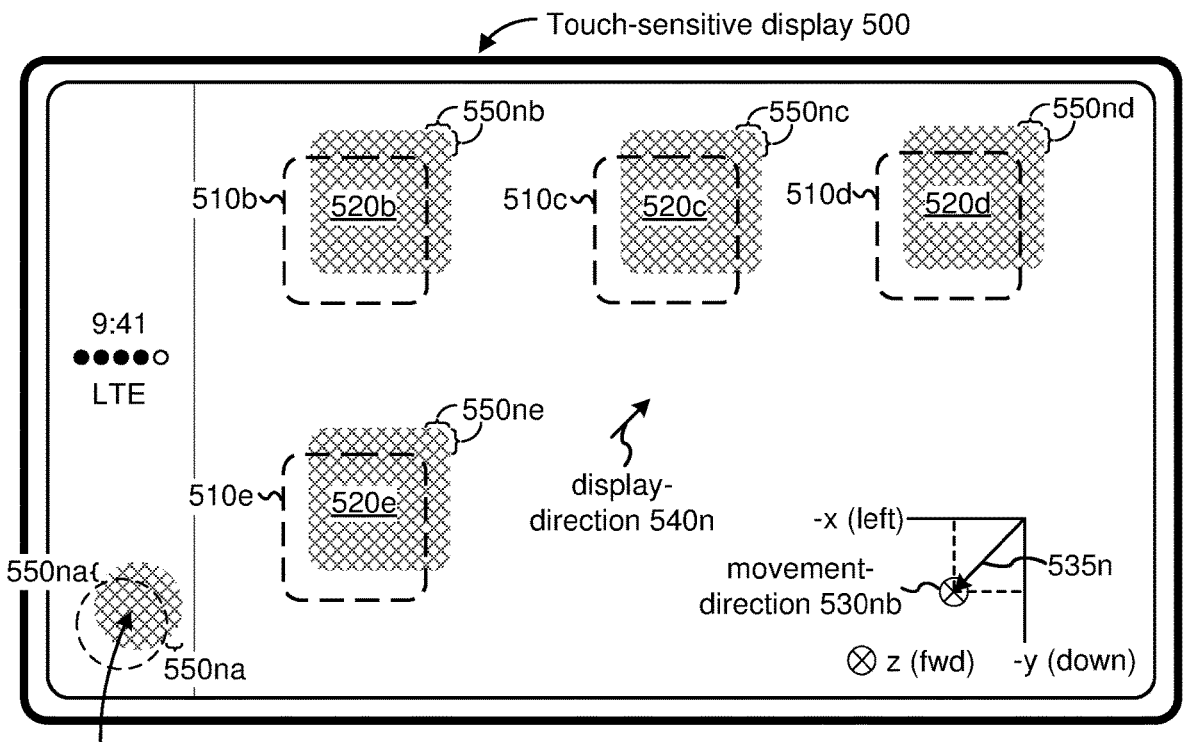
Figure 5O:
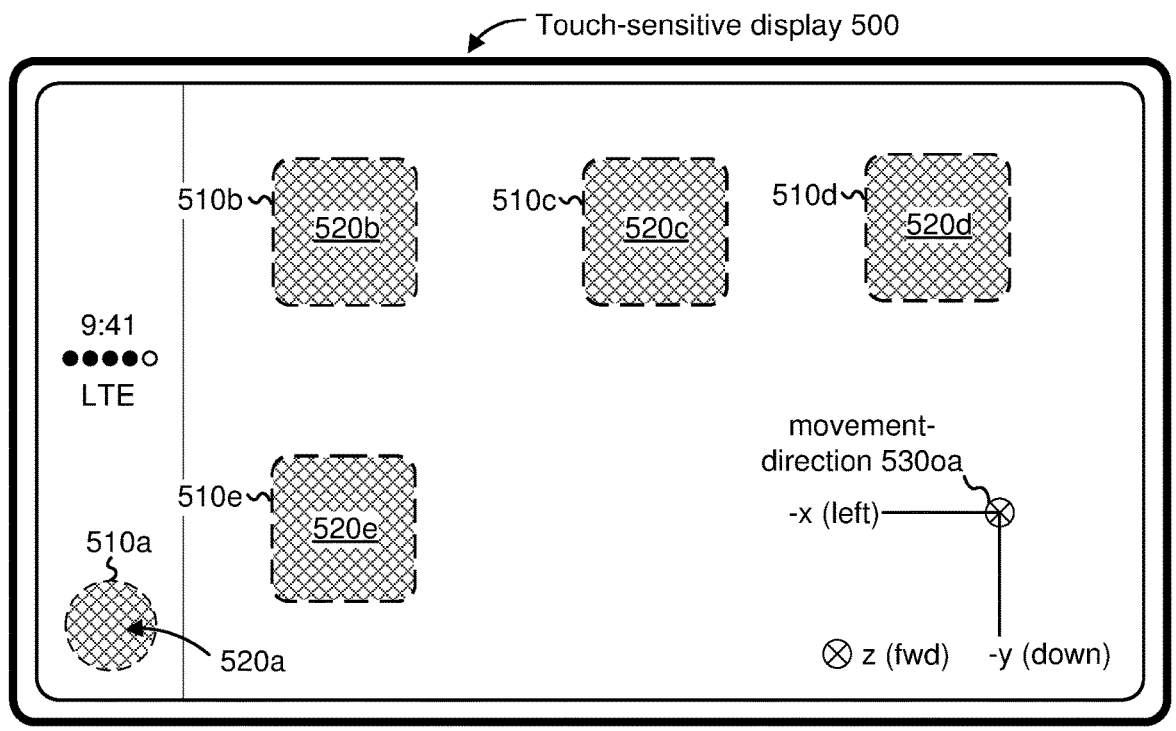
Figure 5O:
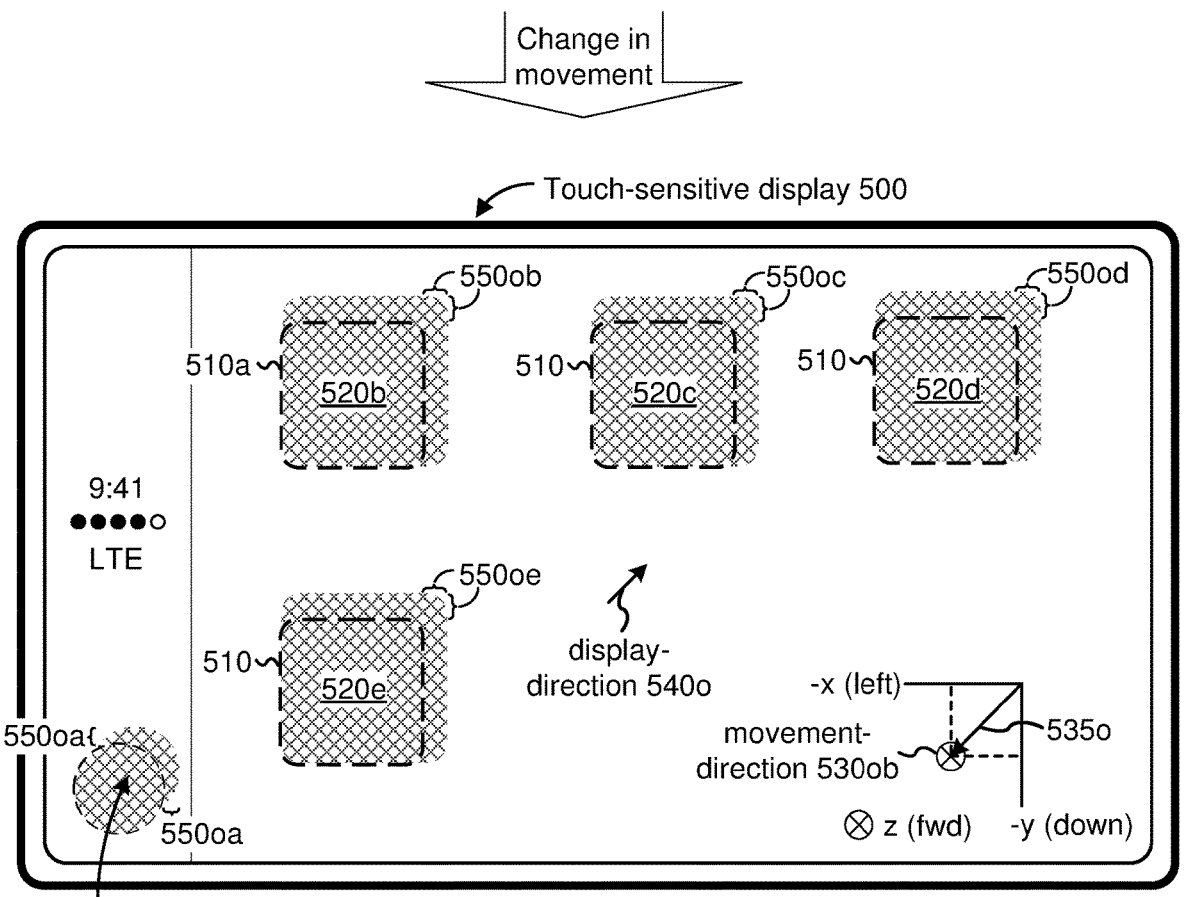
Figure 5P:
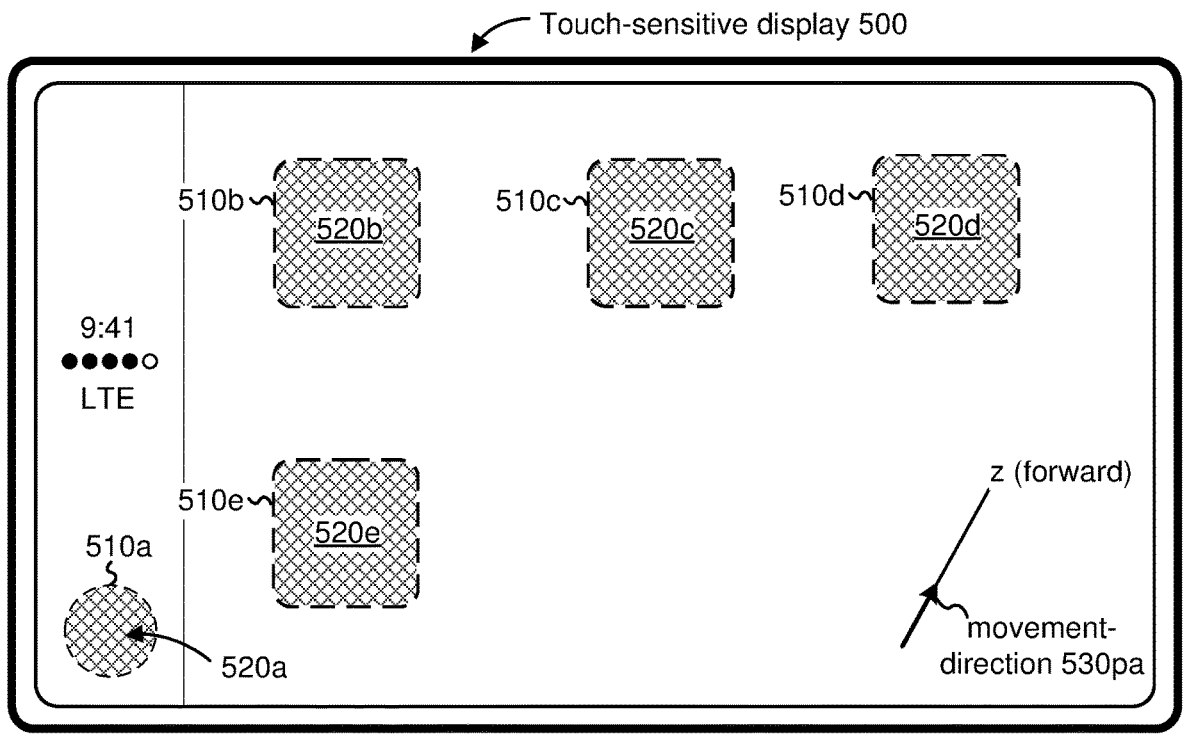
Figure 5P:
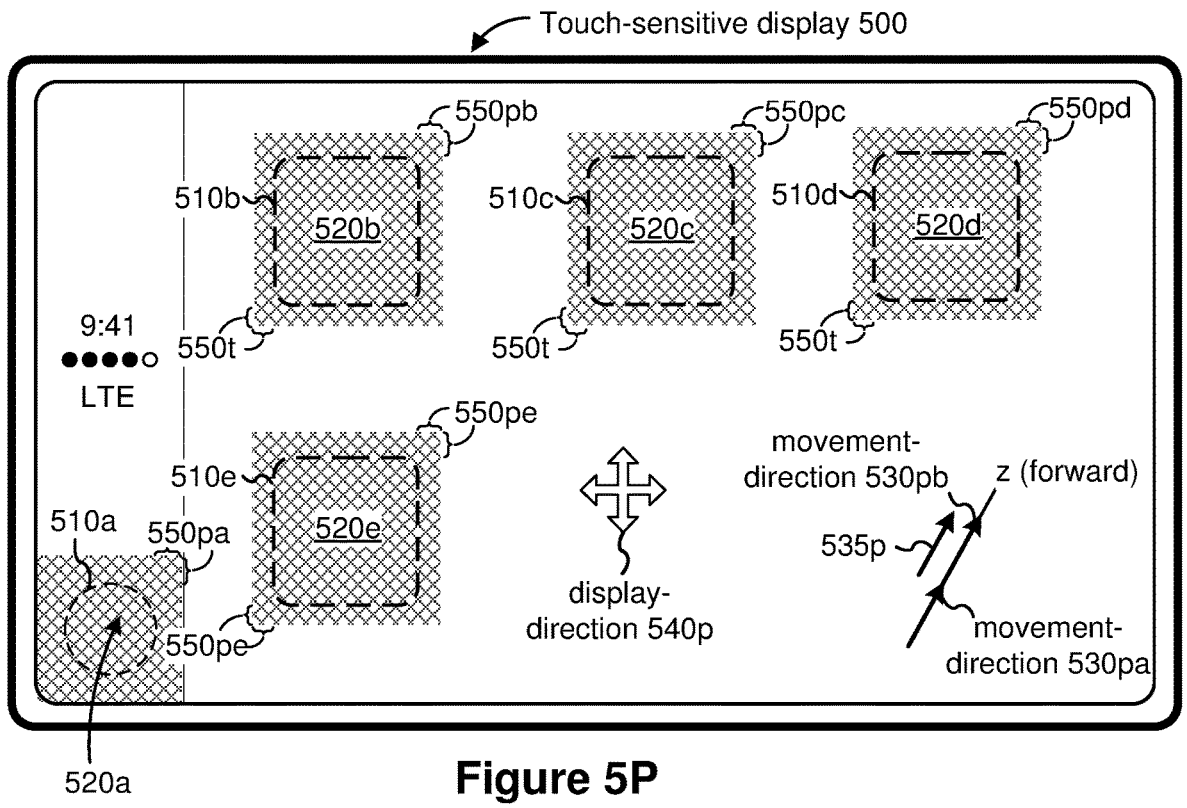
Figure 5Q:
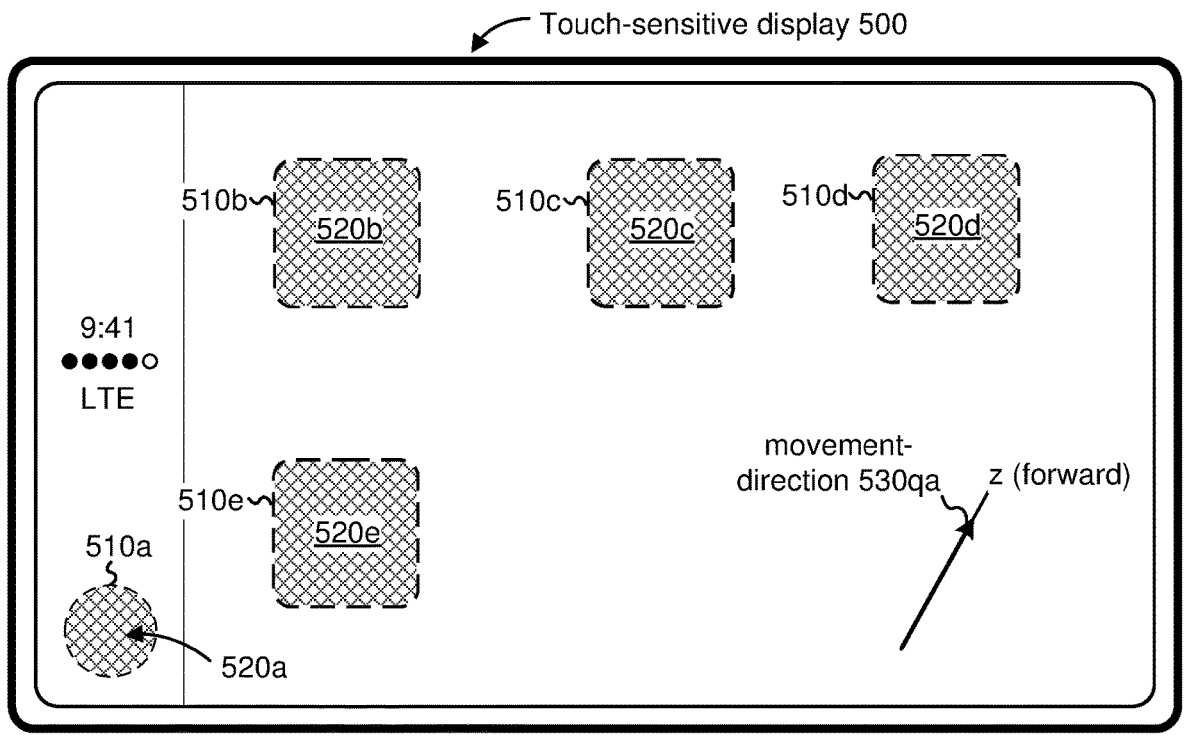
Figure 5Q:
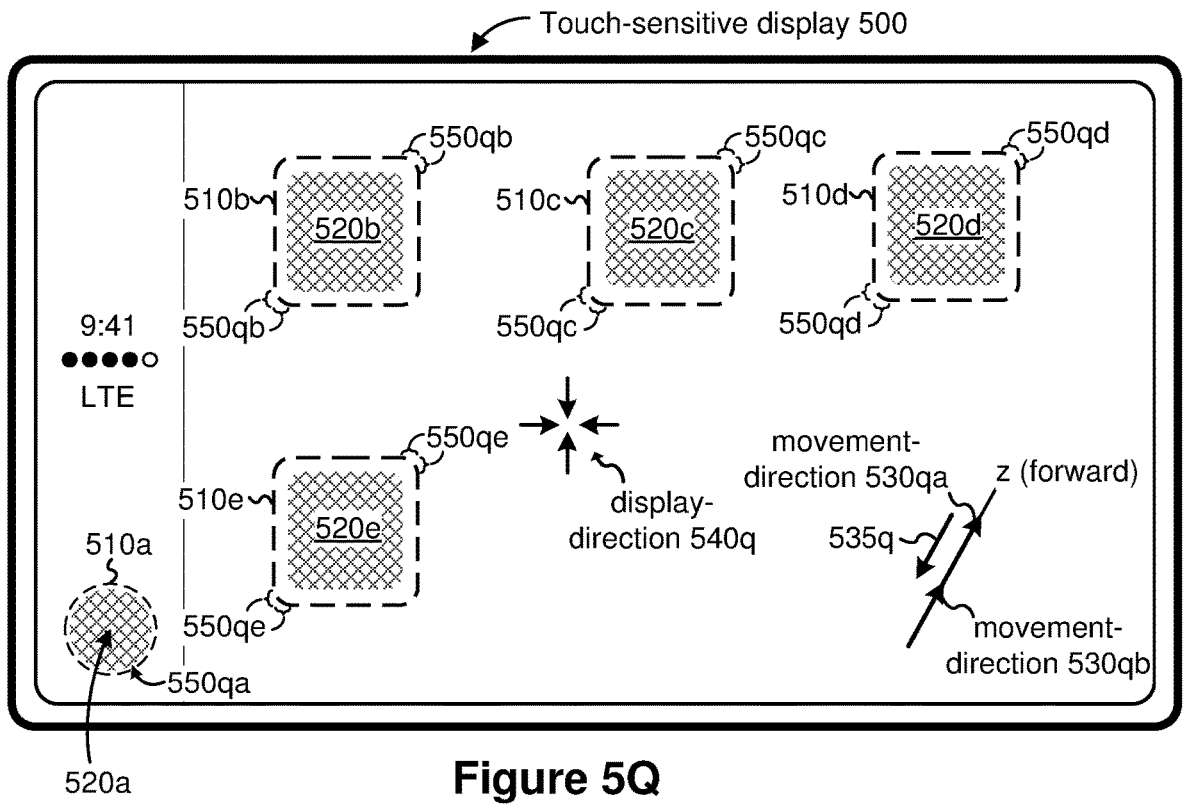
Figure 5R:
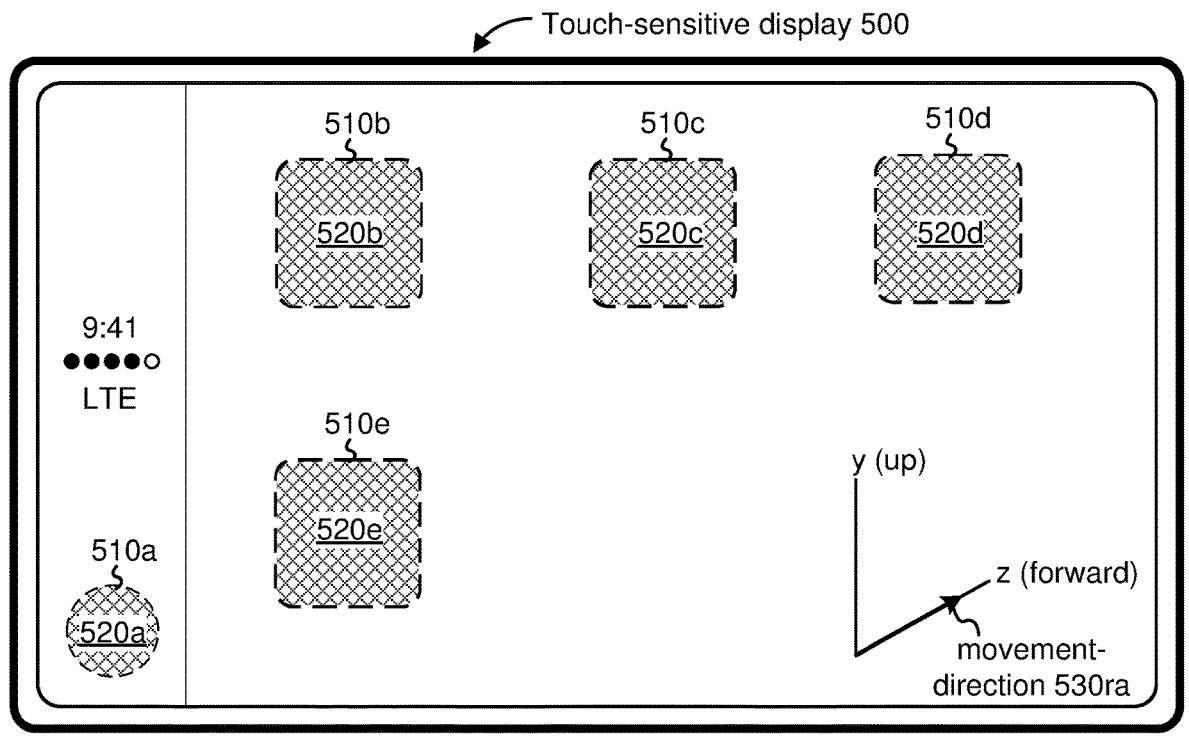
Figure 5R:
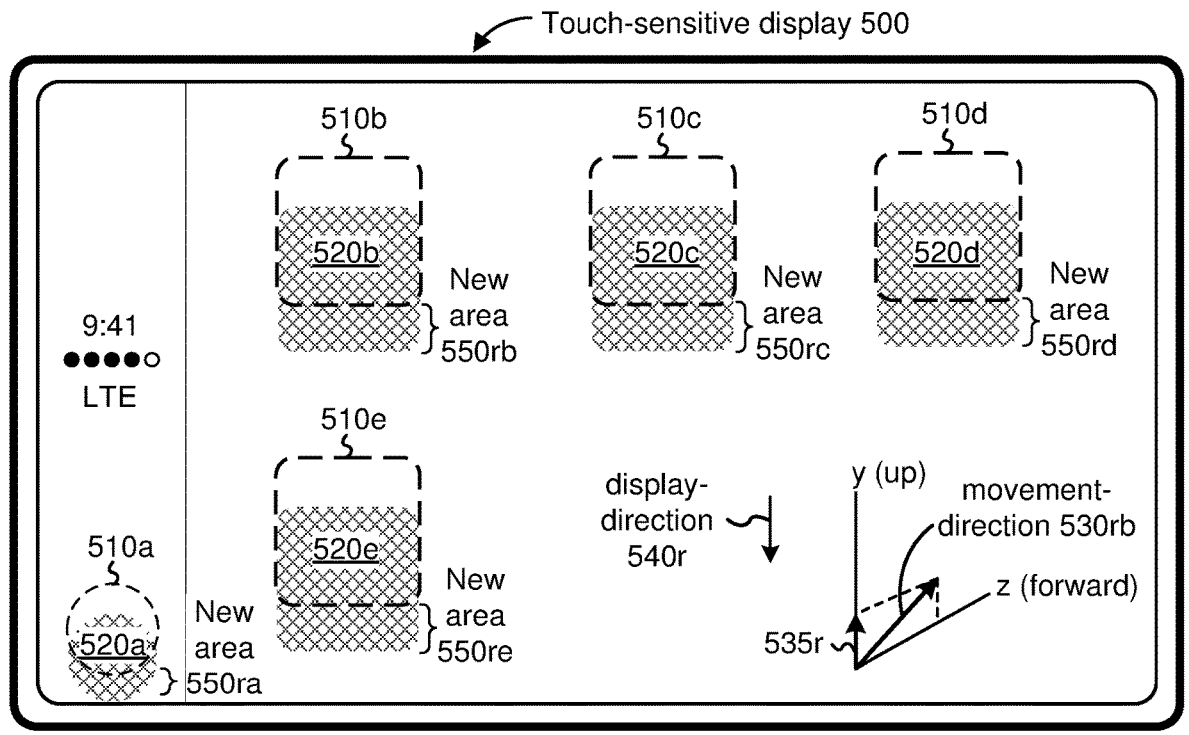
Figure 5S:
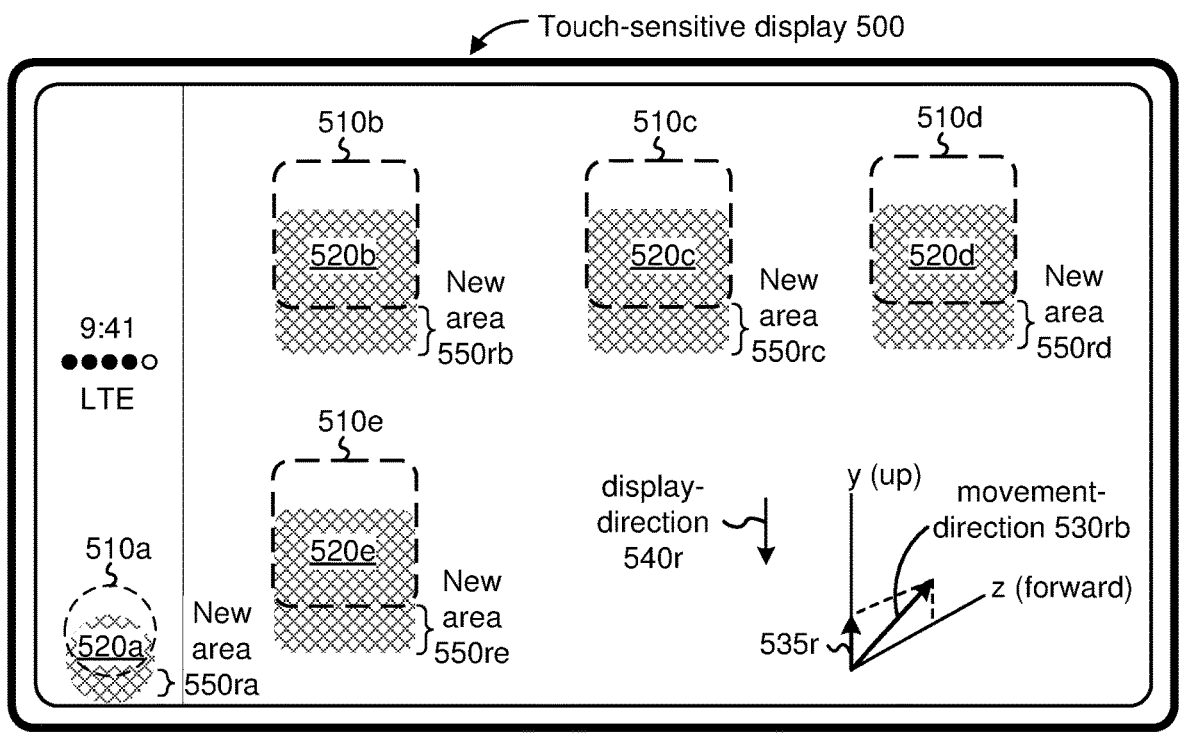
Figure 5S:
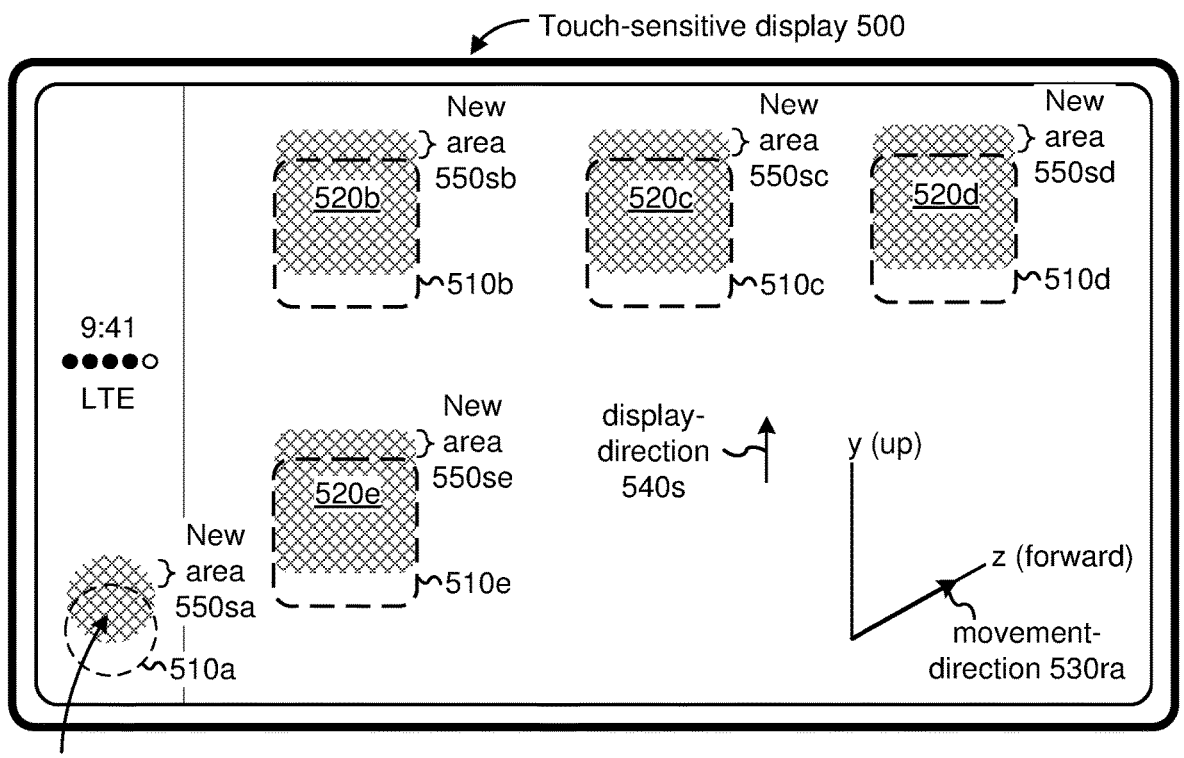
Figure 5T:
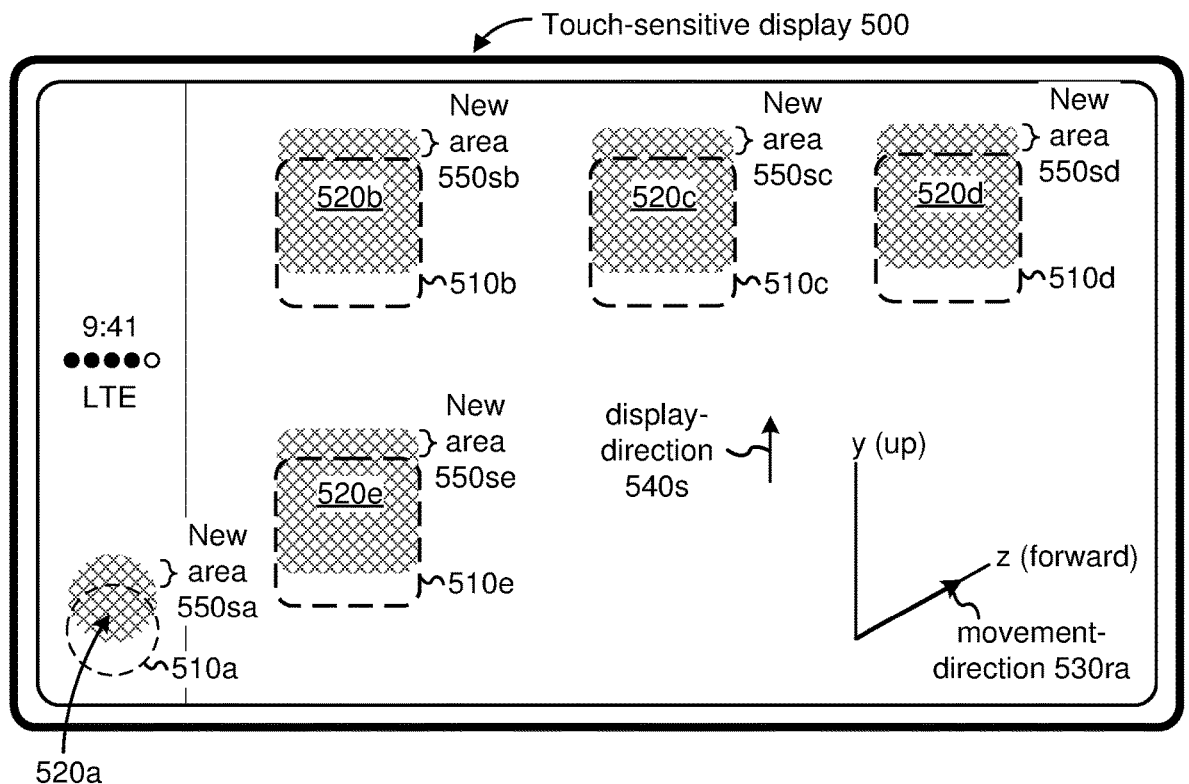
Figure 5T:
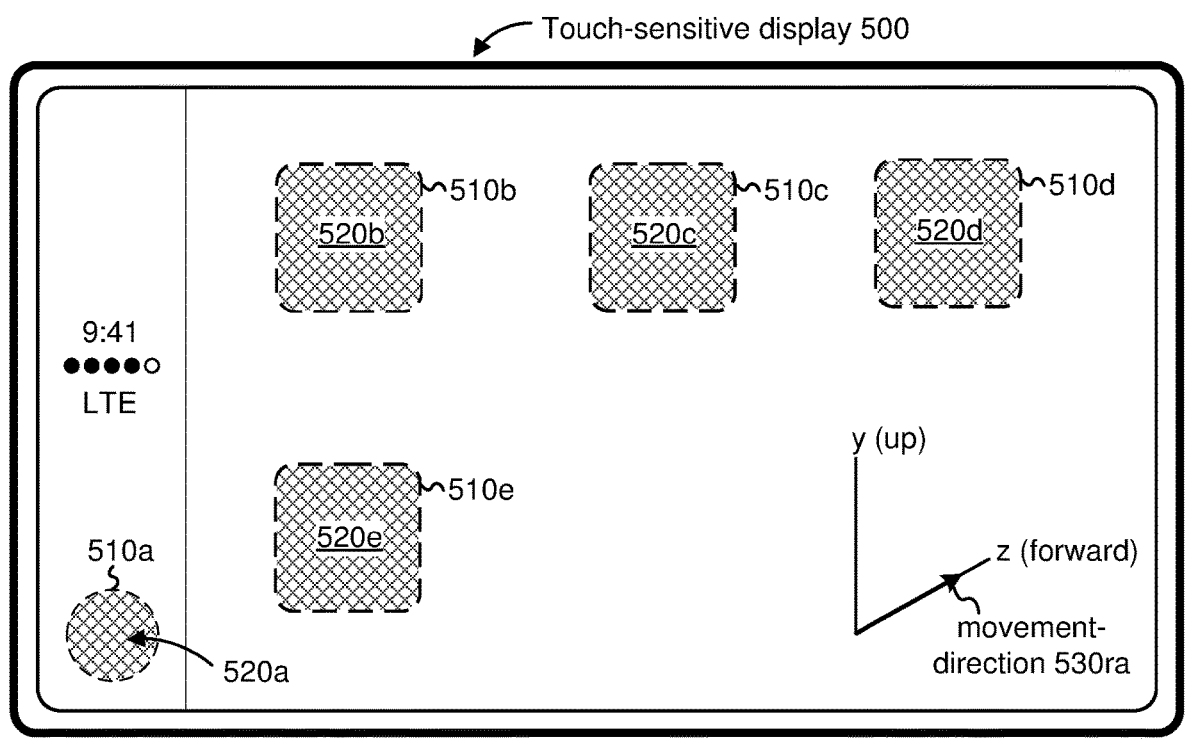
Figure 5U:
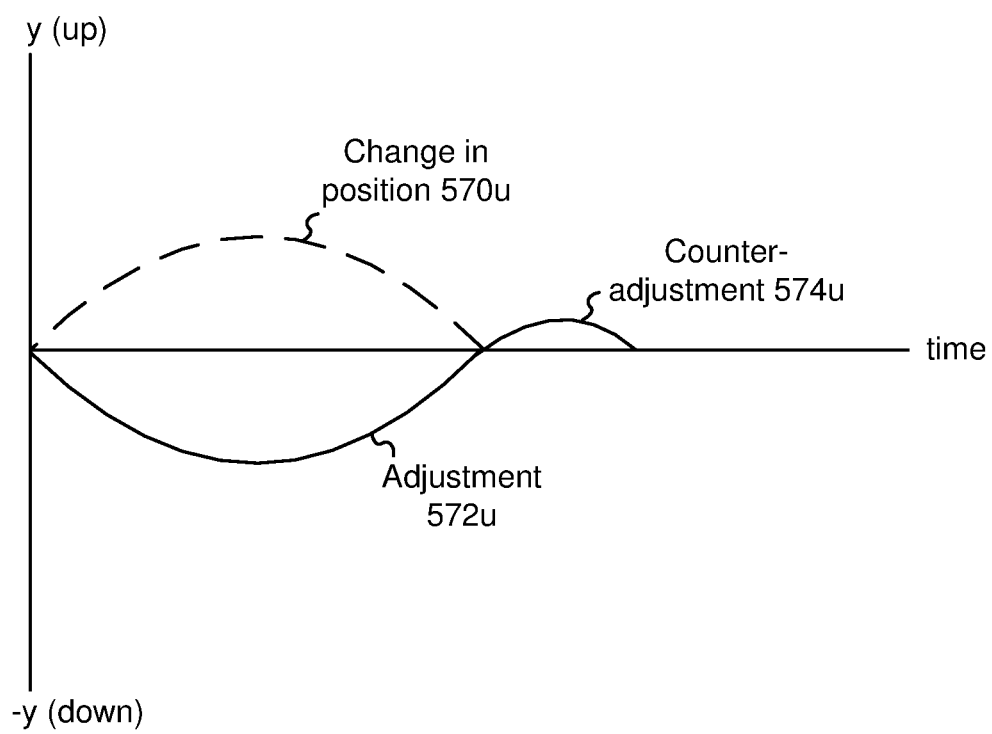

FIGS. 5A-5T illustrate example user interfaces in which touch activation regions associated with selectable user interface elements are adjusted based on a function of a change of movement of the touch-sensitive display. The user interfaces in these figures are used to illustrate the processes described below, including the processes in FIGS. 6A-6F. Although some of the examples which follow will be given with reference to inputs on a touch-sensitive display (where the touch-sensitive surface and the display are combined), in some embodiments, the device detects inputs on a touch-sensitive surface 451 that is separate from the display 450, as shown in FIG. 4B. In some embodiments, the device that adjusts the touch activation regions is separate from the touch-sensitive display that displays the selectable user interface elements. In such embodiments, the device communicates the adjustments to the touch-sensitive display via a wired communication channel (e.g., a cable) and/or via a wireless communication channel (e.g., via Bluetooth, Wi-Fi, NFC, etc.). In some embodiments, the device that adjusts the touch activation regions includes the touch-sensitive display that displays the selectable user interface elements. In some embodiments, the operations and/or methods described herein are performed by the touch-sensitive display and/or by a first device that includes the touch-sensitive display. Additionally or alternatively, the operations and/or methods described herein are performed by a second device that is separate from the first device that includes the touch-sensitive display.

FIGS. 5A-5B illustrate user interfaces that display various selectable user interface elements that are associated with corresponding touch activation regions. FIG. 5A illustrates a touch-sensitive display 500 ("display 500", hereinafter for the sake of brevity). In some embodiments, the display 500 is similar to the touch-sensitive display system 112 shown in FIG. 1A. In the example of FIG. 5A, the display 500 displays a user interface 505 that includes various selectable user interface elements. In some embodiments, the selectable user interface elements include checkboxes, radio buttons, dropdown lists, list boxes, buttons, toggles, text fields, data fields, and/or icons. In some embodiments, the selectable user interface elements include icons that function similar to the icons 416-446 shown in FIG. 4A. In the example of FIG. 5A, the selectable user interface elements include:

- a selectable user interface element 510a representing a home button that launches a home screen in response to a touch input of the home button, and/or launches a voice assistant in response to a touch-and-hold input of the home button;
- a selectable user interface element 510b representing an icon, labeled "Maps", which functions similar to the icon 436 shown in FIG. 4A (e.g., a touch input of the selectable user interface element 510b triggers the launch of the map module 154);
- a selectable user interface element 510c representing an icon, labeled "Music", that can trigger the launch of the video and music player module 152 in response to a touch input;
- a selectable user interface element 510d representing an icon, labeled "Messages", which functions similar to the icon 424 shown in FIG. 4A (e.g., a touch input of the selectable user interface element 510d triggers the launch of the instant messaging module 141); and
- a selectable user interface element 510e representing an icon, labeled "Phone", which functions similar to the icon 416 shown in FIG. 4A (e.g., a touch input of the selectable user interface element 510e triggers the launch of the telephone module 138).

FIG. 5B illustrates touch activation regions 520a-520e that correspond with respective selectable user interface elements 510a-510e. In other words, in some embodiments, each of selectable user interface elements 510a-510e is associated with one of the corresponding touch activation region 520a-520e. In some embodiments, the selectable user interface elements are associated with respective user interface operations. In such embodiments, a device (e.g., the device 100 shown in FIG. 1A and/or the device 300 shown in FIG. 3) in communication with the touch-sensitive display 500 detects a touch input within a touch activation region that corresponds with a selectable user interface element. In response to detecting the touch input within the touch activation region corresponding with a selectable user interface element, the device performs a user interface operation associated with the selectable user interface element. For example, the device presents a home screen in response to detecting a touch input within the touch activation region 520a associated with the selectable user interface element 510a (e.g., the home button). In the example of FIGS. 5A-5B, the selectable user interface elements 510a-510e and their corresponding touch activation regions 520a-520e completely overlap each other. In some embodiments, the selectable user interface elements and their corresponding touch activation regions only partially overlap each other.

FIGS. 5A-5B illustrate a movement-direction 530 of the touch-sensitive display 500. In the example of FIGS. 5A-5B, the touch-sensitive display 500 is moving forward. In some embodiments, the touch-sensitive display 500 is disposed inside a vehicle (e.g., an automobile). In some examples, the touch-sensitive display 500 is mounted on a dashboard of the vehicle. In such embodiments, the movement-direction 530 of the touch-sensitive display 500 indicates a direction in which the vehicle is moving. In some embodiments, the touch-sensitive display 500 is held by a user, and the movement-direction 530 indicates a direction in which the user is moving. In some embodiments, the device determines the movement-direction 530 of the touch-sensitive display 500 based on data recorded by one or more sensors. In some examples, the device determines the movement-direction 530 of the touch sensitive display 500 based on data recorded by an accelerometer (e.g., the accelerometer(s) 167 shown in FIG. 1A), a gyroscope (e.g., the gyroscope(s) 168 shown in FIG. 1A), a magnetometer (e.g., the magnetometer(s) 169 shown in FIG. 1A), and/or other sensors.

FIG. 5C illustrates a sequence in which the device shifts the touch activation regions 520a-520e in a downward direction in response to a change of movement 535c in the upward direction. In some embodiments, the device detects the change of movement 535c of the touch-sensitive display 500. In the example of FIG. 5C, the device detects that the movement of the touch-sensitive display 500 has changed from a first movement-direction 530ca to second movement-direction 530cb. As illustrated, the change of movement 535c includes an upward movement component. The device adjusts the touch activation regions 520a-520e based on a function of the change of movement 535c. In this example, the device shifts the touch activation regions 520a-520e downwards to encompass respective new areas 550ca-550ce. As illustrated, the touch activation regions 520a-520e did not encompass the new areas 550ca-550ce prior to the adjustment of the touch activation regions 520a-520e. In this example, the device shifts the touch activation regions 520a-520e in a display-direction 540c that is opposite from the change of movement 535c. In some examples, a display-direction refers to a direction in which the touch activation regions are adjusted (e.g., shifted, expanded and/or contracted). As such, in some examples, a display-direction is referred to as a touch activation region adjustment direction. In this example, the device adjusts (e.g., shifts) the touch activation regions 520a-520e to compensate for the change of movement 535c, so that the device is more effective at detecting touch inputs associated with the selectable user interface elements 510a-510e while the touch-sensitive display 500 experiences the change of movement 535c. As such, shifting the touch activation regions 520a-520e based on a function of the change of movement 535c enhances the operability of the device, for example, by reducing the number of touch inputs needed to perform the user interface operation and/or by reducing wasteful user interaction time with the touch-sensitive display 500. For example, adjusting the touch activation regions reduces the probability of a user input missing an intended touch activation region while the touch-sensitive display 500 undergoes the change of movement 535c. Since missing an intended touch activation region typically forces the user to provide another touch input, adjusting the touch activation regions tends to eliminate unnecessary touch inputs.

FIG. 5D illustrates a sequence in which the device performs a user interface operation in response to detecting a touch input (e.g., touch input 560a) within a touch activation region 520b. In this example, the device detects that the touch input 560a is within the new area 550cb encompassed by the touch activation region 520b associated with the selectable user interface element 510b that triggers the launch of the map module 154. As such, the device launches the map module 154 in response to detecting the touch input 560b, and displays a user interface 505b generated by the map module 154. In this example, the device effectively associated the touch input 560a with the touch activation region 520b of the selectable user interface element 510b for the map module 154 because the device had adjusted the touch activation region 520b to include the new area 550cb. Had the device not adjusted the touch activation region 520b to include the new area 550cb, the device would not have launched the map module 154 in response to the touch input 560a if the touch was detected outside of touch activation region 520b. As such, adjusting the touch activation regions 520a-520e based on a function of the change of movement 535c makes the device more effective at detecting touch inputs associated with selectable user interface elements and/or at performing user interface operations. Moreover, adjusting the touch activation regions 520a-520e enhances the operability of the device, for example, by reducing the number of touch inputs needed to perform the user interface operation and/or by reducing wasteful user interaction time with the touch-sensitive display 500. In the example of FIG. 5D, adjusting the touch activation regions 520a-520e reduces the probability of the touch input 560a missing (e.g., being outside of) the intended touch activation region 520b. Thus, in the example of FIG. 5D, adjusting the touch activation region 520b tends to enhances the operability of the device by reducing the time required to launch the map module 154 (e.g., by reducing the likelihood of the touch input 560a being outside the touch activation region 520b).

FIG. 5E illustrates a sequence in which the device forgoes performance of a user interface operation in response to detecting a touch input (e.g., touch input 560b) that is outside a touch activation region (e.g., touch activation region 520e for the selectable user interface element 520e). As illustrated in FIG. 5E, since the touch input 560b is outside the touch activation region 520e, the touch input 560b does not trigger a launching of the telephone module 138. In the example of FIG. 5E, since the change of movement 535c is in the upward direction, it is unlikely that the touch input 560b is intended for the touch activation region 520e. It is more likely that the touch input 560b was intended for touch activation region 520b but the user's finger inadvertently moved downwards due to the upward movement of the touch-sensitive display 500. Had the touch activation regions 520a-520e not been adjusted based on the change of movement 535c, the touch input 560b would have erroneously triggered the launch of the telephone module 138. In other words, performing the user interface operation if the touch input 560b is within the pre-adjustment touch activation region 520e but not within the post-adjustment touch activation region 520e tends to result in unintended performance of the user interface operation. Thus adjusting the touch activation regions 520a-520e and forgoing performance of the user interface operation in response to the touch input 560b being outside the post-adjustment touch activation region 520e tends to improve the operability of the device by reducing the undesirable impact of inadvertent touch inputs while the touch-sensitive display 500 experiences a change of movement.

FIG. 5F illustrates that, in some embodiments, an amount of adjustment to the touch activation regions is based on a function of an amount of change in movement. Put another way, in some embodiments, a degree of adjustment to the touch activation regions is proportional to an amount of change in movement. The lower portion of FIG. 5F illustrates a change of movement 535f from a first movement-direction 530fa to a second movement-direction 530fb. As illustrated in FIG. 5F, the change of movement 535f is greater than the change of movement 535c shown in FIG. 5C and replicated in the upper portion of FIG. 5F. Since the change of movement 535f is greater than the change of movement 535c, the amount of adjustment to the touch activation regions 520a-520e is also greater. As illustrated in the lower portion of FIG. 5F, the touch activation regions 520a-520e encompass new areas 550fa-550fe, respectively. The new areas 550fa-550fe are greater than the new areas 550ca-550ce. Moreover, the new area 550fa-550fe extend further towards the display-direction 540f In other words, a greater change of movement 535f in the upward direction causes a greater adjustment in the downward direction indicated by display-direction 540f.

FIG. 5G illustrates that, in some embodiments, an amount of adjustment of the touch activation regions 520a-520e is based on a function of an arm length. In some embodiments, the arm length includes a value that represents a length of an arm of a current user of the touch-sensitive display 500. In some embodiments, the arm length includes a value that represents a length of an arm of an average user. In some examples, the device determines the arm length by retrieving the arm length from a memory. For example, the device can retrieve a height of the current user from a user profile, and estimate the arm length based on the height of the user. In some examples, the device determines the arm length by detecting the arm length via one or more sensors. In some embodiments, the amount of adjustment to the touch activation regions 520a-520e is inversely proportional to the arm length. The upper half of FIG. 5G illustrates adjustments to the touch activation regions 520a-520e based on a first arm length 537a, whereas the lower half of FIG. 5G illustrates adjustment to the touch activation regions 520a-520e based on a second arm length 537b that is less than the first arm length 537a. As illustrated in the example of FIG. 5G, adjustments to the touch activation regions 520a-520e are inversely proportional to the arm length. For example, adjustments to the touch activation regions 520a-520e in the upper half of FIG. 5G are smaller than the adjustments to the touch activation regions 520a-520e in the lower half of FIG. 5G, since the first arm length 537a is greater than the second arm length 537b. As a result, new areas 550ga-550ge are greater than the new areas 550ca-550ce. Adjusting the touch activation regions based on an arm length improves the operability of the device and provides an improved user experience by accounting for users with different arm lengths.

FIG. 5H illustrates that, in some embodiments, the device detects multiple touch inputs, determines a primary touch input, and discards the remaining touch inputs. In the example of FIG. 5H, the touch-sensitive display 500 receives three touch inputs: touch inputs 560c, 560d and 560e. In this example, the device determines that touch input 560c is the primary touch input. As such, the device discards touch inputs 560d and 560e. Since the determined primary touch input (e.g., touch input 560c) is within the touch activation region 520*b*, the device performs a user interface operation associated with touch activation region 520*b* (e.g., the device launches the map module 154 and presents a user interface 505*b* generated by the map module 154). In some embodiments, the device determines a primary touch input out of various touch inputs by identifying a touch input that overlaps the most with one of the touch activation regions after the touch activation regions have been adjusted based on the change of movement. In the example of FIG. 5H, the device determines that touch input 560*c* overlaps with a post-adjustment touch activation region (e.g., touch activation region 520*b*). In the example of FIG. 5H, the touch input 560*d* is discarded because the touch input 560*d* does not overlap with any of the touch activation regions 520*a*-520*e*. The touch input 560*e* is also discarded because the touch input 560*e* does not overlap with the post-adjustment touch activation region 520*e* even though the touch input 560*e* overlaps with the pre-adjustment touch activation region 520*e*. In the example of FIG. 5H, touch input 560*c* is most likely the intended touch input, whereas touch inputs 560*d* and 560*e* are likely unintended touch inputs that were caused by the change of movement 535*c*. Determining a primary touch input out of various touch inputs, and discarding the remaining touch inputs improves the user experience of the device by causing the device to function as intended by the user.

FIG. 5I illustrates a sequence in which the device expands touch activation regions 520*a*-520*e* in a downward direction in response to a change of movement 535*i* in the upward direction. In some embodiments, the device detects the change of movement 535*i* of the touch-sensitive display 500. In the example of FIG. 5I, the device detects that the movement of the touch-sensitive display 500 has changed from a first movement-direction 530*ia* to a second movement-direction 530*ib*. As illustrated, the change of movement 535*i* includes an upward movement component. The device adjusts the touch activation regions 520*a*-520*e* based on a function of the change of movement 535*i*. In this example, the device expands the touch activation regions 520*a*-520*e* downwards to encompass respective new areas 550*ia*-550*ie*. As illustrated, the touch activation regions 520*a*-520*e* did not encompass the new areas 550*ia*-550*ie* prior to the adjustment of the touch activation regions 520*a*-520*e*. In this example, the device expands the touch activation regions 520*a*-520*e* in a display-direction 540*i* that is opposite from the change of movement 535*i*. In this example, the device adjusts (e.g., expands) the touch activation regions 520*a*-520*e* to compensate for the change of movement 535*i*, so that the device is more effective at detecting touch inputs associated with the selectable user interface elements 510*a*-510*e* while the touch-sensitive display 500 experiences the change of movement 535*i*. When the touch-sensitive display 500 experiences an upward change of movement 535*i*, the user's finger will likely touch an area that is below the intended touch area. As such, expanding the touch activation regions 520*a*-520*e* to encompass new areas 550*ia*-550*ie* reduces the probability of a user's finger missing an intended touch activation region thereby enhancing the operability of the device and providing a better user experience (e.g., by reducing the number of touch inputs needed to perform the user interface operation and/or by reducing wasteful user interaction time with the touch-sensitive display 500).

FIG. 5J illustrates a sequence in which the device shifts touch activation regions 520*a*-520*e* in an upward direction in response to a change of movement 535*j* in the downward direction. In some embodiments, the device detects the change of movement 535*j* of the touch-sensitive display 500. In the example of FIG. 5J, the device detects that the movement of the touch-sensitive display 500 has changed from a first movement-direction 530*ja* to a second movement-direction 530*jb*. As illustrated, the change of movement 535*j* includes a downward movement component. The device adjusts the touch activation regions 520*a*-520*e* based on a function of the change of movement 535*j*. In this example, the device shifts the touch activation regions 520*a*-520*e* upwards to encompass respective new areas 550*ja*-550*je*. As illustrated, the touch activation regions 520*a*-520*e* did not encompass the new areas 550*ja*-550*je* prior to the adjustment of the touch activation regions 520*a*-520*e*. In this example, the device shifts the touch activation regions 520*a*-520*e* in a display-direction 540*j* that is opposite from the change of movement 535*j*. In this example, the device adjusts (e.g., shifts) the touch activation regions 520*a*-520*e* to compensate for the change of movement 535*j*, so that the device is more effective at detecting touch inputs associated with the selectable user interface elements 510*a*-510*e* while the touch-sensitive display 500 experiences the change of movement 535*j*. When the touch-sensitive display 500 experiences a downward change of movement 535*j*, the user's finger will likely touch an area that is above the intended touch area. As such, shifting the touch activation regions 520*a*-520*e* upwards to encompass new areas 550*ja*-550*je* reduces the likelihood of a user's finger missing an intended touch activation region thereby enhancing the operability of the device and providing a better user experience (e.g., by reducing the number of touch inputs needed to perform the user interface operation and/or by reducing wasteful user interaction time with the touch-sensitive display 500).

FIG. 5K illustrates a sequence in which the device expands touch activation regions 520*a*-520*e* in an upward direction in response to a change of movement 535*k* in the downward direction. In some embodiments, the device detects the change of movement 535*k* of the touch-sensitive display 500. In the example of FIG. 5K, the device detects that the movement of the touch-sensitive display 500 has changed from a first movement-direction 530*ka* to movement-direction 530*kb*. As illustrated, the change of movement 535*k* includes a downward movement component. The device adjusts the touch activation regions 520*a*-520*e* based on a function of the change of movement 535*k*. In this example, the device expands the touch activation regions 520*a*-520*e* upwards to encompass respective new areas 550*ka*-550*ke*. As illustrated, the touch activation regions 520*a*-520*e* did not encompass the new areas 550*ka*-550*ke* prior to the adjustment of the touch activation regions 520*a*-520*e*. In this example, the device expands the touch activation regions 520*a*-520*e* in a display-direction 540*k* that is opposite from the change of movement 535*k*. In this example, the device adjusts (e.g., expands) the touch activation regions 520*a*-520*e* to compensate for the change of movement 535*k*, so that the device is more effective at detecting touch inputs associated with the selectable user interface elements 510*a*-510*e* while the touch-sensitive display 500 experiences the change of movement 535*k*. When the touch-sensitive display 500 experiences a downward change of movement 535*k*, the user's finger will likely touch an area that is above the intended touch area. As such, expanding the touch activation regions 520*a*-520*e* to encompass new areas 550*ka*-550*ke* reduces the likelihood of a user's finger missing an intended touch activation region thereby enhancing the operability of the device and improving the user experience (e.g., by reducing the number of touch inputs needed to perform the user interface operation and/or by reducing wasteful user interaction time with the touch-sensitive display 500).

FIG. 5L illustrates a sequence in which the device shifts touch activation regions 520*a*-520*e* towards the left in response to a change of movement 535*l* towards the right. In some embodiments, the device detects the change of movement 535*l* of the touch-sensitive display 500. In the example of FIG. 5L, the device detects that the movement of the touch-sensitive display 500 has changed from a first movement-direction 530*la* to a second movement-direction 530*lb*. As illustrated, the change of movement 535*l* includes a directional component towards the right. The device adjusts the touch activation regions 520*a*-520*e* based on a function of the change of movement 535*l*. In this example, the device shifts the touch activation regions 520*a*-520*e* towards the left to encompass respective new areas 550*la*-550*le*. As illustrated, the touch activation regions 520*a*-520*e* did not encompass the new areas 550*la*-550*le* prior to the adjustment of the touch activation regions 520*a*-520*e*. In this example, the device shifts the touch activation regions 520*a*-520*e* in a display-direction 540*l* that is opposite from the change of movement 535*l*. In this example, the device adjusts (e.g., shifts) the touch activation regions 520*a*-520*e* to compensate for the change of movement 535*l*, so that the device is more effective at detecting touch inputs associated with the selectable user interface elements 510*a*-510*e* while the touch-sensitive display 500 experiences the change of movement 535*l*. When the touch-sensitive display 500 experiences a change of movement 535*l* towards the right, the user's finger will likely touch an area that is left of the intended touch area. As such, shifting the touch activation regions 520*a*-520*e* leftward to encompass new areas 550*la*-550*le* reduces the likelihood of the user's finger missing the intended touch activation region thereby enhancing the operability of the device and improving the user experience (e.g., by reducing the number of touch inputs needed to perform the user interface operation and/or by reducing wasteful user interaction time with the touch-sensitive display 500). Additionally and/or alternatively, shifting the touch activation regions 520*a*-520*e* tends to reduce the number of erroneous inputs. In examples where the touch-sensitive display 500 is installed in a vehicle, reducing the number of erroneous inputs reduces driver distraction due to the erroneous inputs.

FIG. 5M illustrates a sequence in which the device expands touch activation regions 520*a*-520*e* towards the left in response to a change of movement 535*m* towards the right. In some embodiments, the device detects the change of movement 535*m* of the touch-sensitive display 500. In the example of FIG. 5M, the device detects that the movement of the touch-sensitive display 500 has changed from a first movement-direction 530*ma* to a second movement-direction 530*mb*. As illustrated, the change of movement 535*m* includes a directional component towards the right. The device adjusts the touch activation regions 520*a*-520*e* based on a function of the change of movement 535*m*. In this example, the device expands the touch activation regions 520*a*-520*e* towards the left to encompass respective new areas 550*ma*-550*me*. As illustrated, the touch activation regions 520*a*-520*e* did not encompass the new areas 550*ma*-550*me* prior to the adjustment of the touch activation regions 520*a*-520*e*. In this example, the device expands the touch activation regions 520*a*-520*e* in a display-direction 540*m* that is opposite from the change of movement 535*m*. In this example, the device adjusts (e.g., expands) the touch activation regions 520*a*-520*e* to compensate for the change of movement 535*m*, so that the device is more effective at detecting touch inputs associated with the selectable user interface elements 510*a*-510*e* while the touch-sensitive display 500 experiences the change of movement 535*m*. When the touch-sensitive display 500 experiences a change of movement 535*m* towards the right, the user's finger will likely touch an area that is left of the intended touch area. As such, expanding the touch activation regions 520*a*-520*e* towards the left to encompass new areas 550*ma*-550*me* reduces the likelihood of the user's finger missing the intended touch activation region thereby enhancing the operability of the device and improves the user experience (e.g., by reducing the number of touch inputs needed to perform the user interface operation and/or by reducing wasteful user interaction time with the touch-sensitive display 500).

FIG. 5N illustrates a sequence in which the device shifts touch activation regions 520*a*-520*e* up towards the right in response to a change of movement 535*n* down towards the left. In some embodiments, the device detects the change of movement 535*n* of the touch-sensitive display 500. In the example of FIG. 5N, the device detects that the movement of the touch-sensitive display 500 has changed from a first movement-direction 530*na* to a second movement-direction 530*nb*. As illustrated, the change of movement 535*n* includes a downward directional component and a directional component towards the left. The device adjusts the touch activation regions 520*a*-520*e* based on a function of the change of movement 535*n*. In this example, the device shifts the touch activation regions 520*a*-520*e* up towards the right to encompass respective new areas 550*na*-5520*ne*. As illustrated, the touch activation regions 520*a*-520*e* did not encompass the new areas 550*na*-550*ne* prior to the adjustment of the touch activation regions 520*a*-520*e*. In this example, the device shifts the touch activation regions 520*a*-520*e* in a display-direction 540*n* that is opposite from the change of movement 535*n*. In this example, the device adjusts (e.g., shifts) the touch activation regions 520*a*-520*e* to compensate for the change of movement 535*n*, so that the device is more effective at detecting touch inputs associated with the selectable user interface elements 510*a*-510*e* while the touch-sensitive display 500 experiences the change of movement 535*n*. When the touch-sensitive display 500 experiences a change of movement 535*n* that is down towards the left, the user's finger will likely touch up towards the right of an intended touch activation region. As such, shifting the touch activation regions 520*a*-520*e* up towards the right reduces the likelihood of the user's finger missing the intended touch activation region thereby enhancing the operability of the device (e.g., by reducing the number of touch inputs needed to perform the user interface operation and/or by reducing wasteful user interaction time with the touch-sensitive display 500).

FIG. 5O illustrates a sequence in which the device expands touch activation regions 520*a*-520*e* up towards the right in response to a change of movement 535*o* down towards the left. In some embodiments, the device detects the change of movement 535*o* of the touch-sensitive display 500. In the example of FIG. 5O, the device detects that the movement of the touch-sensitive display 500 has changed from a first movement-direction 530*oa* to a second movement-direction 530*ob*. As illustrated, the change of movement 535*o* includes a downward directional component and a directional component towards the left. The device adjusts the touch activation regions 520*a*-520*e* based on a function of the change of movement 535*o*. In this example, the device expands the touch activation regions 520*a*-520*e* up towards the right to encompass respective new areas 550*oa*-550*oe*. As illustrated, the touch activation regions 520*a*-520*e* did not encompass the new areas 550*oa*-550*oe* prior to the adjustment of the touch activation regions 520*a*-520*e*. In this example, the device expands the touch activation regions 520*a*-520*e* in a display-direction 540*o* that is opposite from the change of movement 535*o*. In this example, the device adjusts (e.g., expands) the touch activation regions 520*a*-520*e* to compensate for the change of movement 535*o*, so that the device is more effective at detecting touch inputs associated with the selectable user interface elements 510*a*-510*e* while the touch-sensitive display 500 experiences the change of movement 535*o*. When the touch-sensitive display 500 experiences a change of movement 535*o* that is down towards the left, the user's finger will likely touch up towards the right of an intended touch activation region. As such, expanding the touch activation regions 520*a*-520*e* to encompass new areas 550*oa*-550*oe* reduces the likelihood of the user's finger missing the intended touch activation region thereby enhancing the operability of the device and improving the user experience (e.g., by reducing the number of touch inputs needed to perform the user interface operation and/or by reducing wasteful user interaction time with the touch-sensitive display 500).

FIG. 5P illustrates a sequence in which the device expands touch activation regions 520*a*-520*e* outwards in response to a change of movement 535*p* that indicates a forward acceleration. In some embodiments, the device detects the change of movement 535*p* of the touch-sensitive display 500. In the example of FIG. 5P, the device detects that the movement of the touch-sensitive display 500 has changed from a first movement-direction 530*pa* to a second movement-direction 530*pb*. As illustrated, the change of movement 535*p* includes a forward acceleration. The device adjusts the touch activation regions 520*a*-520*e* based on a function of the change of movement 535*p*. In this example, the device expands the touch activation regions 520*a*-520*e* outwards to encompass respective new areas 550*pa*-550*pe*. As illustrated, the touch activation regions 520*a*-520*e* did not encompass the new areas 550*pa*-550*pe* prior to the adjustment of the touch activation regions 520*a*-520*e*. In this example, the device expands the touch activation regions 520*a*-520*e* in a display-direction 540*p* to compensate for the change of movement 535*p*, so that the device is more effective at detecting touch inputs associated with the selectable user interface elements 510*a*-510*e* while the touch-sensitive display 500 experiences the change of movement 535*p*. When a vehicle in which the touch-sensitive display 500 is mounted experiences a forward acceleration (e.g., the vehicle suddenly speeds up), the user is likely pushed back into the seat and it is likely more difficult to reach the intended touch activation region. As such, expanding the touch activation regions 520*a*-520*e* outwards increases the likelihood of the user being able to select the intended touch activation region thereby enhancing the operability of the device and providing a better user experience (e.g., by reducing the number of touch inputs needed to perform the user interface operation and/or by reducing wasteful user interaction time with the touch-sensitive display 500).

FIG. 5P also illustrates that, in some embodiments, adjusting the touch activation regions includes changing the shape of the touch activation regions. In the example of FIG. 5P, after the adjustment, the touch activation regions 520*b*-520*e* have square corners instead of rounded corners. Switching from square corners to rounded corners increases the surface area covered by the touch activation regions 520*b*-520*e* thereby increasing the likelihood of the user's finger touching the intended touch activation region. Moreover, in the example of FIG. 5P, the touch activation region 520*a* for the selectable user interface element 510*a* (e.g., the home button) has been adjusted from being circular to a square. Switching from a circle to a square increases the surface area covered by the touch activation region 520*a* thereby increasing the likelihood of the user's finger touching the selectable user interface element 510*a* if the user intends to touch the selectable user interface element 510*a*. While FIG. 5P illustrates adjusted touch activation regions 520*a*-520*e* that resemble squares, other shapes are also contemplated (e.g., rectangular, elliptical, etc.).

FIG. 5P also illustrates that, in some embodiments, the adjustments to the touch activation regions are based on a function of a size of the selectable user interface element. In some embodiments, the adjustment to a touch activation region is inversely proportional to the size of the corresponding selectable user interface element. For example, the device makes relatively bigger adjustments to touch activation regions for smaller selectable user interface elements, and relatively smaller adjustment to touch activation regions of larger selectable user interface elements. In the example of FIG. 5P, the selectable user interface element 510*a* is smaller than the selectable user interface elements 510*b*-510*e*. Hence, in this example, the adjustment to the touch activation region 520*a* is larger than the adjustments to touch activation regions 520*b*-520*e*. For example, the new area 550*pa* is larger than the new areas 550*pb*-550*pe*.

FIG. 5Q illustrates a sequence in which the device contracts touch activation regions 520*a*-520*e* inwards in response to a change of movement 535*q* that indicates a forward deceleration. In some embodiments, the device detects the change of movement 535*q* of the touch-sensitive display 500. In the example of FIG. 5Q, the device detects that the movement of the touch-sensitive display 500 has changed from a first movement-direction 530*qa* to a second movement-direction 530*qb*. As illustrated, the change of movement 535*q* includes a forward deceleration. The device adjusts the touch activation regions 520*a*-520*e* based on a function of the change of movement 535*q*. In this example, the device contracts the touch activation regions 520*a*-520*e* inwards to relinquish respective old areas 550*qa*-550*qe*. As illustrated, the touch activation regions 520*a*-520*e* encompassed the old areas 550*qa*-550*qe* prior to the adjustment of the touch activation regions 520*a*-520*e*. In this example, the device contracts the touch activation regions 520*a*-520*e* in a display-direction 540*q* to compensate for the change of movement 535*q*, so that the device is more effective at detecting touch inputs associated with the selectable user interface elements 510*a*-510*e* while the touch-sensitive display 500 experiences the change of movement 535*q*. When a vehicle in which the touch-sensitive display 500 is mounted experiences a forward deceleration (e.g., the vehicle suddenly brakes), the user will likely be pushed forward and the user's finger will likely move towards the display faster than the user intends. As such, the user's finger is more likely to touch an unintended area of the touch-sensitive display 500. Contracting the touch activation regions 520*a*-520*e* inwards reduces the likelihood that the user's finger will unintentionally touch a touch activation region thereby enhancing the operability of the device and providing a better user experience (e.g., by not triggering that performance of unintended user interface operations).

As illustrated in FIG. 5Q, in some embodiments, the amount of contraction to a touch activation region is based on a function of a size of the corresponding selectable user interface element. For example, the old area 550*qa* is smaller than the old areas 550*qb*-550*qe*, since the selectable user interface element 510*a* is smaller than the selectable user interface elements 510*b*-510*e*. In some embodiments, the device does not contract the touch activation region, if a surface area of the touch activation region is smaller than a threshold. By adjusting the amount of contraction based on the size of the selectable user interface element, the device does not make it overly difficult to select selectable user interface elements that are small.

FIGS. 5R-5T illustrate a sequence in which the device adjusts the touch activation regions 520*a*-520*e* in response to a change of movement 535*r*, and reverses the adjustment of the touch activation regions 520*a*-520*e* after the change of movement 535*r* ceases. In FIG. 5R, the device shifts the touch activation regions 520*a*-520*e* in a downward direction indicated by display-direction 540*r* in response to a change of movement 535*r* in the upward direction. The device shifts the touch activation regions 520*a*-520*e* downwards to compensate for the change of movement 535*r* from a first movement-direction 530*ra* to a second movement-direction 530*rb*. Since an upward change of movement 535*r* will likely shift a user's finger downwards, shifting the touch activation regions 520*a*-520*e* to encompass new areas 550*ra*-550*re*, respectively, reduces the likelihood of a user's finger missing an intended touch activation region.

FIG. 5S illustrates a sequence in which the device compensates for the adjustment to the touch activation regions 520*a*-520*e* once the change of movement 535*r* ceases. In the example of FIG. 5S, the device adjusts the touch activation regions 520*a*-520*e* to temporarily encompass new areas 550*sa*-550*se*, respectively. The new areas 550*sa*-550*se* are in a display-direction 540*s* that is opposite from the display-direction 540*r* in which the device previously adjusted the touch activation regions 520*a*-520*e*. As the change of movement 535*r* ceases, the user's finger will likely swing upwards. Hence, shifting the touch activation regions 520*a*-520*e* upwards to encompass new areas 550*sa*-550*se*, respectively, improves the likelihood of a user's finger touching an intended touch activation region 520*a*-520*e*. In some embodiments, the compensation for the adjustment is smaller than the adjustment. For example, new areas 550*sa*-550*se* are smaller than new areas 550*ra*-550*re*. In some embodiments, a time duration associated with the compensation for the adjustment is smaller than a time duration associated with the adjustment. For example, if the adjustment lasts one second, the compensation for the adjustment may last one-tenth of a second. FIG. 5T illustrates a sequence in which the compensation for the adjustment is reversed, and the touch activation regions 520*a*-520*e* encompass areas that the touch activation regions 520*a*-520*e* encompassed before the change of movement 535*r* occurred. In some embodiments, the device does not compensate for the adjustment. In such embodiments, the device reverses the adjustment after the change of movement ceases.

FIG. 5U illustrates adjustments 572*u* that the device makes to one or more touch activation regions based on a function of a change in position 570*u* of the touch-sensitive display over time. In some examples, the change in position 570*u* represents traveling over a ridge set in a planar surface (e.g., traveling over a speed bump on a road). As such, the change in position 570*u* resembles an upward change of movement (e.g., the change of movement 535*c* shown in FIG. 5C). As illustrated, the adjustment 572*u* is inversely proportional to the change in position 570*u* (e.g., the display-direction 540*c* shown in FIG. 5C is opposite from the change of movement 535*c*). In some embodiments, the device dampens the adjustment 572*u* by a predetermined dampening factor. For example, for every inch of change in position 570*u*, the device makes an adjustment 572*u* that is one-tenth of an inch. As illustrated, the adjustment 572*u* ceases as the change in position 570*u* ceases. In other words, as the change of movement ceases, the device reverses the adjustment 572*u* in order to restore the touch activation regions to their size and/or shape prior to the change of movement. Performing the adjustment 572*u* makes the device more effective at detecting touch inputs associated with the selectable user interface elements while the touch-sensitive display experiences the change of movement indicated by the change in position 570*u*. Moreover, performing the adjustment 572*u* based on a function of the change of movement enhances the operability of the device, for example, by reducing the likelihood that a user's finger will miss an intended touch activation region thereby reducing the number of touch inputs needed to perform the user interface operation and/or by reducing wasteful user interaction time with the touch-sensitive display.

In some embodiments, the device performs a counter-adjustment 574*u* to the touch activation regions after reversing the adjustment 572*u*. In some embodiments, the device performs the counter-adjustment 574*u* in order to compensate for the adjustment 572*u*. In some embodiments, the device performs the counter-adjustment 574*u* by expanding/shifting the touch activation regions in a display-direction that is opposite to the display-direction in which the adjustment 572*u* is performed. In the example of FIG. 5U, the device performs the counter-adjustment 574*u* by moving the touch activation regions up, whereas the device performed the adjustment 572*u* by moving the touch activation regions down (e.g., as shown in FIG. 5S, the device shifts the touch activation regions 520*a*-520*e* upwards to encompass new areas 550*sa*-550*se*, respectively). In some embodiments, the counter-adjustment 574*u* is smaller than the adjustment 572*u* (e.g., the new areas 550*sa*-550*se* shown in FIG. 5S are smaller than the new areas 550*ra*-550*re*). For example, the counter-adjustment 574*u* is a predetermined fraction of the adjustment 572*u*. As such, in some embodiments, the counter-adjustment 574*u* is a function of the adjustment 572*u* and/or the change of movement. Performing the counter-adjustment 574*u* makes the device more effective at detecting touch inputs associated with the selectable user interface elements. For example, performing the counter-adjustment 574*u* based on a function of the change of movement and/or the adjustment 572*u* enhances the operability of the device, for example, by reducing the likelihood of the user's finger missing the intended touch activation region due a swinging of the user's arm caused by the change of movement.

FIGS. 6A-6F illustrate a flow diagram of a method 600 of adjusting touch activation regions associated with selectable user interface elements based on a function of change of movement of a touch-sensitive display that displays the selectable user interface elements. The method 600 is performed at an electronic device (e.g., the portable multifunction device 100 in FIG. 1A, or the device 300 in FIG. 3) with one or more processors, a non-transitory memory, a display, and an input device. In some embodiments, the display is a touch-screen display and the input device is on or integrated with the display. In some embodiments, the display is separate from the input device. In some embodiments, the method 600 is performed at a device that is separate from the touch-sensitive display. Some operations in method 600 are, optionally, combined and/or the order of some operations is, optionally, changed.

As described below, the method 600 provides a way to adjust touch activation regions associated with selectable user interface elements based on a function of change of movement of a touch-sensitive display that displays the selectable user interface elements. The method 600 improves the efficiency and/or effectiveness of detecting touch inputs associated with the selectable user interface elements during the change of movement of the touch-sensitive display, thereby creating a more efficient human-machine interface. For battery-operated electronic devices, improving the efficiency and/or effectiveness of detecting touch inputs during change of movement conserves power and increases the time between battery charges. The method 600 enhances the operability of the device, for example, by reducing the number of touch inputs needed to perform the user interface operation and/or by reducing wasteful user interaction time with the touch-sensitive display.

The device displays (602) one or more selectable user interface elements on the touch-sensitive display that are associated with corresponding touch activation regions, where the one or more selectable user interface elements include a first selectable user interface element that is associated with a first touch activation region. As one example, in FIGS. 5A-5B, the touch-sensitive display 500 displays selectable user interface elements 510a-510e that are associated with corresponding touch activation regions 520a-520e, respectively.

The device detects (604) a change of movement of the touch-sensitive display that has an associated respective direction. As one example, in FIGS. 5C-5D, the device detects a change of movement 535c of the touch-sensitive display 500. In this example, the change of movement 535c indicates a change from a first movement-direction 530ca to a second movement-direction 530cb. FIGS. 5A-5U illustrate various examples in which the device detects a change of movement of the touch-sensitive display.

In response to detecting the change of movement of the touch-sensitive display, the device adjusts (606) the first touch activation region to encompass a new area of the touch-sensitive display that is at least partially different from the first touch activation region prior to detecting the change of movement, and the new area is based on the change of movement of the touch-sensitive display. In some embodiments, the new area is based on a function of the change of movement of the touch-sensitive display. As one example, in FIG. 5C, the device adjusts the touch activation regions 520a-520e to encompass new areas 550ca-550ce, respectively. As illustrated in this example, the touch activation region 520a-520e did not encompass the new areas 550ca-550ce prior to detecting the change of movement 535c. In some embodiments, encompassing a new area that is at least partially different from the touch activation region prior to detecting the change of movement includes relinquishing a portion of the touch activation region (e.g., by contracting the touch activation regions, as shown in FIG. 5Q). Adjusting the first touch activation region improves the efficiency and/or effectiveness of detecting a touch input associated with the first selectable user interface element during the change of movement of the touch-sensitive display, thereby creating a more efficient human-machine interface. Adjusting the first touch activation region enhances the operability of the device, for example, by reducing the likelihood of a user's finger missing an intended touch activation region thereby reducing the number of touch inputs needed to perform the user interface operation and/or reducing wasteful user interaction time with the touch-sensitive display.

After detecting the change of movement of the touch-sensitive display, the device detects (608) a touch input on the touch-sensitive display. As one example, in FIG. 5D, the device detects a touch input 560a on the touch-sensitive display 500. In this example, at least a portion of the touch input 560a is within the new area 550cb encompassed by the touch activation region 520b. As such, the device determines that the touch input 560a is within the touch activation region 520b, as adjusted in response to detecting the change of movement. In other words, since the touch activation region 520b includes the new area 550cb, the device determines that the touch input 560a is within the touch activation region 520b.

In response to detecting the touch input on the touch-sensitive display, in accordance with a determination that the touch input is detected within the adjusted first touch activation region, perform (610) a user interface operation that is associated with the first selectable user interface element, and in accordance with a determination that the touch input is detected outside of the adjusted first touch activation region, forgo (610) performance of the user interface operation that is associated with the first selectable user interface element. As one example, in FIG. 5D, the device determines that at least a portion of the touch input 560a is within the adjusted touch activation region 520b associated with the selectable user interface element 510b for the map module 154. As such, the device performs the user interface operation that is associated with the selectable user interface element 510b. As illustrated in FIG. 5D, in this example, the device performs the user interface operation associated with the selectable user interface element 510b by launching the map module 154 and presenting a user interface 505b generated by the map module 154. As illustrated in FIG. 5E, the device forgoes the performance of a user interface operation associated with the selectable user interface element 510e by not launching the telephone module 138 in response to the touch input 560b being outside the touch activation region 520e.

Figure 6B:
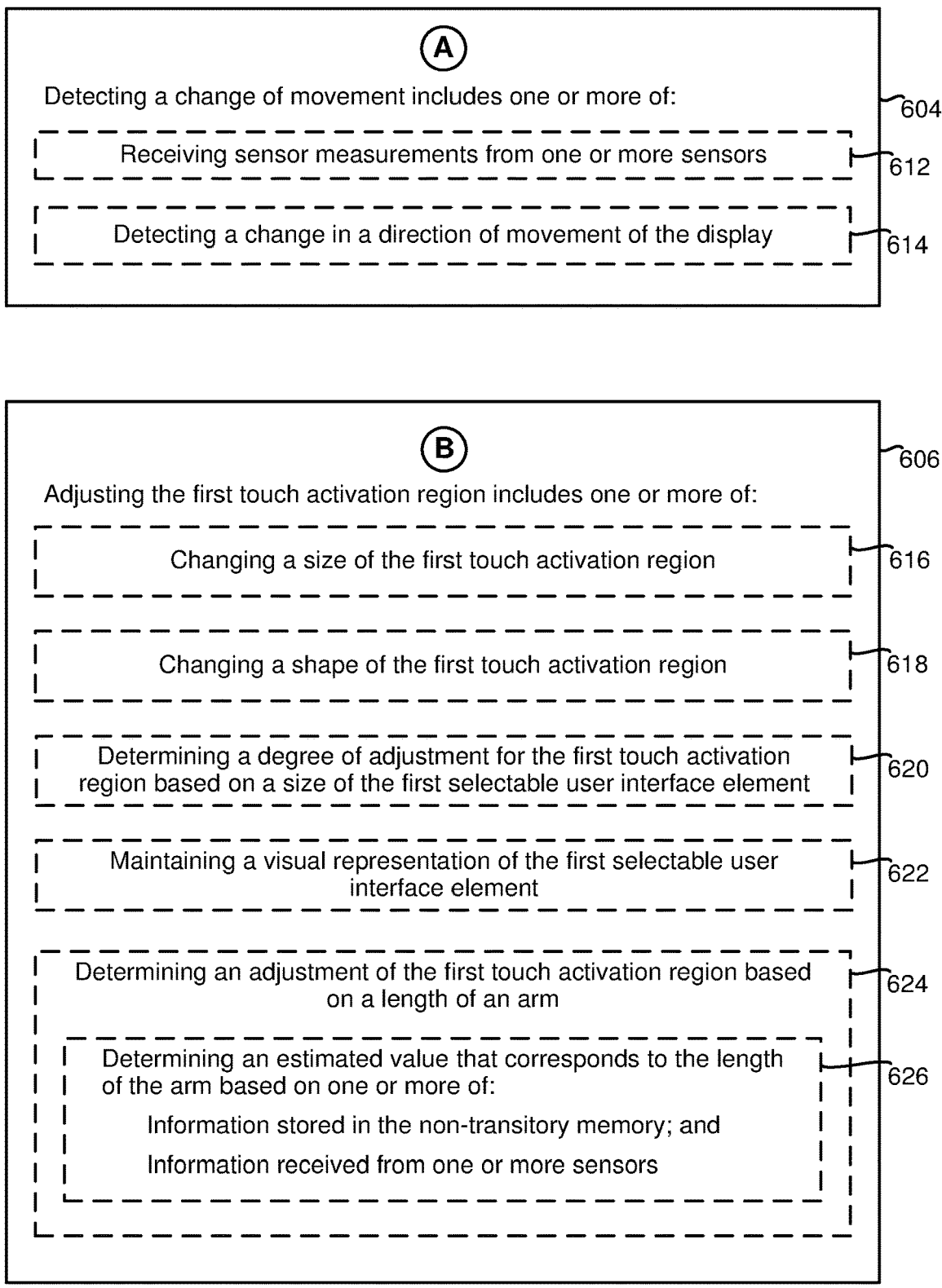
Figure 6D:
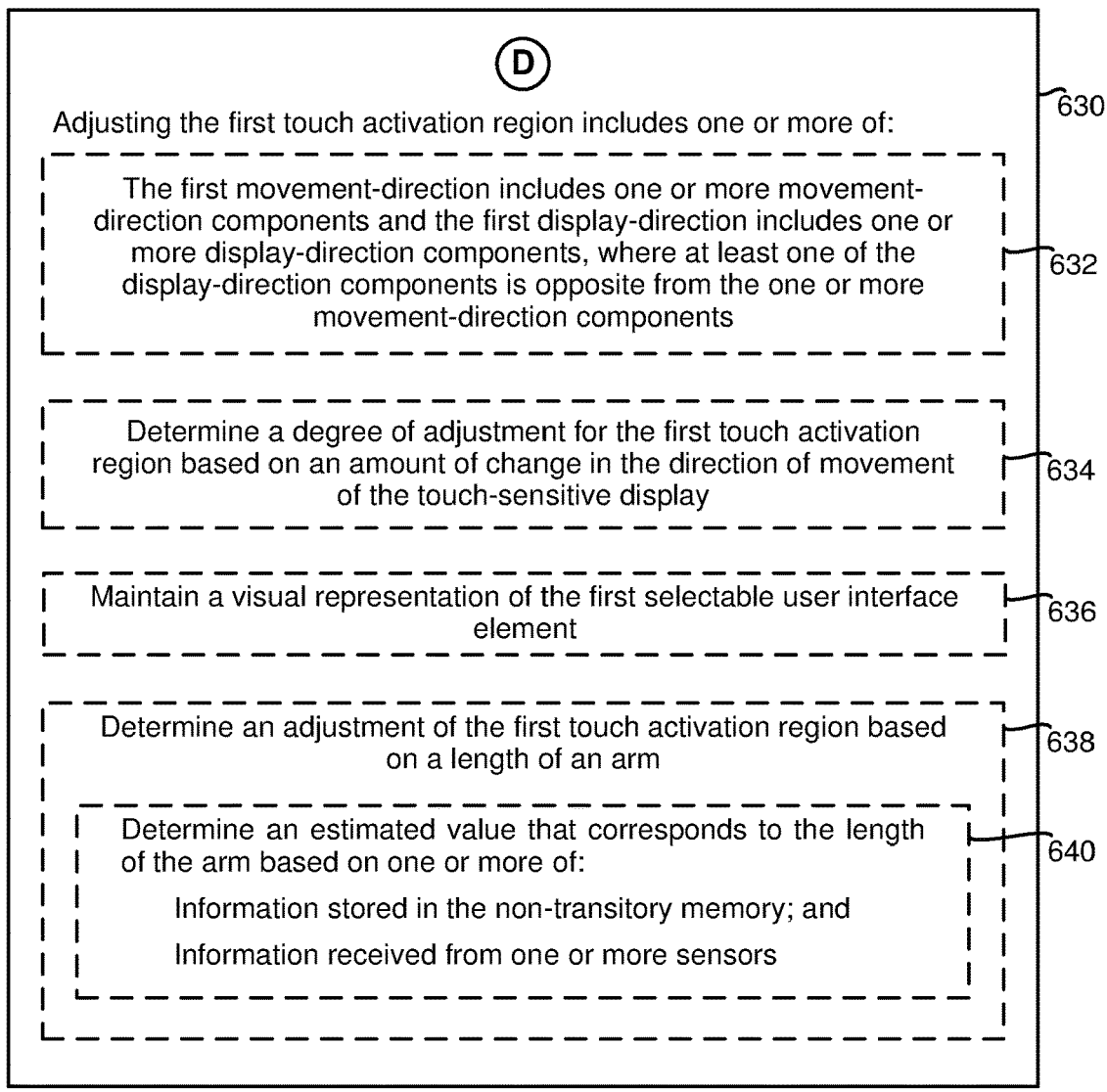
Figure 6D:
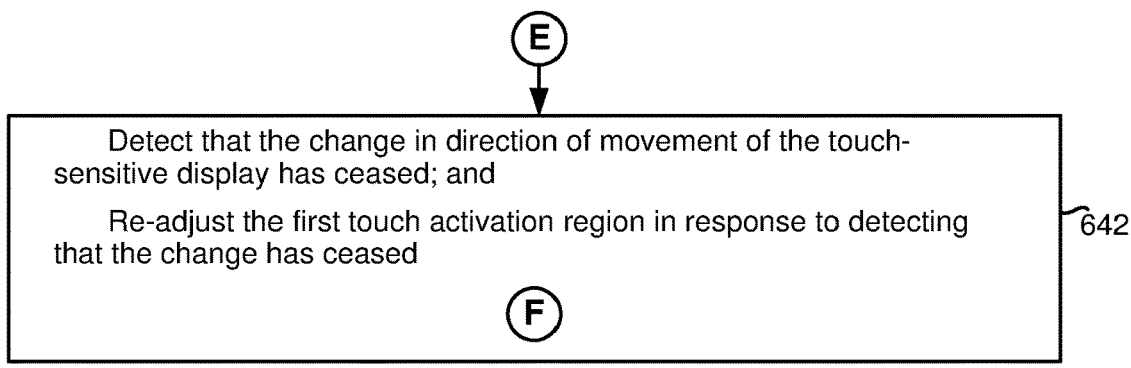
Figure 6F:
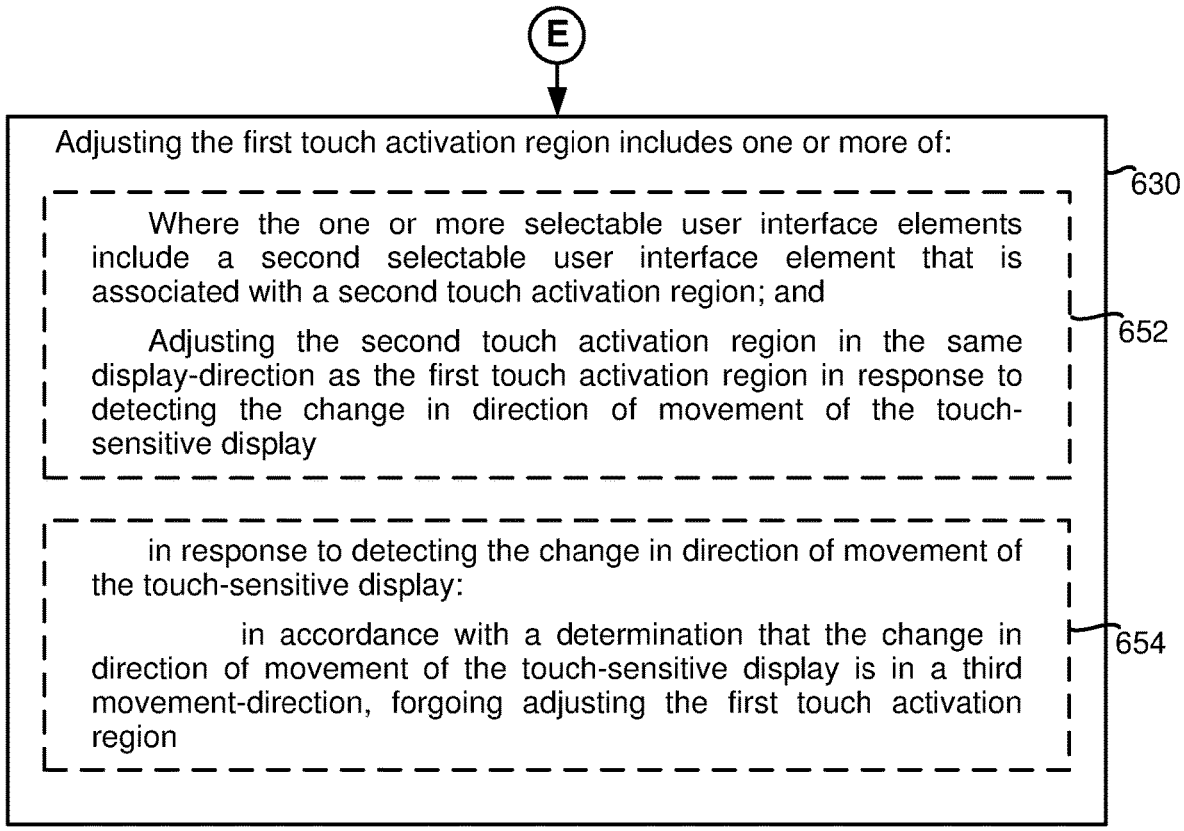

As illustrated in FIG. 6B, in some embodiments, the device detects the change of movement by receiving (612) sensors measurements from one or more sensors, and detecting the change of movement based on a function of the sensor measurements. In some examples, the device receives sensor measurements from the accelerometer(s) 167, the gyroscope(s) 168 and/or the magnetometer(s) 169 shown in FIG. 1A. In such examples, the device detects the change of movement based on the sensor measurements from the accelerometer(s) 167, the gyroscope(s) 168 and/or the magnetometer(s) 169.

In some embodiments, the device detects the change of movement by detecting (614) a change in a direction of movement of the touch-sensitive display. As one example, in FIG. 5C, the device detects a change in a direction of movement from a first movement-direction 530ca (e.g., a forward direction) to a second movement-direction 530cb (e.g., a forward-upward direction). As another example, in FIG. 5F, the device detects a change in a direction of movement from a first movement-direction 530fa (e.g., a forward direction) to a second movement-direction 530fb (e.g., a forward-backward direction).

In some embodiments, the device detects the change of movement by detecting a change in magnitude. In such embodiments, the direction of movement may remain the same but the magnitude (e.g., speed of movement) may change. As one example, in FIG. 5P, the device detects a change of movement 535p from a first movement-direction

530pa to a second movement-direction 530pb. In the example of FIG. 5P, the change of movement 535p represents a forward acceleration.

In some embodiments, the device adjusts the first touch activation region by changing (616) a size of the first touch activation region. As one example, in FIG. 5I, the device adjusts the touch activation regions 520a-520e by changing a size of the touch activation regions 520a-520e. For example, the device expands the touch activation regions 520a-520e to include new areas 550ia-550ie, respectively, that the touch activation regions 520a-520e did not encompass prior to detecting the change of movement 535i. In the example of FIG. 5I, the device increases the size of the touch activation regions 520a-520e. As another example, in FIG. 5Q, the device reduces the size of the touch activation regions 520a-520e by relinquishing old areas 550qa-550qe, respectively. Changing the size of the first touch activation region improves the efficiency and/or effectiveness of detecting touch inputs associated with the first selectable user interface element during the change of movement of the touch-sensitive display, thereby creating a more efficient human-machine interface. Changing the size of the first touch activation region enhances the operability of the device, for example, by reducing the likelihood of a user's finger missing the intended touch activation region. Reducing the likelihood of a user's finger missing the intended touch activation region tends to reduce the number of touch inputs needed to perform the user interface operation and/or reduces wasteful user interaction time with the touch-sensitive display.

In some embodiments, the device adjusts the first touch activation region by changing (618) a shape of the first touch activation region. For example, in some embodiments, the device elongates the first touch activation region to encompass a new area that the first touch activation region did not encompass prior to the detecting the change of movement. As one example, in FIG. 5P, the device changes the shape of the touch activation regions 520a-520e from rounded corners to square corners. In some embodiments, changing the shape of the first touch activation region increases the surface area of the first touch activation region. Increasing the surface areas of the touch activation regions improves the likelihood of a user input being within an intended touch activation region. Hence, changing the shape of the first touch activation region enhances the operability of the device, for example, by reducing the number of touch inputs needed to perform the user interface operation and/or by reducing wasteful user interaction time with the touch-sensitive display.

In some embodiments, the device determines (620) a degree of adjustment for the first touch activation region based on a size of the first selectable user interface element. In other words, in some embodiments, the device determines an amount of adjustment for the first touch activation region based on a function of the size of the first selectable user interface element. In some embodiments, the degree of adjustment for the first touch activation region is directly proportional with the size of the first selectable user interface element. In some embodiments, the degree of adjustment for the first touch activation region is inversely proportional with the size of the first selectable user interface element. As one example, in FIG. 5P, the new area 550pa encompassed by the touch activation region 520a is greater than the new areas 550pb-550pe encompassed by the selectable touch activation regions 520b-520e, respectively. As another example, in FIG. 5Q, the old area 550qa relinquished by the touch activation region 520a for the selectable user interface element 520a is smaller than the old areas 550qb-550qe relinquished by the touch activation regions 520b-520e for the selectable user interface elements 510b-510e. Adjusting the touch activation regions based on the size of the selectable user interface elements improves the likelihood of a user input being within an intended touch activation region of a relatively small selectable user interface element.

In some embodiments, the device maintains (622) a visual representation of the first selectable user interface element. As one example, in FIG. 5D, the device maintains the visual representation of the selectable user interface elements 510a-510e. In the example of FIG. 5D, the device maintains the visual representation of the selectable user interface elements 510a-510e even though the device adjusts the touch activation regions 520a-520e associated with the selectable user interface elements 510a-510e. Maintaining a visual representation of the first selectable user interface element while the first touch activation region is adjusted enables the presentation of a stable user interface that does not require the user to adjust the manner in which the user provides the user input. For example, the user does not have to adjust the way the user provides the user input to compensate for the change of movement. Hence, maintaining the visual representation of the first selectable user interface element improves the operability of the device, for example, by providing a user interface that functions as expected by the user.

In some embodiments, the device determines (624) an adjustment of the first touch activation region based on a length of an arm. For example, in some embodiments, an amount of adjustment is a function of (e.g., directly proportional with) the length of the arm. In some embodiments, the amount of adjustment is inversely proportional with the length of the arm. As one example, in FIG. 5G, the device performs a first adjustment to the touch activation regions 520a-520e based on a first arm length 537a, and a second adjustment to the touch activation regions 520a-520e based on a second arm length 537b. In the example of FIG. 5G, since the second arm length 537b is smaller than the first arm length 537a, the second adjustment is greater than the first adjustment. In some embodiments, the device determines (626) an estimated value that corresponds to the length of the arm based on information stored in the non-transitory memory and/or information received from one or more sensors. In some embodiments, the device utilizes the length of the arm of the user operating the device. In some embodiments, the device utilizes the length of the arm of an average user. Adjusting the first touch activation region based on a function of the arm length enables users with different arm lengths to select an intended touch activation region thereby improving the user experience of the device.

In some embodiments, detecting (608) a touch input on the touch-sensitive display includes detecting (628) a plurality of touch inputs on the touch-sensitive display, determining (628) a primary touch input of the plurality of touch inputs based on the change of movement of the touch-sensitive display, and discarding (628) the remainder of the touch inputs after determining the primary touch input. For example, the device discards touch inputs that are outside the adjusted touch activation region. In other words, the device determines that the touch input within the adjusted touch activation region is the primary touch input. As one example, in FIG. 5H, the device detects touch inputs 560c, 560d and 560e. In the example of FIG. 5H, the device determines that touch input 560c is the primary touch input, and the device discards the touch inputs 560d and 560e.

Determining the primary touch input improves the operability of the device, for example, by performing a user interface operation that the user likely intended and foregoing the performance of user interface operations that the user did not likely intend.

In some embodiments, adjusting (606) the first touch activation region includes in accordance with a determination that the change in the direction of movement of the touch-sensitive display is in a first movement-direction, adjusting (630) the first touch activation region to encompass a first area of the touch-sensitive display that is in a first display-direction from an area of the touch-sensitive display that contained the first touch activation region prior to detecting the change in direction of movement of the touch-sensitive display, where the first area was not included in the first touch activation region prior to detecting the change in the direction of movement. As one example, in FIG. 5C, in accordance with a determination that the change in the direction of movement of the touch-sensitive display 500 is in movement-direction 530cb (e.g., forward-upward), the device adjusts a touch activation region 520a to encompass a new area 550ca of the touch-sensitive display 500 that is in display-direction 540c (e.g., downward) from an area of the touch-sensitive display 500 that contained the touch activation region 520a prior to detecting the change in the direction of movement of the touch-sensitive display 500. Adjusting the first touch activation region to encompass the first area improves the likelihood of a touch input being within the first touch activation region thereby improving the efficiency and/or effectiveness of detecting touch inputs associated with the first selectable user interface element during the change of movement of the touch-sensitive display.

In some embodiments, adjusting (606) the first touch activation region includes, in accordance with a determination that the change in the direction of movement of the touch-sensitive display is in a second movement-direction, adjusting (630) the first touch activation region to encompass a second area of the touch-sensitive display that is in a second display-direction from the area of the touch-sensitive display that contained the first touch activation region prior to detecting the change in direction of movement of the touch-sensitive display, where the second area was not included in the first touch activation region prior to detecting the change in the direction of movement and the second area is different from the first area. As one example, in FIG. 5J, in accordance with a determination that the change in the direction of movement of the touch-sensitive display 500 is in movement-direction 530jb (e.g., forward-downward), the device adjusts a touch activation region 520a to encompass a new area 550ja of the touch-sensitive display 500 that is in display-direction 540j (e.g., upward) from an area of the touch-sensitive display 500 that contained the touch activation region 520a prior to detecting the change in the direction of movement of the touch-sensitive display 500. Adjusting the first touch activation region to encompass the first area improves the likelihood of a touch input being within the first touch activation region thereby improving the efficiency and/or effectiveness of detecting touch inputs associated with the first selectable user interface element during the change of movement of the touch-sensitive display.

As described herein, in some embodiments, the device adjusts (630) the first touch activation region in response to detecting a movement in a first movement-direction. The first movement-direction (632) includes one or more movement-direction components and the first display-direction includes one or more display-direction components, where at least one of the display-direction components is opposite from the one or more movement-direction components. As one example, in FIG. 5C, the movement-direction 530cb includes a forward directional component and an upward directional component. In the example of FIG. 5C, the display direction 540c includes a downward directional component that is opposite the upward directional component of the movement-direction 530cb.

In some embodiments, adjusting the first touch activation region includes determining (634) a degree of adjustment for the first touch activation region based on an amount of change in the direction of movement of the touch-sensitive display. As one example, in FIG. 5F, the device makes a first adjustment to the touch activation regions 520a-520e based on a first change of movement 535c, and the device makes a second adjustment to the touch activation regions 520a-520e based on a second change of movement 535f. In the example of FIG. 5F, the second adjustment is greater than the first adjustment since the second change of movement 535f is greater than the first change of movement 535c (e.g., the new areas 550fa-550fe are greater than the new areas 550ca-550ce). In some examples, the device determines the degree of adjustment by multiplying the amount of change in the direction of movement with a constant of proportionality. As such, a relatively large change in the direction of movement causes the device to determine a relatively large adjustment for the first touch activation region. Adjusting the first touch activation region based on an amount of change in the direction of movement improves the likelihood of a touch input being within an intended touch activation region thereby improving the efficiency and/or effectiveness of detecting touch inputs associated with the first selectable user interface element during the change of movement of the touch-sensitive display.

In some embodiments, adjusting the first touch activation region includes maintaining (636) a visual representation of the first selectable user interface element. In other words, in some embodiments, the device adjusts the first touch activation region while maintaining the visual representation of the first selectable user interface element corresponding with the first touch activation region. As one example, in FIG. 5D, the device maintains a visual representation of the selectable user interface elements 510a-510e. In the example of FIG. 5D, the device maintains the visual representation of the selectable user interface elements 510a-510e while adjusting the touch activation regions 520a-520e corresponding with the selectable user interface elements 510a-510e. Maintaining the visual representation of the first selectable user interface element provides a user interface that behaves as expected. Maintaining the visual representation tends to reduce the likelihood of a user attempting to compensate for the change of movement and missing the intended touch activation region due to the aggregate effect of the user's compensation and the adjustment made by the device.

In some embodiments, adjusting the first touch activation region includes determining (638) an adjustment of the first touch activation region based on a length of an arm. As one example, in FIG. 5G, the device adjusts the touch activation regions 520a-520e based on the arm length 537a or the arm length 537b. In some embodiments, determining the adjustment includes determining (640) an estimated value that corresponds to the length of the arm based on one or more of information stored in the non-transitory memory, and information received from one or more sensors. In some examples, determining the estimated value includes retrieving a pre-established value from the non-transitory memory.

In some examples, determining the estimated value includes utilizing one or more sensors associated with the device to determine a length of an arm of a current user of the device. Adjusting the first touch activation region based on a length of an arm provides a user interface that is tailored to the current user of the device thereby improving the user experience of the device.

The device detects (642) that the change in direction of movement of the touch-sensitive display has ceased, and re-adjusts the first touch activation region in response to detecting that the change has ceased. In other words, the device re-adjusts the first touch activation region after the change of movement ceases so that the first touch activation region occupies the same display area that the first touch activation region occupied prior to the change of movement. As one example, in the sequence illustrated by FIGS. 5R-5T, the device re-adjusts the touch activation regions 520a-520e once the movement of the touch-sensitive display 500 returns to the first movement-direction 530ra. Re-adjusting the first touch activation region enables the device to detect touch inputs within the first touch activation region thereby providing a user interface that functions as intended by a user.

The device re-adjusts the first touch activation region by reversing (644) the adjustment that was made to the first touch activation region. As one example, in FIG. 5U, the device reverses the adjustment 572u as the change of movement indicated by the change in position 570u ceases. Re-adjusting the first touch activation region includes adjusting the first touch activation region to temporarily encompass a third area that is in a third display-direction opposite from the first display direction, the third area is situated beyond the area of the touch-sensitive display that contained the first touch activation region prior to detecting the change in direction of movement of the touch-sensitive display. As one example, in FIG. 5S, the touch activation regions 520a-520e temporarily encompass new areas 550sa-550se. The device determines (646) that the first touch activation region has encompassed the third area for a threshold amount of time. In response to determining that the threshold amount of time has elapsed, the device adjusts (646) the first touch activation region to encompass the area of the touch-sensitive display that contained the first touch activation region prior to detecting the change in direction of movement of the touch-sensitive display. As one example, in FIG. 5T, the touch activation regions 520a-520e encompass respective areas of the touch-sensitive display that contained the touch activation regions 520a-520e prior to detecting the change of movement. Reversing the adjustment of the first touch activation region enables the device to detect touch inputs within the first touch activation region thereby providing a user interface that functions as intended by a user.

After re-adjusting the first touch activation region, the device detects (648) a second touch input on the touch-sensitive display. In response to detecting the second touch input on the touch-sensitive display, in accordance with a determination that the second touch input is detected within the first touch activation region, the device performs (648) a user interface operation that is associated with the first selectable user interface element. In accordance with a determination that the second touch input is detected outside of the first touch activation region, the device forgoes (648) performance of the user interface operation that is associated with the first selectable user interface element.

In some embodiments, a first amount of change between the first area and the area that contained the first touch activation region prior to detecting the change is greater than a second amount of change between the third area and the area that contained the first touch activation region prior to detecting the change (650). As one example, in FIG. 5S, the new areas 550ra-550re are greater than the new areas 550sa-550se. Adjusting the first touch activation region to encompass the third area compensates for the swinging motion of a user's arm as the touch-sensitive display experience the change of movement.

In some embodiments, the one or more selectable user interface elements include a second selectable user interface element that is associated with a second touch activation region, and the device adjusts (652) the second touch activation region in the same display-direction as the first touch activation region in response to detecting the change in direction of movement of the touch-sensitive display. As one example, in FIG. 5C, the device adjusts the touch activation regions 520a-520e associated with the selectable user interface elements 510a-510e in the display-direction 540c. Adjusting the second touch activation region improves the likelihood of detecting a user input intended for the second touch activation region during the change of movement thereby creating a more efficient human-machine interface.

In response to detecting the change in direction of movement of the touch-sensitive display, in accordance with a determination that the change in direction of movement of the touch-sensitive display is in a third movement-direction, the device forgoes (654) adjusting the first touch activation region.

It should be understood that the particular order in which the operations in FIGS. 6A-6F have been described is merely example and is not intended to indicate that the described order is the only order in which the operations could be performed. One of ordinary skill in the art would recognize various ways to reorder the operations described herein.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6F are, optionally, implemented by components depicted in FIGS. 1A-1B, or FIG. 3. For example, display operation 602, detect operation 604, adjust operation 606, detect operation 608 and operations 610 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at a device with a non-transitory memory, and one or more processors in communication with a touch-sensitive display:
   displaying one or more selectable user interface elements on the touch-sensitive display that are associated with corresponding touch activation regions, wherein the one or more selectable user interface elements include a first selectable user interface element that is associated with a first touch activation region;
   detecting a change of movement of the touch-sensitive display that has an associated respective direction;
   in response to detecting the change of movement of the touch-sensitive display:
   adjusting the first touch activation region to encompass a new area of the touch-sensitive display that is at least partially different from the first touch activation region prior to detecting the change of movement, wherein the new area includes a region of the touch-sensitive display adjacent, in a direction opposite to the associated respective direction, to the first touch activation region;
   after detecting the change of movement of the touch-sensitive display, detecting a touch input on the touch-sensitive display; and
   in response to detecting the touch input on the touch-sensitive display:
   in accordance with a determination that the touch input is detected within the adjusted first touch activation region, performing a user interface operation that is associated with the first selectable user interface element; and
   in accordance with a determination that the touch input is detected outside of the adjusted first touch activation region, forgoing performance of the user interface operation that is associated with the first selectable user interface element.

2. The method of claim 1, wherein adjusting the first touch activation region includes changing a size of the first touch activation region.

3. The method of claim 1, wherein adjusting the first touch activation region includes changing a shape of the first touch activation region.

4. The method of claim 1, wherein adjusting the first touch activation region includes: determining a degree of adjustment for the first touch activation region based on a size of the first selectable user interface element.

5. The method of claim 1, wherein adjusting the first touch activation region includes maintaining a visual representation of the first selectable user interface element.

6. The method of claim 1, wherein detecting the change in movement includes receiving sensor measurements from one or more sensors.

7. The method of claim 1, wherein adjusting the first touch activation region includes determining an adjustment to the first touch activation region based on a length of an arm.

8. The method of claim 7, wherein adjusting the first touch activation region includes determining an estimated value that corresponds to the length of the arm based on one or more of information stored in the non-transitory memory, and information received from one or more sensors.

9. The method of claim 1, wherein detecting the touch input comprises:
   detecting a plurality of touch inputs on the touch-sensitive display;
   determining a primary touch input of the plurality of touch inputs based on the change of movement of the touch-sensitive display; and
   discarding the remainder of the touch inputs after determining the primary touch input.

10. The method of claim 1, wherein:
    detecting the change of movement of the touch-sensitive display includes detecting a change in a direction of movement of the touch-sensitive display; and
    adjusting the first touch activation region includes:
    in accordance with a determination that the change in the direction of movement of the touch-sensitive display is in a first movement-direction, adjusting the first touch activation region to encompass a first area of the touch-sensitive display that is in a first display-direction from an area of the touch-sensitive display that contained the first touch activation region prior to detecting the change in direction of movement of the touch-sensitive display, wherein the first area was not included in the first touch activation region prior to detecting the change in the direction of movement; and
    in accordance with a determination that the change in the direction of movement of the touch-sensitive display is in a second movement-direction, adjusting the first touch activation region to encompass a second area of the touch-sensitive display that is in a second display-direction from the area of the touch-sensitive display that contained the first touch activation region prior to detecting the change in direction of movement of the touch-sensitive display, wherein the second area was not included in the first touch activation region prior to detecting the change in the direction of movement and the second area is different from the first area.

11. The method of claim 10, wherein the first movement-direction includes one or more movement-direction components and the first display-direction includes one or more display-direction components; and wherein at least one of the display-direction components is opposite from the one or more movement-direction components.

12. The method of claim 10, wherein adjusting the first touch activation region includes determining a degree of adjustment for the first touch activation region based on an amount of change in the direction of movement of the touch-sensitive display.

13. The method of claim 10, further comprising:
    detecting that the change in direction of movement of the touch-sensitive display has ceased; and
    re-adjusting the first touch activation region in response to detecting that the change has ceased.

14. The method of claim 13, wherein re-adjusting the first touch activation region includes reversing the adjustment that was made to the first touch activation region.

15. The method of claim 13, wherein re-adjusting the first touch activation region includes:
adjusting the first touch activation region to temporarily encompass a third area that is in a third display-direction opposite from the first display-direction, the third area is situated beyond the area of the touch-sensitive display that contained the first touch activation region prior to detecting the change in direction of movement of the touch-sensitive display;
determining that the first touch activation region has encompassed the third area for a threshold amount of time; and
in response to determining that the threshold amount of time has elapsed, adjusting the first touch activation region to encompass the area of the touch-sensitive display that contained the first touch activation region prior to detecting the change in direction of movement of the touch-sensitive display.

16. The method of claim 13, further comprising:
after re-adjusting the first touch activation region, detecting a second touch input on the touch-sensitive display; and
in response to detecting the second touch input on the touch-sensitive display:
in accordance with a determination that the second touch input is detected within the first touch activation region, performing a user interface operation that is associated with the first selectable user interface element; and
in accordance with a determination that the second touch input is detected outside of the first touch activation region, forgoing performance of the user interface operation that is associated with the first selectable user interface element.

17. The method of claim 15, wherein a first amount of change between the first area and the area that contained the first touch activation region prior to detecting the change is greater than a second amount of change between the third area and the area that contained the first touch activation region prior to detecting the change.

18. The method of claim 10, wherein the one or more selectable user interface elements include a second selectable user interface element that is associated with a second touch activation region; and
wherein the method further comprises:
adjusting the second touch activation region in the same display-direction as the first touch activation region in response to detecting the change in direction of movement of the touch-sensitive display.

19. An electronic device, comprising:
a display;
an input device;
one or more processors;
non-transitory memory; and
one or more programs, wherein the one or more programs are stored in the memory and configured to be executed by the one or more processors, the one or more programs including instructions for:
displaying one or more selectable user interface elements on the touch-sensitive display that are associated with corresponding touch activation regions, wherein the one or more selectable user interface elements include a first selectable user interface element that is associated with a first touch activation region;
detecting a change of movement of the touch-sensitive display that has an associated respective direction;
in response to detecting the change of movement of the touch-sensitive display:
adjusting the first touch activation region to encompass a new area of the touch-sensitive display that is at least partially different from the first touch activation region prior to detecting the change of movement, wherein the new area includes a region of the touch-sensitive display adjacent, in a direction opposite to the associated respective direction, to the first touch activation region;
after detecting the change of movement of the touch-sensitive display, detecting a touch input on the touch-sensitive display; and
in response to detecting the touch input on the touch-sensitive display:
in accordance with a determination that the touch input is detected within the adjusted first touch activation region, performing a user interface operation that is associated with the first selectable user interface element; and
in accordance with a determination that the touch input is detected outside of the adjusted first touch activation region, forgoing performance of the user interface operation that is associated with the first selectable user interface element.

20. A non-transitory computer readable storage medium storing one or more programs, the one or more programs comprising instructions, which, when executed by an electronic device with a display, and an input device, cause the electronic device to:
display one or more selectable user interface elements on the touch-sensitive display that are associated with corresponding touch activation regions, wherein the one or more selectable user interface elements include a first selectable user interface element that is associated with a first touch activation region;
detect a change of movement of the touch-sensitive display that has an associated respective direction;
in response to detecting the change of movement of the touch-sensitive display:
adjust the first touch activation region to encompass a new area of the touch-sensitive display that is at least partially different from the first touch activation region prior to detecting the change of movement, and wherein the new area includes a region of the touch-sensitive display adjacent, in a direction opposite to the associated respective direction, to the first touch activation region;
after detecting the change of movement of the touch-sensitive display, detect a touch input on the touch-sensitive display; and
in response to detecting the touch input on the touch-sensitive display:
in accordance with a determination that the touch input is detected within the adjusted first touch activation region, perform a user interface operation that is associated with the first selectable user interface element; and
in accordance with a determination that the touch input is detected outside of the adjusted first touch activation region, forgo performance of the user interface operation that is associated with the first selectable user interface element.

\* \* \* \* \*